(12) United States Patent
Miller

(10) Patent No.: US 10,259,236 B2
(45) Date of Patent: Apr. 16, 2019

(54) METHOD FOR APPLYING LAYERS ON A MATERIAL

(71) Applicant: NIKE, Inc., Beaverton, OR (US)

(72) Inventor: Todd W. Miller, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 79 days.

(21) Appl. No.: 15/422,134

(22) Filed: Feb. 1, 2017

(65) Prior Publication Data

US 2017/0225500 A1  Aug. 10, 2017

Related U.S. Application Data

(60) Provisional application No. 62/291,867, filed on Feb. 5, 2016.

(51) Int. Cl.

| | | |
|---|---|---|
| *B05D 1/26* | (2006.01) | |
| *B05D 1/36* | (2006.01) | |
| *B29C 70/68* | (2006.01) | |
| *B29C 71/04* | (2006.01) | |
| *B41J 25/308* | (2006.01) | |

(Continued)

(52) U.S. Cl.
CPC ............ *B41J 3/4078* (2013.01); *B05D 7/50* (2013.01); *B05D 7/54* (2013.01); *B05D 7/56* (2013.01); *B29C 64/112* (2017.08); *B29C 70/682* (2013.01); *B41M 5/0047* (2013.01); *B41M 5/0064* (2013.01); *B41M 5/0076* (2013.01); *B41M 5/0088* (2013.01); *B41M 7/0081* (2013.01); *D06P 5/30* (2013.01);
(Continued)

(58) Field of Classification Search
CPC ... B05D 1/26; B05D 1/36; B05D 7/50; B05D 7/54; B05D 7/56; B29C 35/08; B29C 2035/0827; B29C 64/112; B29C 70/68; B29C 70/682; B29C 71/04; B41J 3/407; B41J 3/4078; B41J 11/002; B41J 25/308; B41M 5/0047; B41M 5/0064; B41M 5/0088; B41M 7/0081; D06P 5/30
USPC ...... 264/40.1, 129, 255, 259, 308, 494, 496; 427/258, 288, 412, 412.1, 508, 510, 513
See application file for complete search history.

(56) References Cited

U.S. PATENT DOCUMENTS

| | | |
|---|---|---|
| 3,512,224 A | 5/1970 | Newton |
| 3,719,965 A | 3/1973 | Chevallereau |

(Continued)

FOREIGN PATENT DOCUMENTS

| | | |
|---|---|---|
| CN | 102333653 | 1/2012 |
| EP | 0426363 | 5/1991 |

(Continued)

OTHER PUBLICATIONS

International Search Report and Written Opinion for related International Application No. PCT/US2017/016043, dated Apr. 24, 2017, 11 pages.

(Continued)

*Primary Examiner* — Leo B Tentoni
(74) *Attorney, Agent, or Firm* — Klarquist Sparkman, LLP

(57) ABSTRACT

A process for printing multiple layers on a fabric or other material using UV-curable ink that includes a step of printing a first layer on the material and another step of partially curing the first layer. A next step includes printing a partially UV-transparent layer over the first layer and fully curing the UV-transparent layer while simultaneously fully curing the first layer.

24 Claims, 42 Drawing Sheets

(51) Int. Cl.
  *B41J 3/407* (2006.01)
  *B05D 7/00* (2006.01)
  *B29C 64/112* (2017.01)
  *B41M 5/00* (2006.01)
  *B41M 7/00* (2006.01)
  *D06P 5/30* (2006.01)
  *B29C 35/08* (2006.01)
  *B41J 11/00* (2006.01)
  *B41J 11/20* (2006.01)

(52) U.S. Cl.
  CPC ....... *B29C 2035/0827* (2013.01); *B41J 3/407* (2013.01); *B41J 11/002* (2013.01); *B41J 11/20* (2013.01)

(56) References Cited

U.S. PATENT DOCUMENTS

| | | | |
|---|---|---|---|
| 4,375,728 A | 3/1983 | Dassler | |
| 4,749,347 A | 6/1988 | Valavaara | |
| 5,121,329 A | 6/1992 | Crump | |
| 5,134,569 A | 7/1992 | Masters | |
| 5,180,534 A | 1/1993 | Thomas et al. | |
| 5,750,315 A * | 5/1998 | Rach | G03F 7/095 430/271.1 |
| 5,824,260 A | 10/1998 | Sauerhoefer | |
| 5,866,058 A | 2/1999 | Batchelder et al. | |
| 5,975,493 A | 11/1999 | Ellingson et al. | |
| 6,113,696 A | 9/2000 | Tseng | |
| 6,217,693 B1 | 4/2001 | Pelham | |
| 6,226,896 B1 | 5/2001 | Friton | |
| 6,241,930 B1 | 6/2001 | Harrison | |
| 6,266,897 B1 | 7/2001 | Seydel et al. | |
| 6,280,785 B1 | 8/2001 | Yang et al. | |
| 6,505,089 B1 | 1/2003 | Yang et al. | |
| 6,658,314 B1 | 12/2003 | Gothait | |
| 6,708,378 B2 | 3/2004 | Parellada et al. | |
| 6,722,872 B1 | 4/2004 | Swanson et al. | |
| 6,814,907 B1 | 11/2004 | Comb | |
| 6,998,089 B2 | 12/2006 | Osaki | |
| 7,625,198 B2 | 12/2009 | Lipson et al. | |
| 7,658,464 B2 | 2/2010 | Silverbrook | |
| 7,926,204 B2 | 4/2011 | Ungari et al. | |
| 7,939,003 B2 | 5/2011 | Bonassar et al. | |
| 7,997,886 B2 | 8/2011 | Kuo | |
| 8,065,818 B2 | 11/2011 | Greene et al. | |
| 8,178,033 B2 | 5/2012 | Dietrich et al. | |
| 8,469,692 B2 | 6/2013 | Kritchman et al. | |
| 8,568,121 B2 | 10/2013 | Khoshnevis | |
| 9,474,331 B2 | 10/2016 | Waatti | |
| 2003/0043246 A1 | 3/2003 | Codos | |
| 2006/0156978 A1 | 7/2006 | Lipson et al. | |
| 2007/0289459 A1 | 12/2007 | Laksin et al. | |
| 2008/0110048 A1 | 5/2008 | Dua et al. | |
| 2009/0014907 A1 | 1/2009 | Kuo | |
| 2010/0007692 A1 | 1/2010 | Vanmaele et al. | |
| 2010/0327479 A1 | 12/2010 | Zinniel et al. | |
| 2011/0169193 A1 | 7/2011 | Bonassar et al. | |
| 2011/0310204 A1 | 12/2011 | Ohnishi | |
| 2012/0011744 A1 | 1/2012 | Bell et al. | |
| 2012/0023778 A1 | 2/2012 | Dojan et al. | |
| 2012/0117822 A1 | 5/2012 | Jarvis | |
| 2012/0165969 A1 | 6/2012 | Elsey | |
| 2012/0222332 A1 | 9/2012 | Greene et al. | |
| 2013/0015596 A1 | 1/2013 | Mozeika et al. | |
| 2013/0047877 A1 | 2/2013 | Yoo et al. | |
| 2013/0113868 A1 | 5/2013 | Veis | |
| 2014/0020191 A1 | 1/2014 | Jones et al. | |
| 2014/0020192 A1 | 1/2014 | Jones et al. | |
| 2014/0310891 A1 | 10/2014 | Miller et al. | |

FOREIGN PATENT DOCUMENTS

| | | |
|---|---|---|
| EP | 0666163 | 8/1995 |
| EP | 2189272 | 5/2010 |
| EP | 3 153 305 | 4/2017 |
| JP | 08192440 | 7/1996 |
| WO | WO2015/190469 | 12/2005 |
| WO | WO 2014/014977 | 1/2014 |
| WO | WO 2014/028826 | 2/2014 |
| WO | WO 2016/126348 | 8/2016 |

OTHER PUBLICATIONS

Office Action for related Taiwanese Application No. 106103761, dated Oct. 12, 2017, 19 pages (w/ an English translation).

"3ders.org—Creating Unique Lithophanes on a 3D Printer; 3D Printing News," www.3ders.org/articles/20121112-creating-unique-lithophanes-on-a-3d-printer.html, pp. 1-12, Nov. 12, 2012.

International Search Report and Written Opinion for related International Application No. PCT/US2015/027067, 9 pages, dated Jul. 10, 2015.

International Search Report and Written Opinion for related International Application No. PCT/US2015/027898, 21 pages, dated Sep. 11, 2015.

International Search Report and Written Opinion for related International Application No. PCT/US2015/067925, dated Jul. 25, 2016.

* cited by examiner

METHOD FOR APPLYING LAYERS ON A MATERIAL

CROSS-REFERENCE TO RELATED APPLICATIONS

This application claims the benefit of U.S. Provisional Patent Application No. 62/291,867, entitled METHOD FOR APPLYING LAYERS ON A MATERIAL, filed on Feb. 5, 2016, which is incorporated by reference herein in its entirety.

FIELD

This disclosure relates generally to the printing of UV-curable layers on substrates such as the fabric used to make articles of apparel and the like.

BACKGROUND

Articles of apparel can include, for example, shirts, shorts, pants, jackets, hats, or caps, or to make uppers for articles of footwear, such as running, training, jogging, hiking, walking, volleyball, handball, tennis, lacrosse, basketball shoes, and other similar articles of footwear, as well as to make other articles such as backpacks or tents. Articles of apparel may be made of a woven or nonwoven fabric, or of a mesh material, or may be made of leather, synthetic leather, or of plastic materials. Articles of apparel may have items such as emblems or logos on the sleeves, torso, pants leg, or other portions of the article of apparel. Articles of apparel may also have abrasion-resistant, water-resistant, or protective layers at, for example, the elbows, the shoulders, and/or the knees.

Articles of footwear can generally be described as having two primary elements: an upper for enclosing the wearer's foot and a sole structure attached to the upper. The upper generally extends over the toe and instep areas of the foot, along the medial and lateral sides of the foot, and around the back of the heel. The upper may be made from a woven or nonwoven fabric, a knitted fabric, mesh fabric, natural leather, synthetic leather, rubber, and/or from one or more polymers or foam or from other materials. Articles of footwear may also carry items such as emblems or logos, or have abrasion-resistant, water-resistant, or protective layers in various regions of the upper.

BRIEF DESCRIPTION OF THE DRAWINGS

The embodiments can be better understood with reference to the following drawings and description. The components in the figures are not necessarily to scale, emphasis instead being placed upon illustrating the principles of the embodiments. Moreover, in the figures, like reference numerals designate corresponding parts throughout the different views.

DETAILED DESCRIPTION

Figure 1:
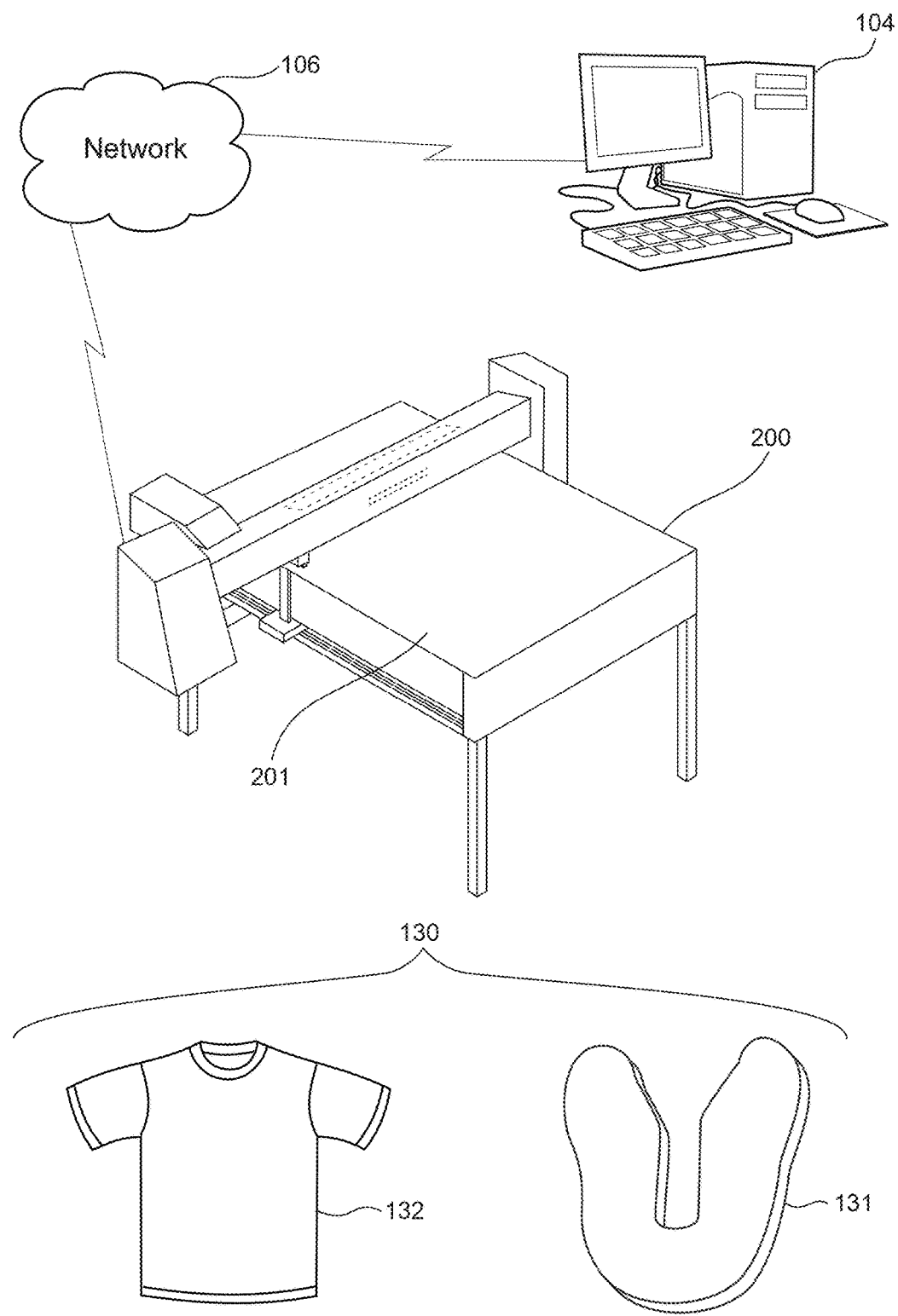
FIG. 1 is a schematic diagram of an exemplary printing system.

For clarity, the detailed descriptions herein describe certain exemplary embodiments, but the disclosure in this application may be applied to any method for fabricating any article comprising certain of the features described herein and recited in the claims. In particular, although the following detailed description describes certain exemplary embodiments, it should be understood that other embodiments may be used for the fabrication of other articles of footwear or apparel. Also, this description is not intended to be used to determine the scope of the claimed embodiments. The proper scope of this patent may be ascertained only from the claims set forth below, read in light of this description.

Although the drawings and the textual description herein only describe embodiments as they may be used on certain articles of footwear or certain articles of apparel, the descriptions herein may also be applied to other articles of footwear and/or to other articles of apparel, including articles of footwear such as running, training, jogging, hiking, walking, volleyball, handball, tennis, lacrosse, basketball shoes, and other similar articles of footwear, or articles of apparel such as shorts, shirts, jerseys, jackets, pants, gloves, wrist bands, head bands, arm bands, hats, or caps, as well as to other articles such a backpacks or tents.

Embodiments disclosed in this application may be fabricated using printers or plotters that may be programmed to deposit layers of acrylic resin ink, polyurethane ink, TPU ink or silicone ink or other inks on a fabric or other article. Such printers or plotters may be programmed to cover a two-dimensional portion of a fabric, for example, by moving a print head along a track in a first direction and moving the track in a second direction that is orthogonal to the first direction. Other printers or plotters may move the print head in a first direction while moving the printer platform in a second direction that is orthogonal to the first direction, or may move the platform in both directions while keeping the print head stationary.

As used herein, the terms "printer," "plotter," "3D printer," "three-dimensional printing system," or "3D printing system" may refer to any type of system that can print multiple layers onto a fabric, an article of footwear, an article of apparel or other article, including, for example, sign and graphics printers. The printers may use any appropriate type of UV-curable ink, including acrylic resin ink, polyurethane ink, TPU ink or silicone ink or any other appropriate ink.

Embodiments disclosed herein include a process for applying overlays on a substrate such as a fabric using a printer and UV-curable materials or inks. In these embodiments, the process starts by positioning the substrate on the printer and printing a first layer of the material onto the substrate. The first layer is then partially cured by subjecting the first layer to a first predetermined radiation event characterized by a first radiation. The first predetermined radiation event only partially cures the first layer. The process continues by printing a second layer of material over the first layer, and fully curing the second layer and fully curing the first layer by subjecting the first layer and the second layer to a second predetermined radiation event characterized by a second radiation. The first layer is cured by this exposure because the second layer is partially transparent to the second radiation.

Other embodiments include a process for printing on a substrate that has an uneven top surface. In these embodiments, the process starts by positioning the substrate on the printer and printing a first layer of a material over the uneven top surface of the substrate, then partially curing the first layer by exposing the first layer to a first radiation event. The first layer is allowed to coalesce such that a top surface of the first layer is flatter and has less roughness than the uneven top surface of the substrate. A second layer of material is printed over the first layer. Then the second layer is partially cured and the first layer is fully cured by subjecting the second layer to a second predetermined radiation event.

Other embodiments include a process for printing on a substrate that allows for expansion of the printed material during the curing process. These embodiments start by positioning the substrate on the printer and printing a first layer of material on the substrate in a pattern that has a pattern of openings in the first layer. The first layer is then partially cured by subjecting the first layer to a first radiation event. The process continues by printing a second layer of material with openings over the first layer, then partially curing the second layer and further curing the first layer by subjecting the second layer to a second radiation event. During curing, the first layer of material expands into the openings as it is cured to at least partially fill in the openings.

FIG. 1 is a schematic diagram of a printing system that may be used to implement certain of the embodiments described herein. As shown schematically in FIG. 1, material 130 such as the fabric for upper 131 or the fabric for an article of apparel 132 or other fabric or material may be placed in printer 200, which is described below with reference to FIG. 2. For convenience, the material used for an upper or the material for an article of apparel or other material may be referred to herein simply as the "fabric" in this specification.

Printer 200 is a part of a printing system that includes computer or CAD system 104 that transmits printing instructions to printer 200. The printing instructions may be transmitted from computer system 104 to printer 200 over wired or wireless network 106, or the computer system may be directly connected to the printer via a cable or other connection. The fabric for upper 131 or for article of apparel 132 may be positioned onto platform 201 in printer 200. The printing instructions include layer-by-layer instructions for printing multiple layers of ink onto fabric 130. The ink may be UV-curable ink such as an acrylic resin ink, polyurethane ink, TPU ink, or silicone ink.

For each of the successive layers of ink or other material that is printed, enough ink or other material is applied such that the ink or other material may flow off the high points in the fabric and pool down into the low points during and/or immediately after printing, such that the new top surface is flatter than the previous top surface. This ensures that the top surface of each successive layer is flatter than the top surfaces of the previous layers until a flat surface is achieved that can serve as a reference layer for subsequent operations. This reference layer then allows fabrication of any detailed two-dimensional or three-dimensional shape that is independent of the uneven nature of the underlying substrate.

Moreover, when the underlying fabric is a coarse textile, the textile may absorb the ink or other material. When this ink or other material is cured, the textile may be saturated such that it cannot absorb any more ink or other material. Subsequent layers of ink or other material may then be printed on the saturated textile, producing layers with successively flatter top surfaces as described above.

Figure 2:
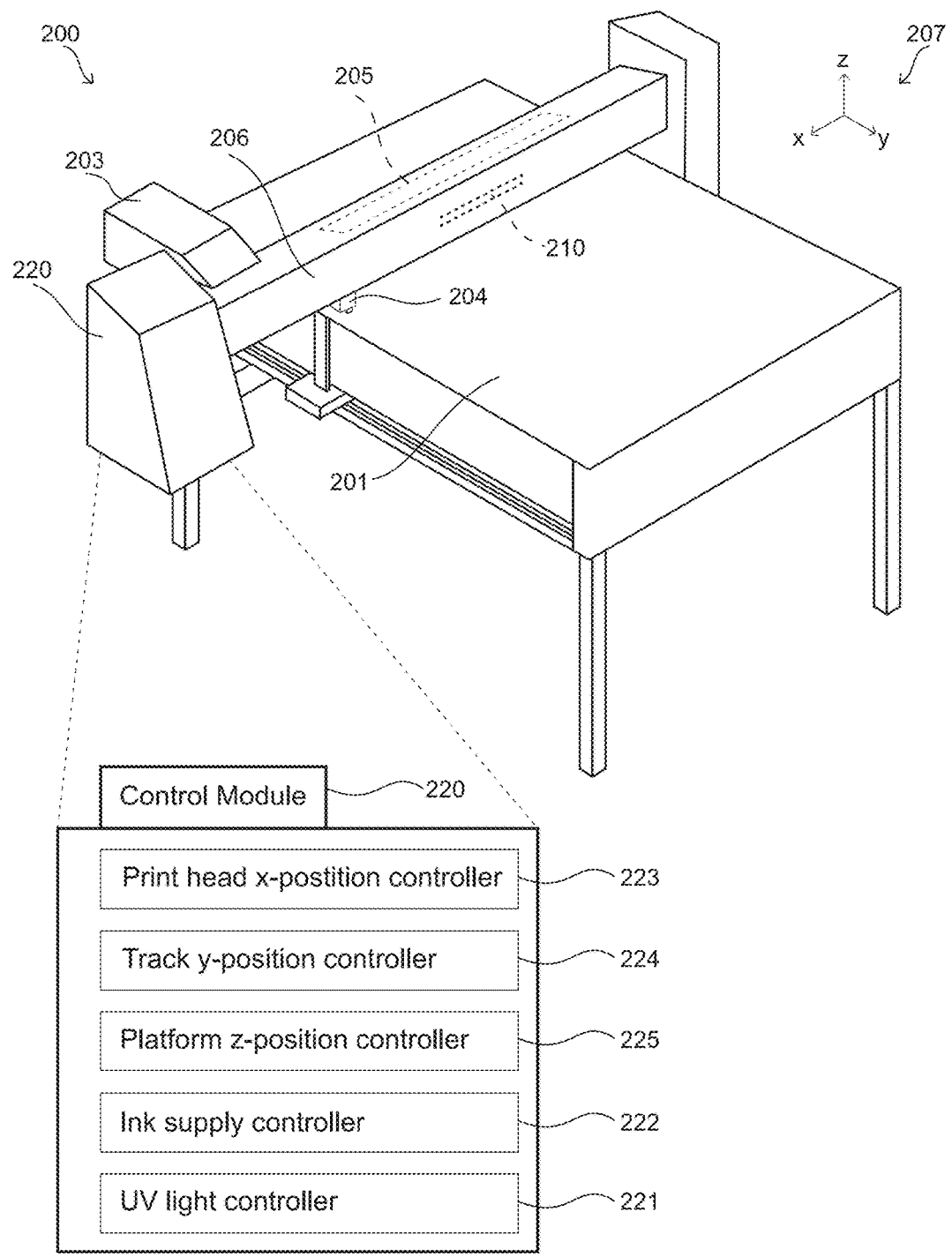
FIG. 2 is a schematic diagram of an exemplary printer.

FIG. 2 is a schematic diagram of printer 200 that may be used to implement the embodiments described herein. As shown schematically in FIG. 2, the main components of printer 200 are platform 201 upon which fabric 130 (shown in FIG. 1) may be positioned, print head 204, UV light controller 221 and ink supply module 203, which are controlled by control module 220. In some embodiments, print head 204 travels along track 206 under the control of, for example, a digitally controlled stepper motor (not shown), which can precisely position print head 204 under the control of print head x-position controller 223, which is housed in control module 220. Ink from ink supply module 203 is provided to print head 204 under the control of ink supply controller 222, which is also housed in control module 220. Printer 200 may also include UV curing lamp 205.

For convenience, the orthogonal x, y, and z directions are defined by coordinate system 207 in FIG. 2. In the embodiment shown schematically in FIG. 2, in operation, print head 204 can travel along track 206 in, for example, the x-direction under the control of print head x-position controller 223. Track 206 itself can travel in the y-direction under the control of track y-position controller 224. Thus, the combination of print head 204 traveling in the x-direction and track 206 traveling in the y-direction allows print head 204 to cover a substrate such as a fabric positioned on platform 201. In other embodiments, a print head could be actuated in one or more different directions relative to a track or other supporting structure.

In other embodiments, the platform itself may move in the y-direction while the track remains stationary or the material to be printed on may be placed on a conveyor belt that moves in the y-direction. In yet other embodiments, the print head may be stationary while the platform travels in both the x-direction and the y-direction.

In some embodiments, printer 200 also includes distance sensor 210 that measures the distance from the sensor to the top surface of fabric 130, including any layers that may be deposited on fabric 130, such that when layers of ink are printed on top of fabric 130, distance sensor 210 measures the distance to the top surface of the ink layer or layers on fabric 130. Distance sensor 210 is in communication with z-direction platform position controller 225 that controls the position of platform 201 in the z-direction. In some embodiments, z-direction platform position controller 225 controls the distance from print head 204 to the top of fabric 130 and its layer of ink, if any. In those embodiments, z-direction platform position controller 225 may control the distance from the top surface of fabric 130 and its layer such that this distance is constant at the beginning of each pass by the print head. For example, if a layer of ink 0.1 mm thick is printed on top of fabric 130, z-direction platform position controller 225 lowers platform 201 by 0.1 mm before beginning the next pass, such that the distance from print head 204 to the top surface of the top layer on fabric 130 is the same at the beginning of each pass.

Some embodiments may use different kinds of printing devices and systems. In some cases, one or more features disclosed in U.S. patent application Ser. No. 15/287,010, entitled "Printing Layer In Response To Substrate Contour," filed on Oct. 6, 2016, the entirety of which is incorporated by reference herein, may be used.

As noted above, the material ejected from the printer head may be UV-curable ink such as acrylic resin ink, polyurethane ink, TPU ink, or silicone ink. In other embodiments, the material ejected from the printer head may also be another material that can be ejected from a printer head and can be cured by radiation or heat. The ink or other printable material ejected from the printer head may have sufficient fluidity such that it can flow down from high points on the surface it is being printed upon to low points on that surface during and/or immediately after printing, such that successive top surfaces become progressively flatter, as explained below.

Layers deposited upon an article of apparel or upon an article of footwear may perform any one of several functions. For example, the layers may be water resistant, abrasion resistant or protective, or may bear colors or patterns of colors. In some cases, the layers may have inherent optical properties that enhance the visual appearance of the article of apparel or the article of clothing. For example, the layers may form a lenticular array over the fabric. In other embodiments, the layers may be thermochromic layers that change color as the temperature of the layer changes, or electrochromic layers that change color according to an applied voltage (for example, a voltage from a piezoelectric source).

Figure 3:
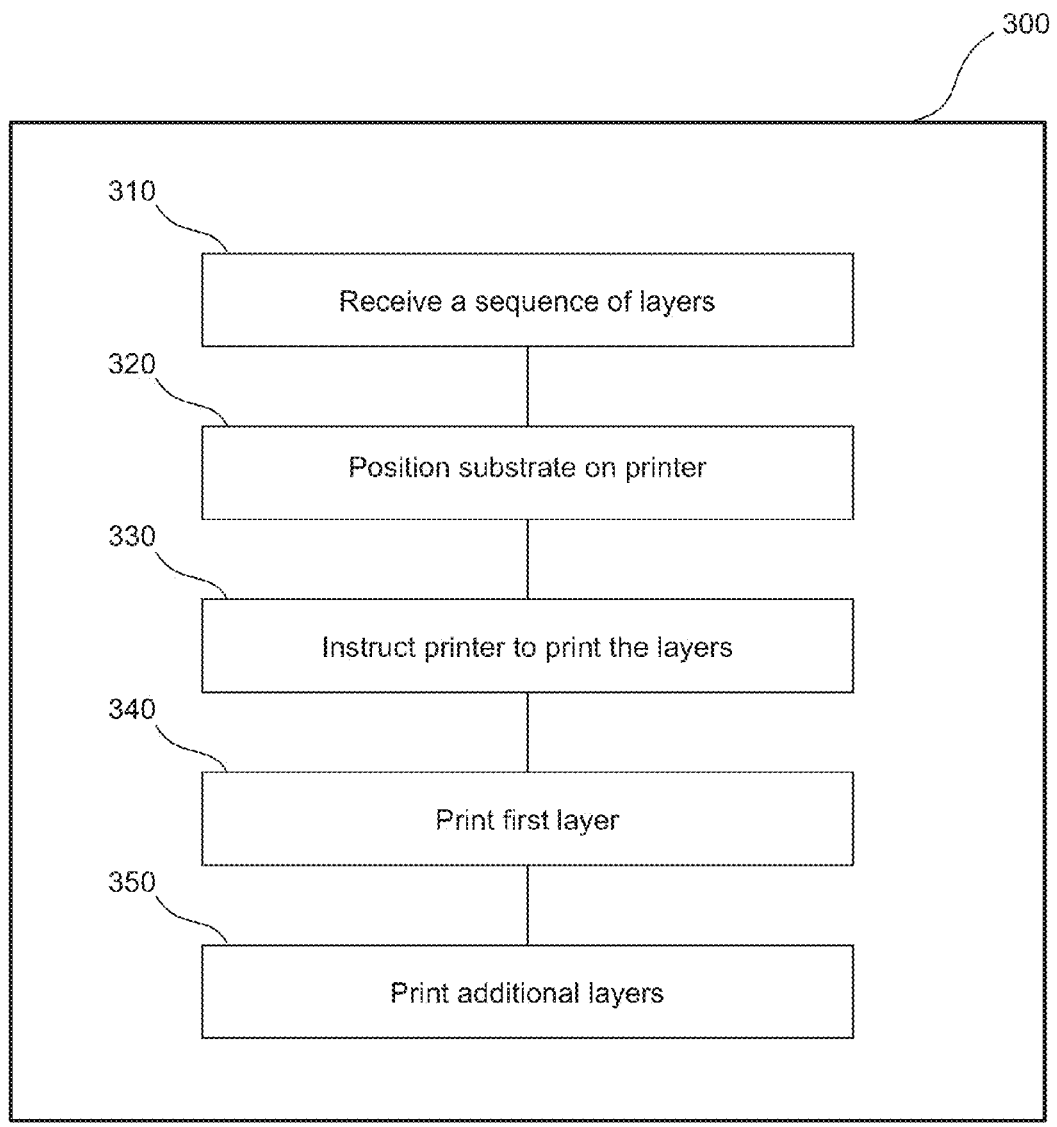
FIG. 3 is an exemplary flowchart illustrating an embodiment of a process for depositing multiple layers on a substrate.

FIG. 3 illustrates an exemplary flowchart 300 illustrating an embodiment of a process for depositing multiple layers of ink onto a substrate such as a fabric or other material. In this embodiment, in step 310, a sequence of layers to be printed on a substrate is received at a printer. For example, the sequence of layers may have been designed on a CAD system, and transmitted to the printer over a network or via a direct connection from the CAD system to the printer's control module. In step 320, a substrate such as a fabric or other material for an upper of an article of footwear or for an article of apparel is positioned on the printer platform. The substrate may also be some other article, such as protective gear or an athletic or recreational product such as a tennis racket, a hockey stick or a gym bag. Step 310 and step 320 can be performed in any order, or can be performed simultaneously. The substrate may bear, for example, a colored or black-and-white pattern. In step 330, the printer is instructed to print the sequence of layers. In step 340, the printer prints the first layer, following the steps shown in the flowchart of FIG. 4. In step 350, the printer prints the first layer, following the steps shown in the flowchart of FIG. 350.

Figure 4:
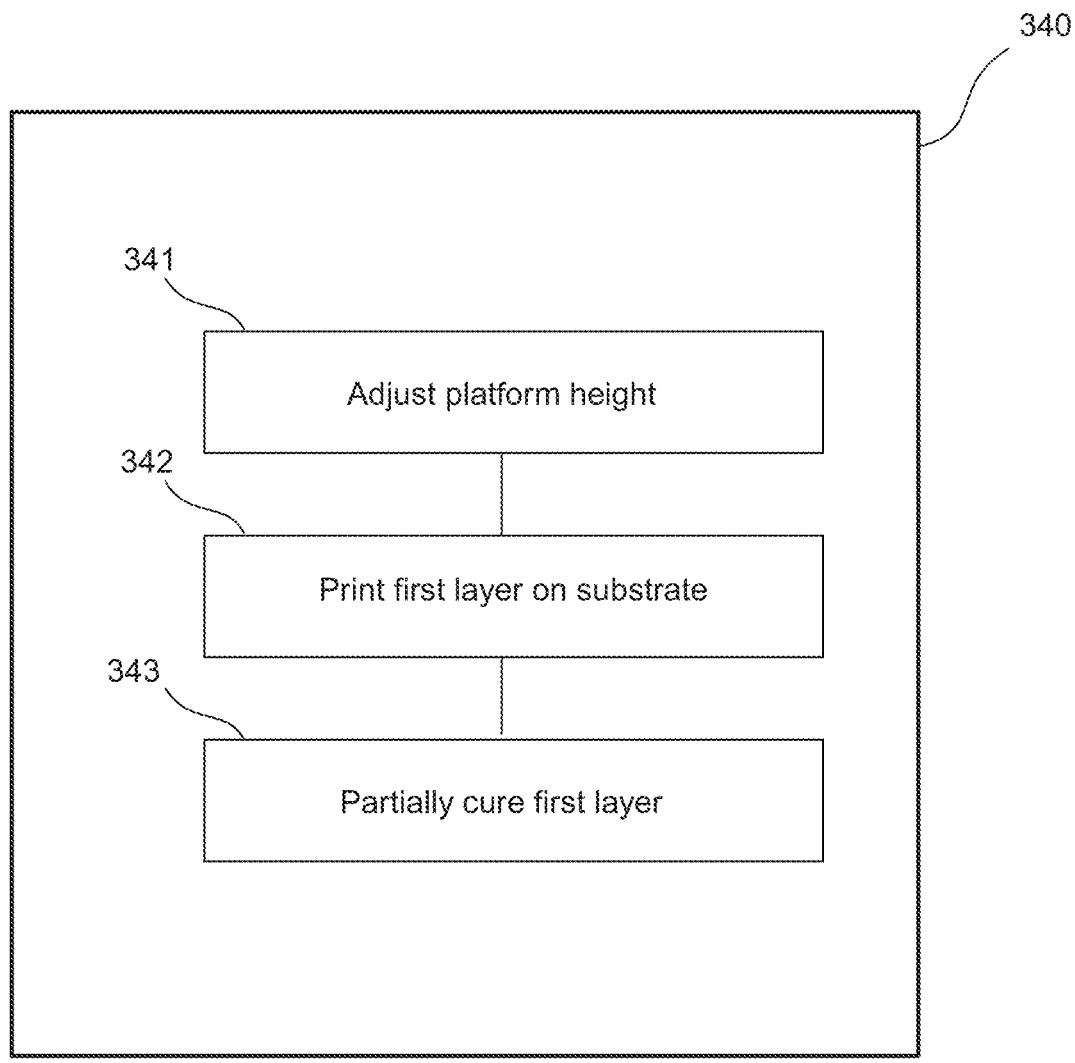
FIG. 4 is an exemplary flowchart illustrating an embodiment of one of the steps shown in the flowchart of FIG. 3.
Figure 5:
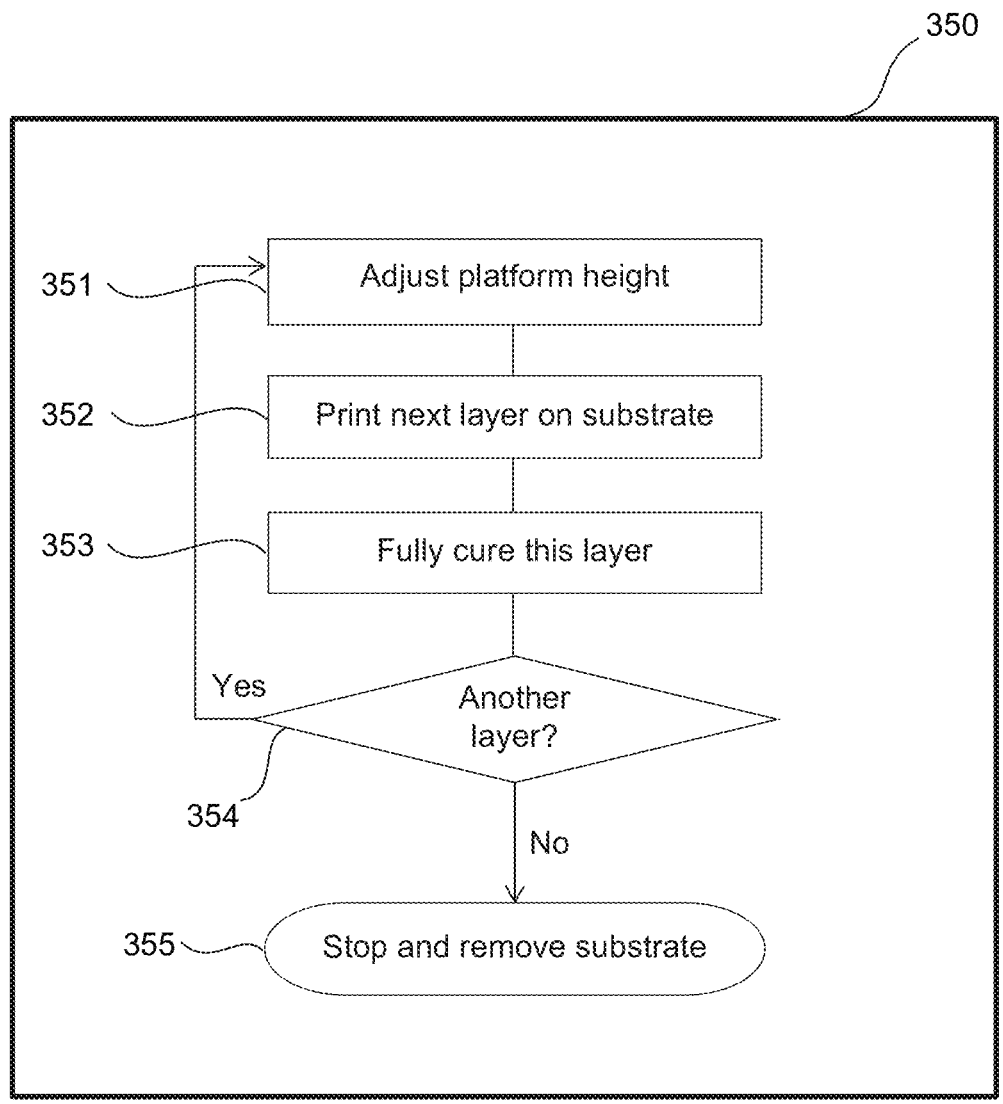
FIG. 5 is an exemplary flowchart illustrating an embodiment of another one of the steps shown in the flowchart of FIG. 3.

The flowcharts shown in FIG. 4 and FIG. 5 illustrate exemplary steps that may be used to implement step 340 and step 350, respectively, of the flowchart of FIG. 3. Thus, step 340 of FIG. 3, as outlined in FIG. 4 may start with step 341 of adjusting the height from the printer head to the platform to a predetermined height. Step 341 of adjusting the height of the platform before the printer prints a first layer of material onto the fabric, and similar step 351 described below with reference to FIG. 5, that are executed before each successive layer is printed, are optional steps that may be used to improve the layer-to-layer consistency of the printed layers.

Next, in step 342, the printer may print the first layer on the fabric. The first layer may be printed to be, for example, on the order of 0.1 mm thick, although in some cases, the first layer may be printed to be any thickness from 0.05 mm thick to 0.2 mm thick, inclusive. The printed layer may be, for example, UV-curable acrylic resin ink, UV-curable polyurethane ink, UV-curable TPU ink, or UV-curable silicone ink, or it may be some other printable material. As described above, the ink or other printable material may pool down from the high points to the low points of the underlying fabric during and/or immediately after printing, thus resulting in a less uneven and flatter top surface compared to the top surface of the underlying fabric. In step 343, the first layer is then subjected to a first predetermined radiation event, such as exposure to a UV radiation source for a first duration at a first intensity. The duration and intensity parameters of this first predetermined radiation event are selected to only partially cure the first layer.

The first predetermined radiation event may be selected by selecting, for example, UV radiation as the radiation, and selecting an exposure time and an intensity level for the UV radiation such that the first layer is only partially cured. The first radiation event may be a first predetermined exposure to UV radiation for a predetermined duration at a predetermined incident intensity. For example, if the first layer would be fully cured with a 0.1 second exposure time at a UV radiation intensity of 1,000 lumens, this predetermined radiation event could be an exposure time of 0.05 seconds at a UV radiation intensity of 1,000 lumens, or it could be an exposure time of 0.1 seconds at a UV radiation intensity of 500 lumens. Because the first layer is only partially cured, it becomes a viscous or gelatinous fluid such that it flattens out or reduces to some extent any irregularities or imperfections of the underlying substrate.

As noted above, FIG. 5 is a flowchart that illustrates exemplary steps that may be used to implement step 350 of exemplary flowchart 300 of FIG. 3. In step 351, the height of the platform may optionally be adjusted such that the distance from the print head to the first layer is equal to the distance from the print head to the fabric in step 341. In other words, prior to printing the second layer, the distance from the print head to the top surface of the first layer is equal to the predetermined height specified in step 341. In step 352, a second layer of material may be printed over the first, partially cured layer. The second layer may be 0.1 mm thick, or it may have another thickness in the range of 0.05 mm to 0.2 mm. The ink or other material used to print the second layer (and any additional subsequent layers) may pool down from the higher points of the first (or previous layer) to the low points of the first (or previous layer) during and/or immediately after printing to produce a second layer with a top surface that is flatter than the top surface of the first layer (or of the previous layer). The thickness and composition of the second layer is selected such that the second layer is partially transparent to the radiation, such as UV radiation, that may be used to cure the printed layers. For example, the material used for the second layer may be UV-curable ink, such as the UV-curable inks listed above.

In step 353, the second layer is then exposed to a second radiation event that may be selected to fully cure the second layer. For example, the second radiation event may be exposure to UV radiation for a second predetermined exposure, which is greater in duration and/or intensity than the first predetermined exposure. For example, the second predetermined exposure may be an exposure to UV radiation with a duration of 0.1 seconds at an intensity of 1,000 lumens. In these embodiments, because the second layer is partially transparent to UV radiation, the UV radiation penetrates through the second layer into the first layer. Thus, step 353 completes the cure of the first layer, which had only been partially cured in step 343.

In step 354, the printer determines whether it has been programmed to print an additional layer. If no additional layers need to be printed, the printer stops printing layers, and the substrate is removed in step 355. If an additional layer needs to be printed, the printer returns to step 351. The printer can then execute step 351, step 352, step 353, and step 354 until all layers in the sequence have been printed, and the printer stops in step 355 to allow for removal of the substrate with its printed-on and fully cured layers. As noted above, during and/or after each printing step the ink or other printable material may flow down from any high points in the underlying surface to any low points in that surface.

Each successive radiation event may be equal to or similar in duration and intensity as the second predetermined radiation event, or they may have a different duration and/or intensity. In any event, each of the successive radiation events may be selected to fully cure each of the successive layers after they have been printed.

In some embodiments, the steps of printing a layer and curing that layer may occur concurrently, such that the layer is subjected to a radiation event (such as exposure to UV radiation) as it is being printed.

For example, the processes described in the flowcharts of FIG. 3, FIG. 4, and FIG. 5 may be used to print 14 layers, each 0.1 mm thick, to produce a 1.4 mm thick overlay over the substrate. In general, 10 to 20 layers, each in the range of 0.05 mm to 0.2 mm thick may be printed on a substrate, to produce an overlay that may be 1.0 mm to 2.0 mm thick and may function as a protective, water-resistant, and/or abrasion-resistant overlay. The overlay may also or alternatively have other properties, such as color or resilience, and/or may absorb impacts and/or may have optical functions. As an example, the overlay may include a lenticular array, or may include a thermochromic or electrochromic component.

Figure 6:
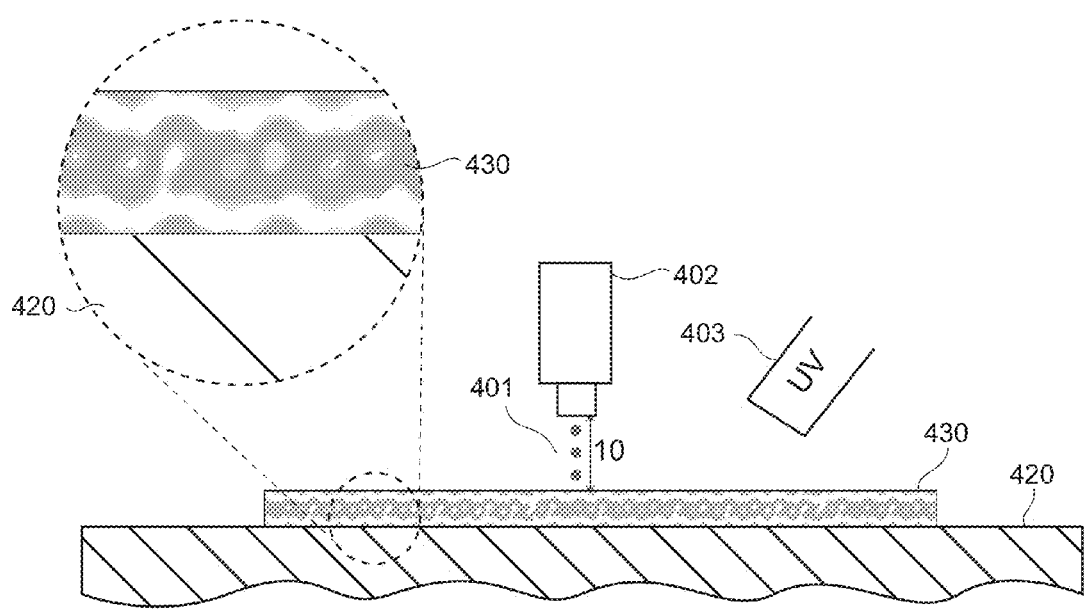
FIG. 6 is a schematic diagram illustrating the operation of one of the steps set forth in the flowcharts of FIGS. 3-5.
Figure 7:
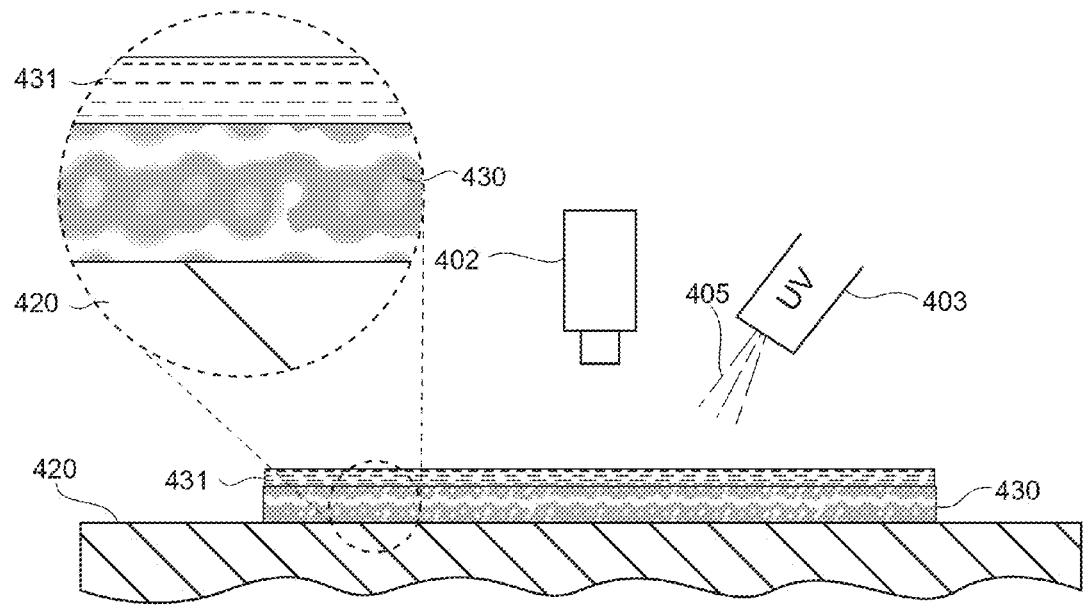
FIG. 7 is a schematic diagram illustrating the operation of another one of the steps set forth in the flowcharts of FIGS. 3-5.

The sequence set out in the flowcharts of FIG. 3, FIG. 4, and FIG. 5 is illustrated in FIGS. 6-13. In the embodiments illustrated in FIGS. 6-13, the radiation event is an exposure to UV radiation. In each of these figures, a blowup provides a close-up view of the layers. FIG. 6 illustrates step 342 listed in the flowchart of FIG. 4. In FIG. 6, optionally after height 10 of the platform relative to the print head has been adjusted, drops 401 of material are ejected from print head 402 toward substrate 430 on platform 420. The substrate may, for example, be a fabric that bears a pattern or an image, either in color or in black and white or in another combination of colors. In the configuration shown in FIG. 6, UV radiation source 403 is off (i.e., not emitting any UV radiation). FIG. 7 illustrates an execution of step 343 in the flowchart of FIG. 4, partially curing the first layer. In FIG. 7, first layer 431 has been printed onto substrate 430. Immediately after printing, first layer 431 is essentially a liquid layer on top of substrate 430, as shown by the dashed lines in FIG. 7 illustrating the liquid state of first layer 431. In this liquid state, the printable material can flow down from any high points in the underlying surface to any low points in that surface. In FIG. 7, UV radiation source 403 now emits UV rays 405 toward first layer 431 for a first predetermined exposure, which is an exposure for a period of time and intensity sufficient to only partially cure first layer 431.

In the figures, the partial curing of a layer is illustrated by showing only three rays 405 emanating from the UV source, as shown in FIGS. 7, 20, 22, 24, 26, 48, 50, 52, and 54. Fully curing is illustrated by showing six rays 405 emanating from the UV source, as shown in FIGS. 9, 12, 28, 30, and 56.

After the completion of step 343, first layer 431 becomes a viscous fluid, rather than a liquid, because it has been partially cured. This viscous state is illustrated by the combination of dashes and diagonal stripes in first layer 431 in FIG. 8 (which is described below) to indicate that the layer is in an intermediate state between liquid and solid. In this viscous state, first layer 431 can settle into and over any small irregularities in the substrate, such that the top surface 441 of first layer 431 is flatter, less rough and smoother and does not reproduce or reflect those irregularities. In some embodiments, the material forming first layer 431 penetrates into substrate 430, thus mechanically attaching and/or chemically bonding first layer 431 to substrate 430.

Figure 8:
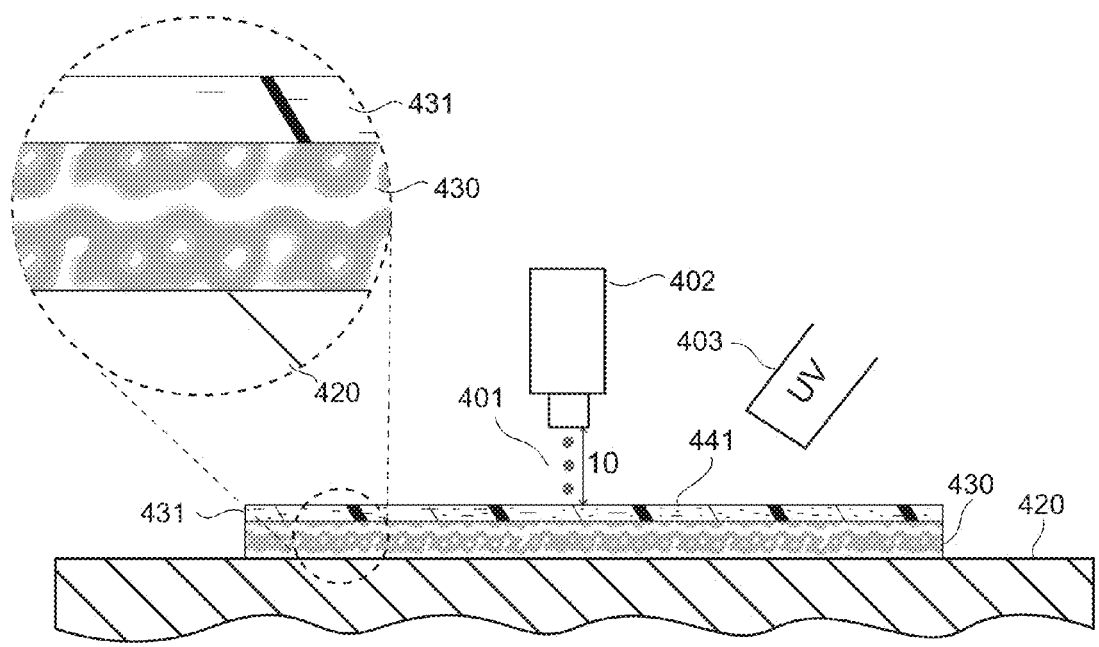
FIG. 8 is a schematic diagram illustrating the operation of another one of the steps set forth in the flowcharts of FIGS. 3-5.
Figure 9:
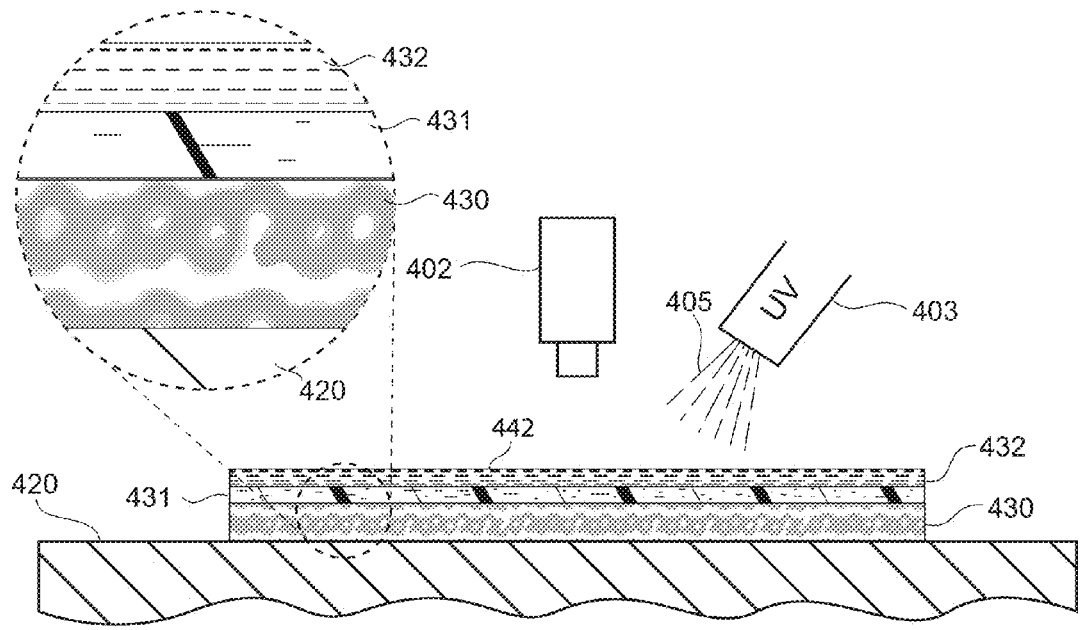
FIG. 9 is a schematic diagram illustrating the operation of another one of the steps set forth in the flowcharts of FIGS. 3-5.

FIG. 8 and FIG. 9 illustrate step 352 and step 353 listed in the flowchart of FIG. 5. In these steps, optionally after height 10 of the platform relative to the print head has been adjusted, second layer 432 is printed over first layer 431 as shown schematically in FIG. 8 and is fully cured as shown schematically in FIG. 9. The thickness of the second layer may be greater than, the same as, or less than the thickness of the first layer. For example, both layers may be 0.1 mm thick, or the first layer may be more than 0.1 mm thick (for example, 0.12 mm thick), and the second layer may be less than 0.1 mm thick (for example 0.09 mm thick) or vice versa. Because top surface 441 of viscous first layer 431 is flat and smooth, second layer 432 settles easily over first layer 431 as it is printed on first layer 431, such that second layer 432 has a flat top surface 442 as shown schematically in FIG. 9. Second layer 432 is partially transparent to UV, such that UV radiation incident onto second layer 432 can penetrate through to first layer 431 to complete the cure of first layer 431.

FIG. 9 illustrates step 353 listed in the flowchart of FIG. 5. In this step, UV radiation source 403 now emits UV rays 405 toward second layer 432.

Because second layer 432 is partially transparent to the UV radiation, the UV rays cure first layer 431 as they cure second layer 432. In step 353, first layer 431 and second layer 432 are exposed to UV radiation source 403 for a second predetermined radiation event. For example, the second predetermined radiation event is a second predetermined exposure to UV radiation for a period of time and at an intensity sufficient to fully cure both first layer 431 and second layer 432. For example, the second predetermined exposure could have an exposure time of 0.1 seconds at a UV radiation intensity of 1,000 lumens, or it could have an exposure time of 0.2 seconds at a UV radiation intensity of 500 lumens, or it could be exposed for any combination of duration and intensity that fully cures both first layer 431 and second layer 432.

Figure 10:
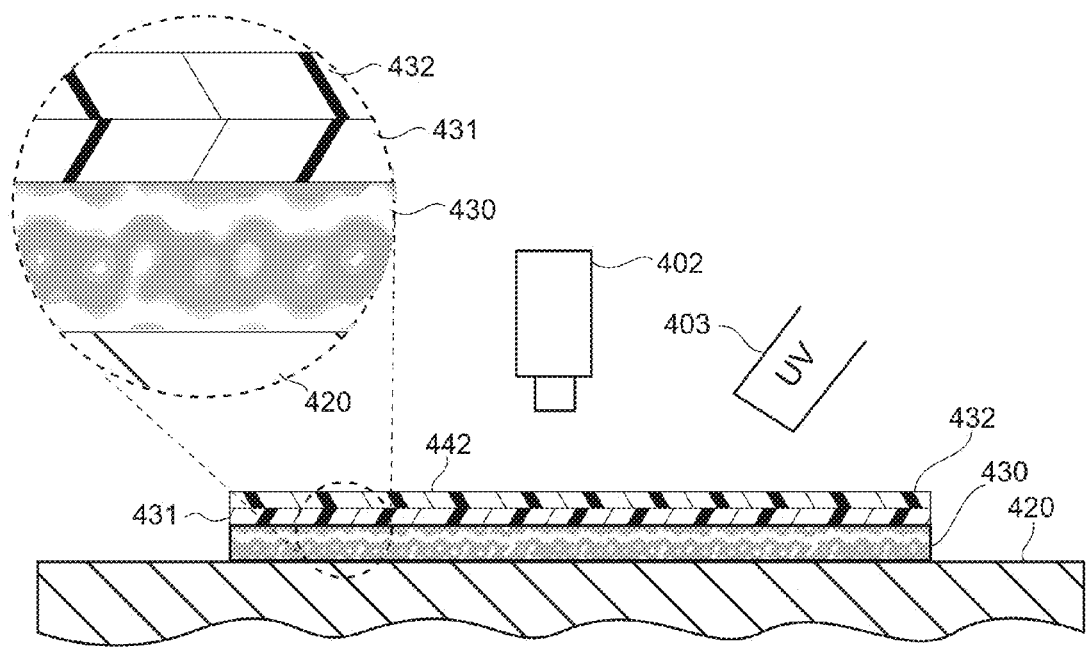
FIG. 10 is a schematic diagram illustrating the operation of another one of the steps set forth in the flowcharts of FIGS. 3-5.

After step 353 is completed, both first layer 431 and second layer 432 are fully cured, as shown schematically in FIG. 10. The blowup in FIG. 10 is a close-up illustration of substrate 430, first layer 431, and second layer 432 after both layers have been fully cured, as shown by the cross-hatchings indicating that both the first layer 431 and the second layer 432 have been fully cured. Also, as shown in FIG. 10, top surface 442 of fully cured second layer 432 is flat.

Figure 11:
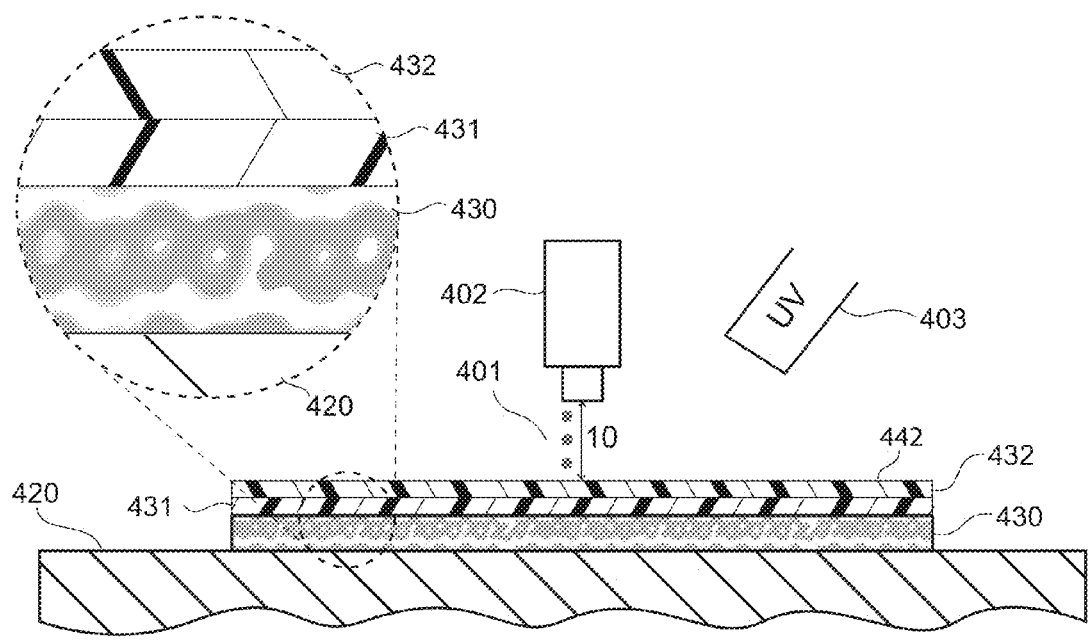
FIG. 11 is a schematic diagram illustrating the operation of another one of the steps set forth in the flowcharts of FIGS. 3-5.
Figure 12:
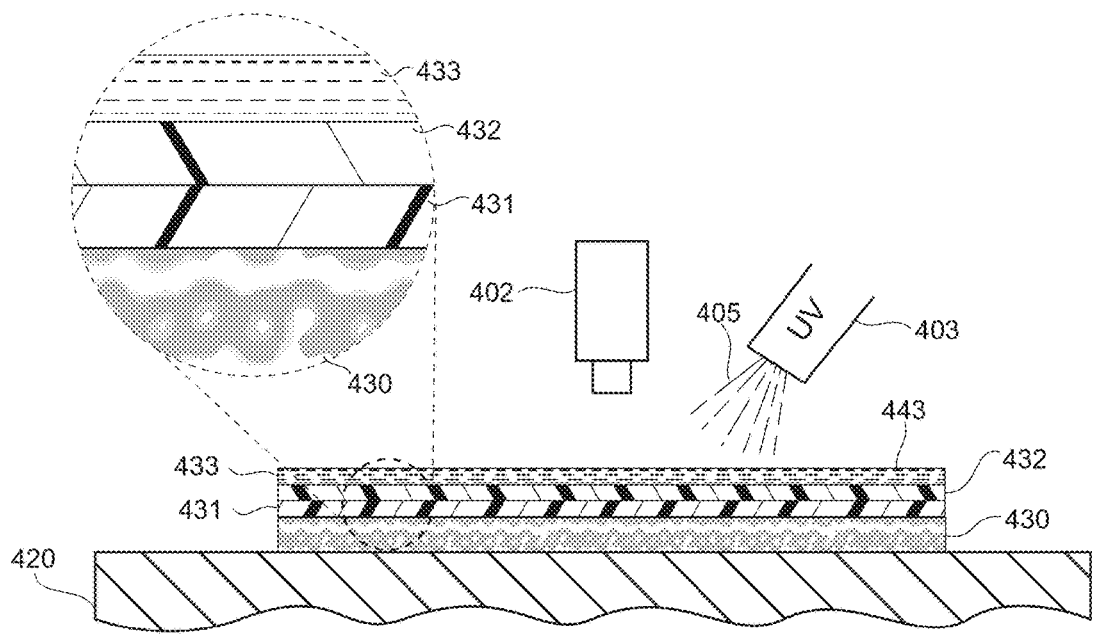
FIG. 12 is a schematic diagram illustrating the operation of another one of the steps set forth in the flowcharts of FIGS. 3-5.
Figure 13:
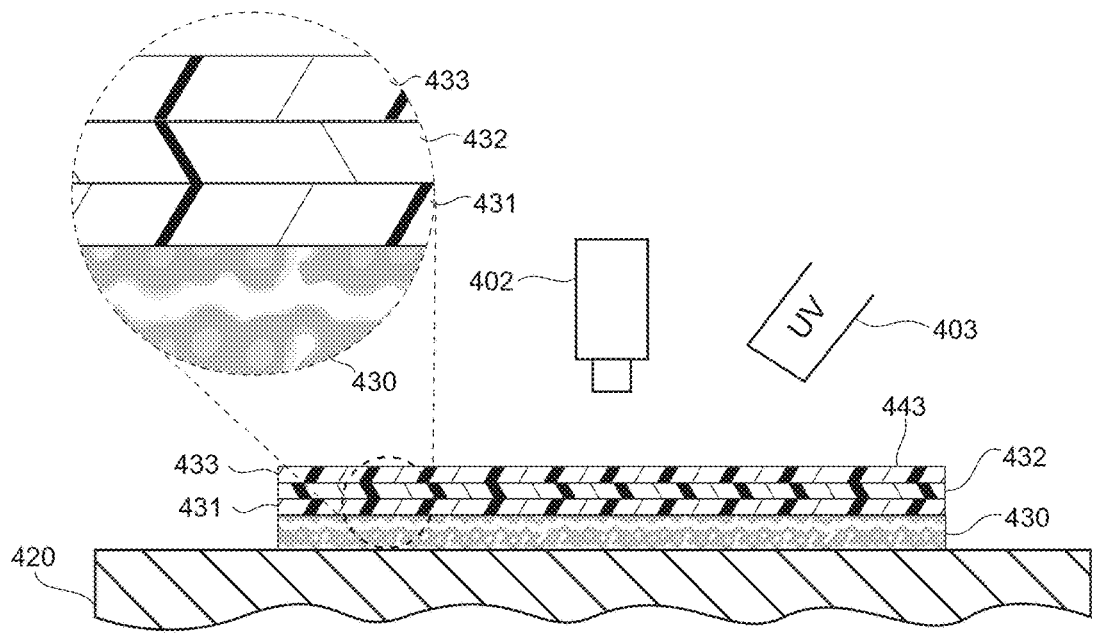
FIG. 13 is a schematic diagram of a cross section of a multi-layer structure produced according to the steps set forth in the flowcharts of FIGS. 3-5.

Any number of additional layers may be printed over second layer 432, which has a flat top surface 442 that may serve as a reference plane for the subsequent printing of the additional layers. FIGS. 11-13 illustrate the printing and curing of a third additional layer. A fourth layer, a fifth layer, and/or more layers may also be printed and cured following the steps set forth in the flowchart of FIG. 5. FIG. 11 illustrates a second execution of step 352 of FIG. 5, printing third layer 433 (shown in FIG. 12 after it has been deposited) over second layer 432, optionally after height 10 of the platform relative to the print head has been adjusted. FIG. 12 illustrates step 353 of FIG. 5, fully curing third layer 433 (which has a flat top surface 443) by exposing third layer 433 to a radiation event, such as exposing third layer 433 to UV radiation source 403 for a third predetermined exposure.

FIG. 13 is a schematic diagram showing a cross section of the final structure of a three-layer overlay consisting of first layer 431, second layer 432, and third layer 433 over substrate 430. The blowup in FIG. 13 is a close-up of this final structure. Top surface 443 of the three-layer overlay is flat, such that it could serve as a reference layer for the printing of one or more additional layers. If additional layers are to be printed, those layers are successively printed and successively subjected to radiation events, as shown in the flowchart of FIG. 5.

In FIGS. 6, 8, and 11, the height of the print head above the surface to be printed on is designated by the numeral "10", as indicated in the figures. In certain embodiments, this height is reset to its initial height (the height from the print head to the bare substrate) at the start of each printing step. Optionally, at the start of each printing step, the platform position is adjusted so that the height from the print head to the top of the layer is the same at the beginning of each printing step. However, this height adjustment step (which is identified as step 341 in FIG. 4 and as step 351 in FIG. 5) is optional as noted above, and the process outlined in flowchart 300 in FIG. 3 may be implemented without using this height adjustment for one or more of the printing steps or for all of the printing steps.

In general, any number of layers with varying or the same thicknesses may be printed using the system illustrated in FIG. 1. Typically, 10 to 20 layers may be printed, with thicknesses ranging from 0.05 to 2.0 mm. For example, a total of 14 layers, each approximately 0.1 mm thick, may be printed over a substrate to produce a 1.4 mm overlay over the substrate. The layers may all be clear, or they may carry some pigmentation, such that one or more layers may be colored.

In other embodiments, the second layer may only be exposed to, for example, the first predetermined exposure, which will only partially cure the second layer. In that case, the first layer (which was partially cured by the previous exposure) could become fully cured when the second layer was being partially cured. Similarly, several successive layers may only be partially cured during their initial exposures, and then become fully cured when the next layer is being partially or fully cured. Subsequent layers may be fully cured in their initial exposure to radiation events such as UV radiation. In many embodiments, the final layer would be fully cured in the last radiation event, although in some embodiments, the final layer may be cured by heat, for example.

Figure 14:
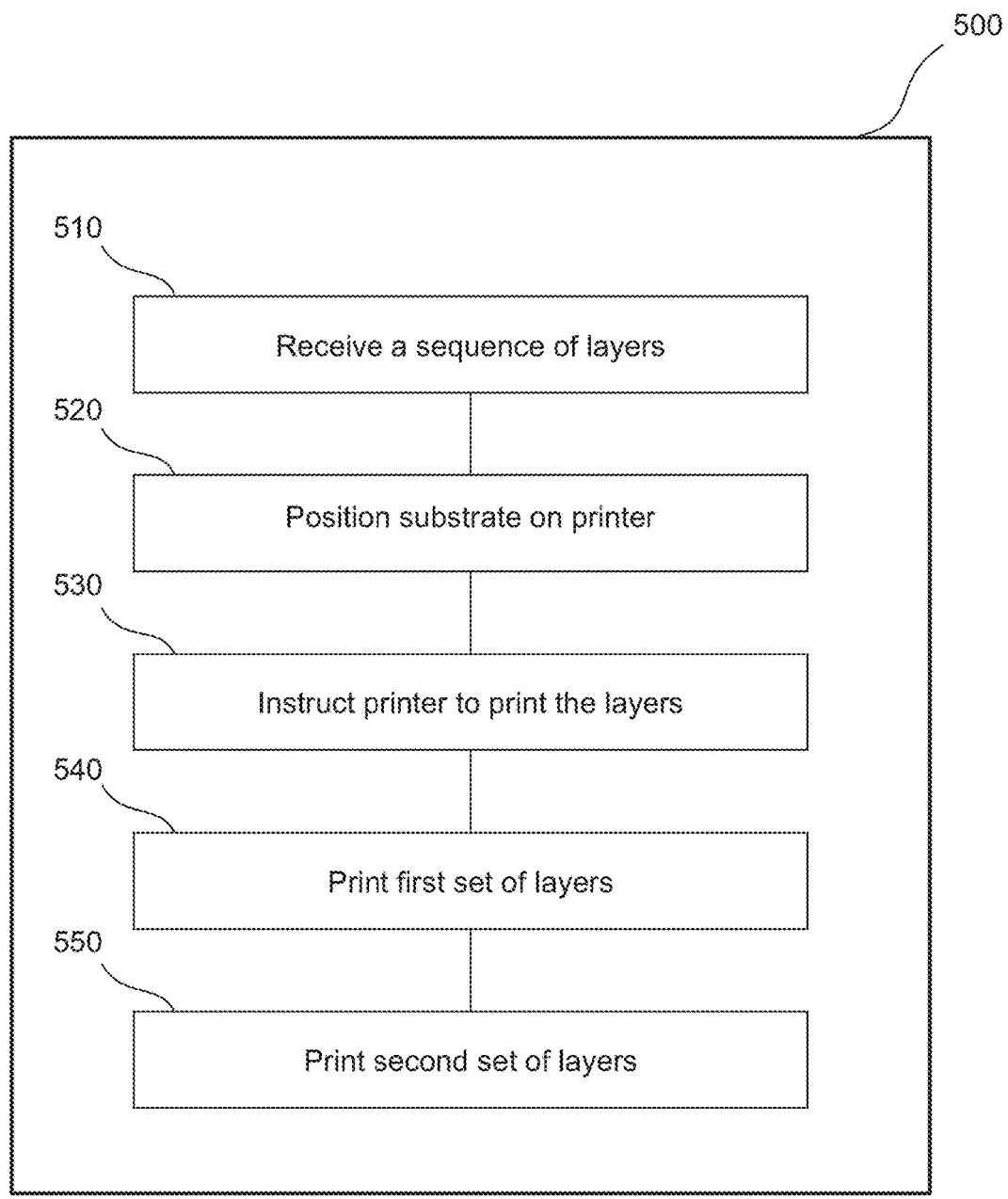
FIG. 14 is an exemplary flowchart illustrating an embodiment of a process for printing multiple layers on a substrate.
Figure 17:
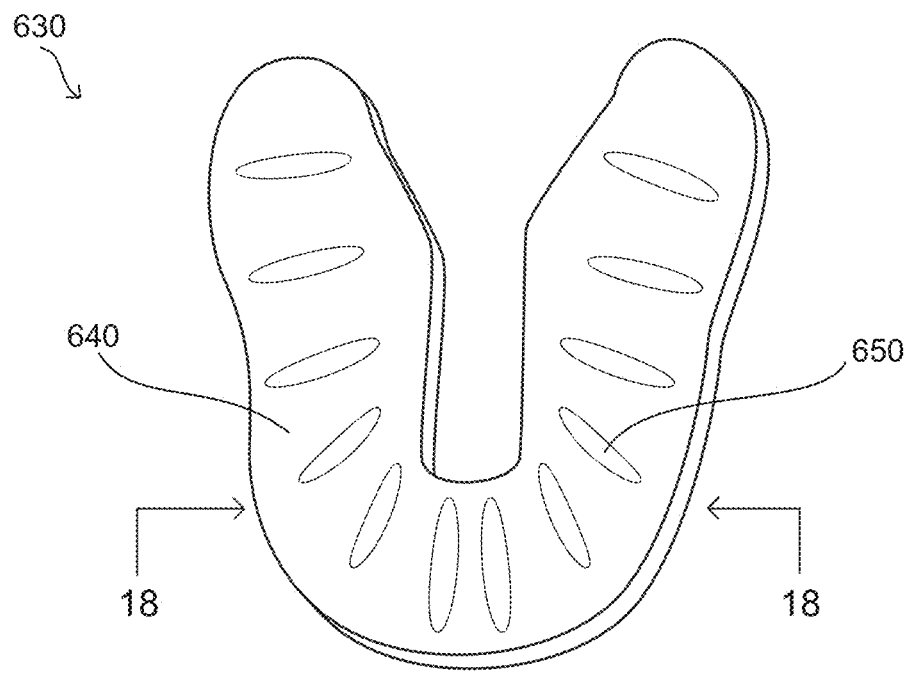
FIG. 17 is a schematic diagram of a plan view of an upper.
Figure 18:
FIG. 18 is a schematic diagram of a cross-sectional view of the upper shown in FIG. 17.

FIG. 14 is exemplary flowchart 500 illustrating another embodiment of a process for depositing multiple layers of material or ink onto a substrate. In this embodiment, the substrate has an uneven surface, and one of the purposes of using the process outlined in exemplary flowchart 500 of FIG. 14 is to produce an article with a flat surface. An example of such a substrate is shown schematically in FIG. 17 and FIG. 18. FIG. 17 is a plan view, and FIG. 18 is a cross-sectional view (taken at arrows 18-18 in FIG. 17) of an upper 630 for an article of footwear. Upper 630 has an uneven top surface because it bears components 650 on its surface 640. Components 650 may be, for example, structural components that control the resilience of upper 630 or provide additional reinforcements to upper 630. Components 650 may also or alternatively be thermochromic components that change color as a function of temperature, for example, as the wearer's foot warms up. Components 650 may also or alternatively be electrochromic components that change color as a function of an applied voltage. In such embodiments, the applied voltage may be supplied by a piezoelectric device that provides a voltage when it is stressed.

Figure 15:
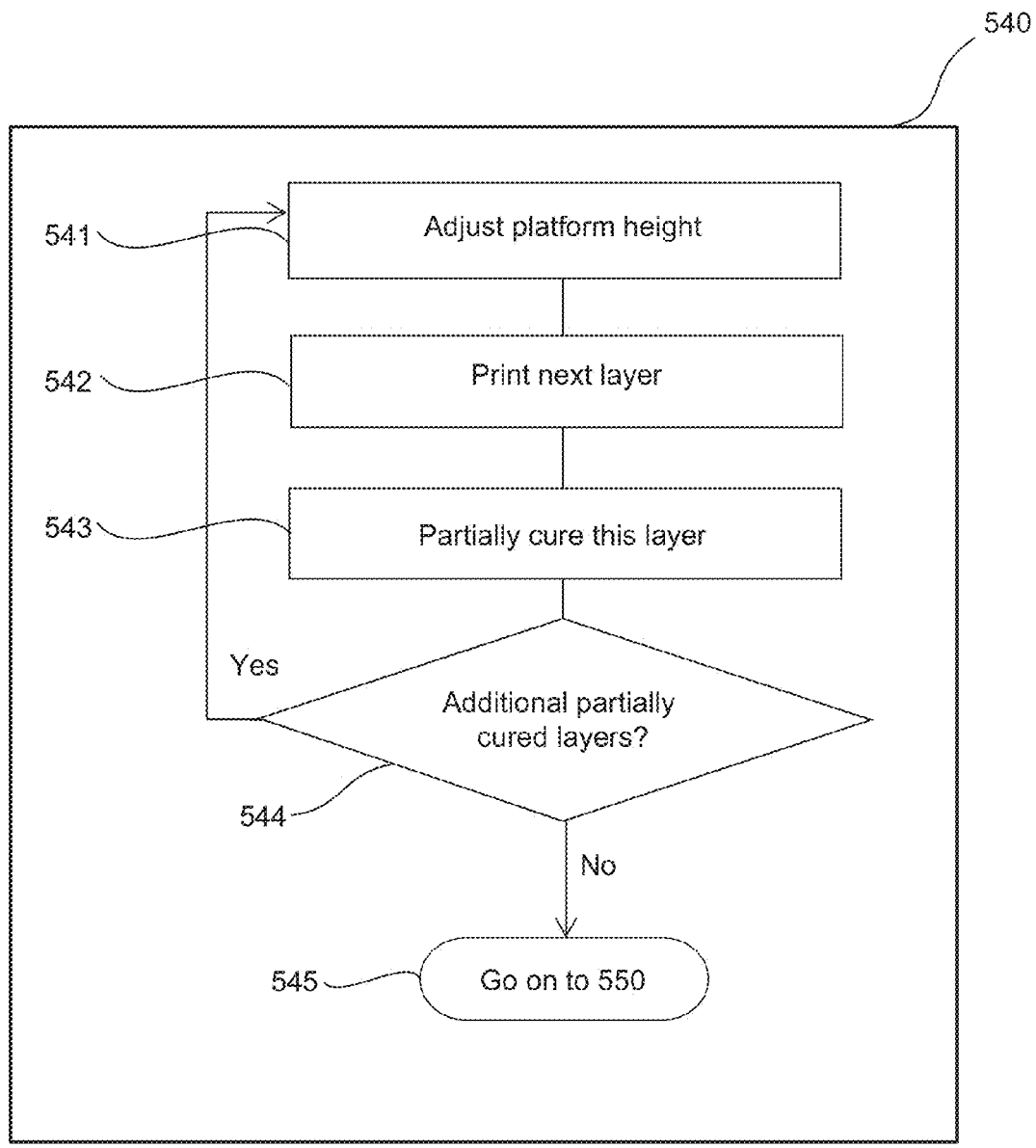
FIG. 15 is an exemplary flowchart illustrating an embodiment of one of the steps shown in the flowchart of FIG. 14.
Figure 19:
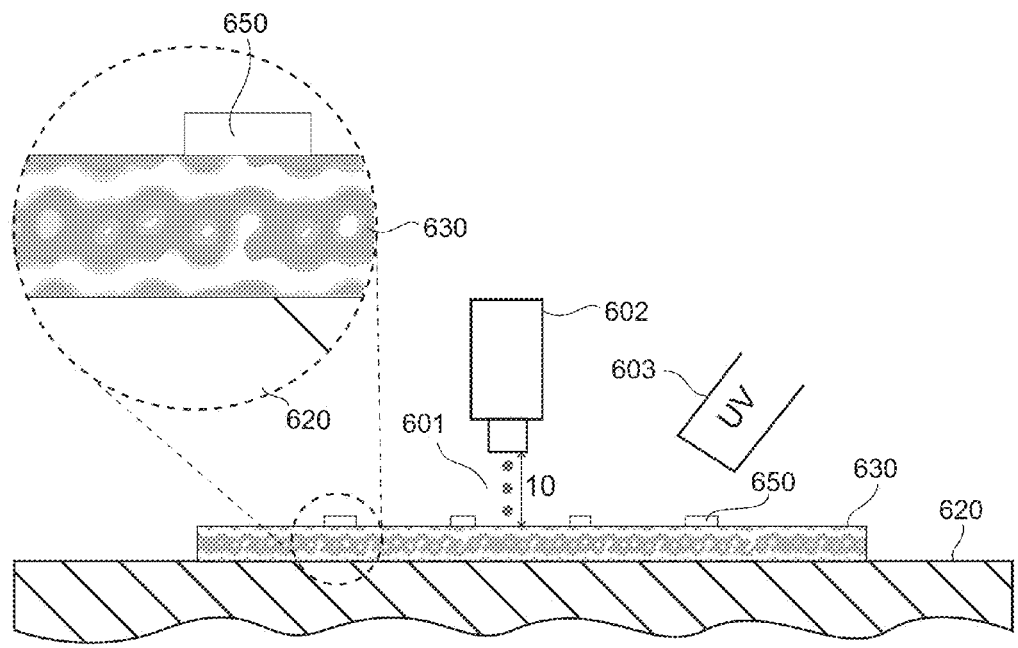
FIG. 19 is a schematic diagram illustrating the operation of one of the steps set forth in the flowcharts of FIGS. 14-16.
Figure 20:
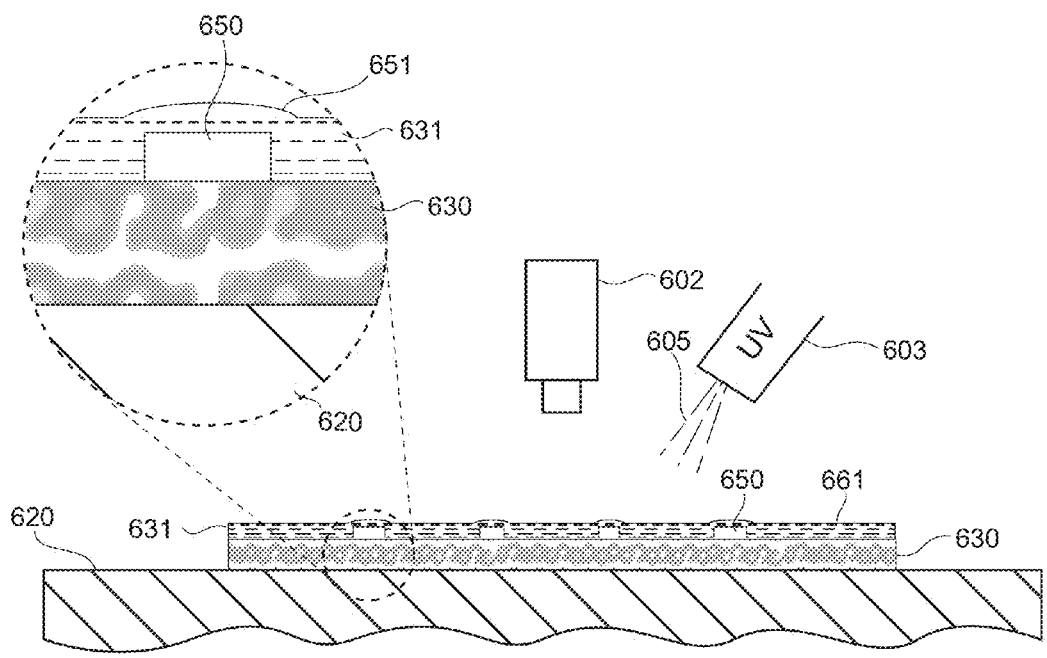
FIG. 20 is a schematic diagram illustrating the operation of another one of the steps set forth in the flowcharts of FIGS. 14-16.
Figure 21:
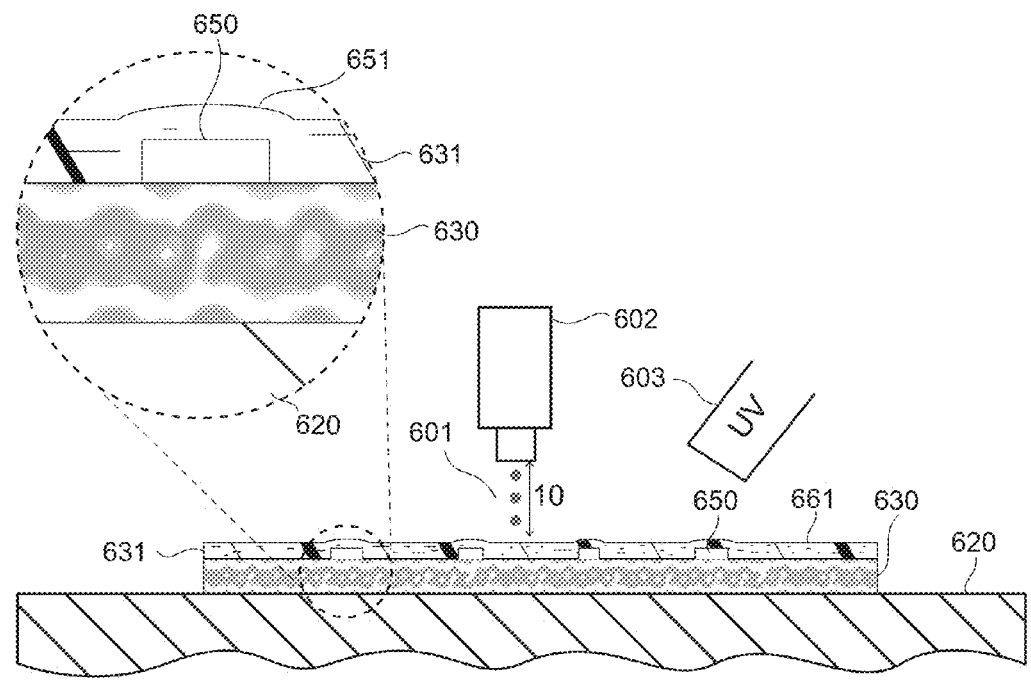
FIG. 21 is a schematic diagram illustrating the operation of another one of the steps set forth in the flowcharts of FIGS. 14-16.
Figure 22:
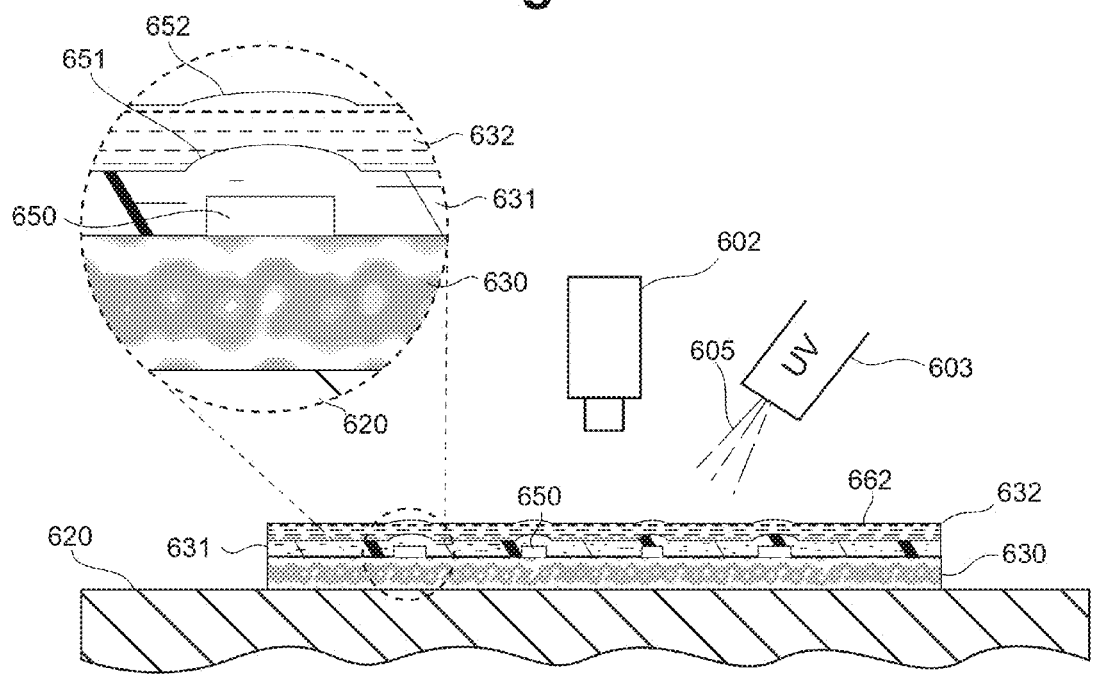
FIG. 22 is a schematic diagram illustrating the operation of another one of the steps set forth in the flowcharts of FIGS. 14-16.
Figure 23:
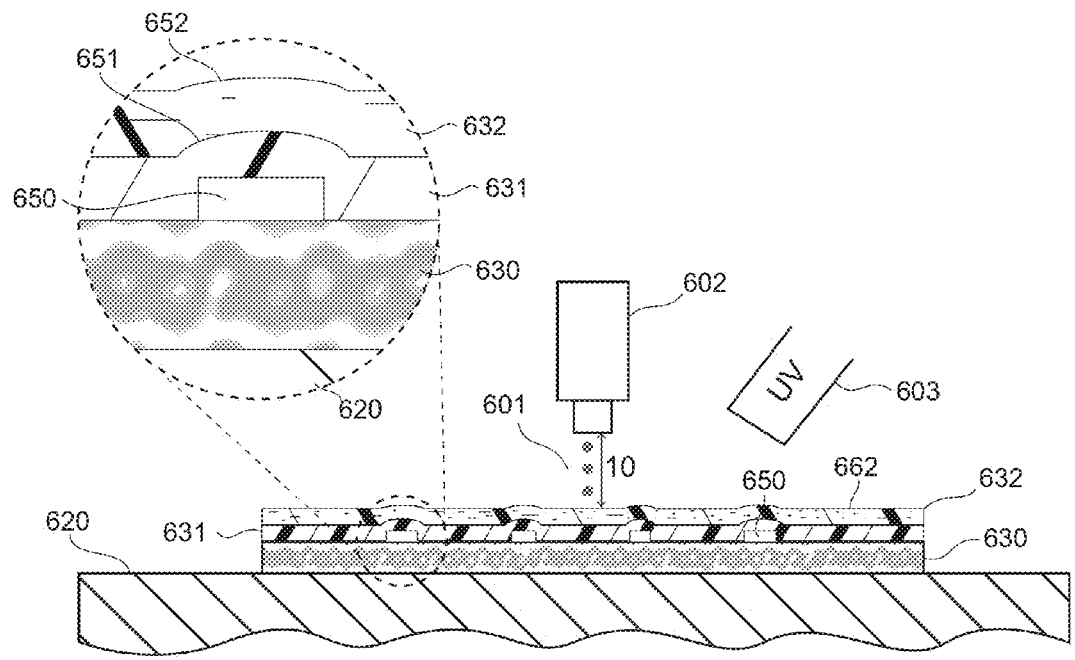
FIG. 23 is a schematic diagram illustrating the operation of another one of the steps set forth in the flowcharts of FIGS. 14-16.
Figure 24:
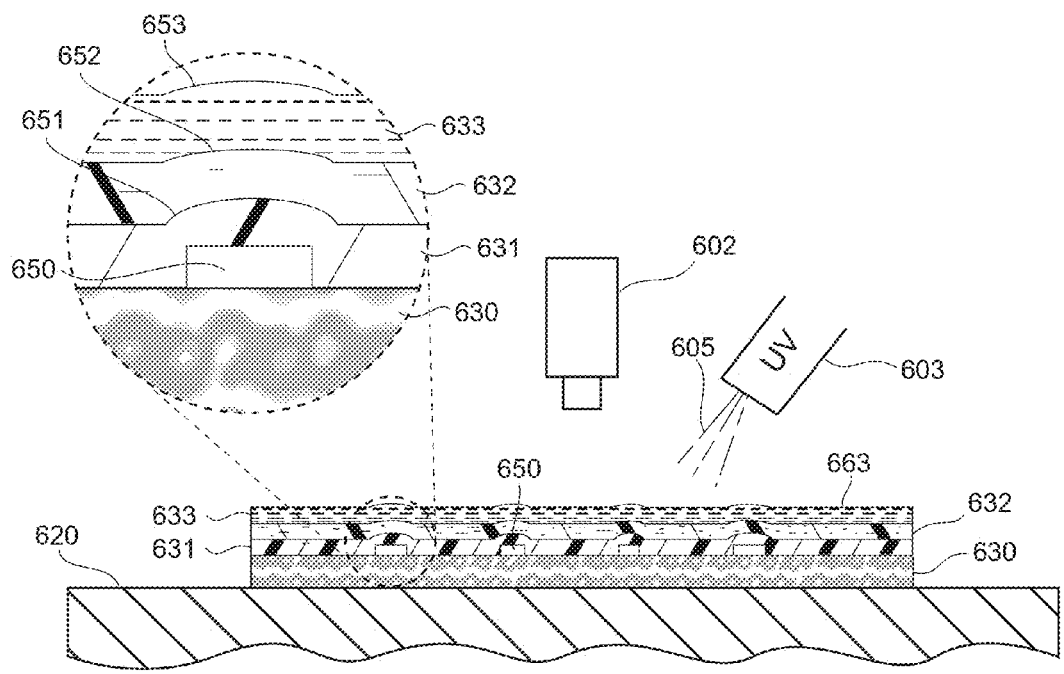
FIG. 24 is a schematic diagram illustrating the operation of another one of the steps set forth in the flowcharts of FIGS. 14-16.
Figure 25:
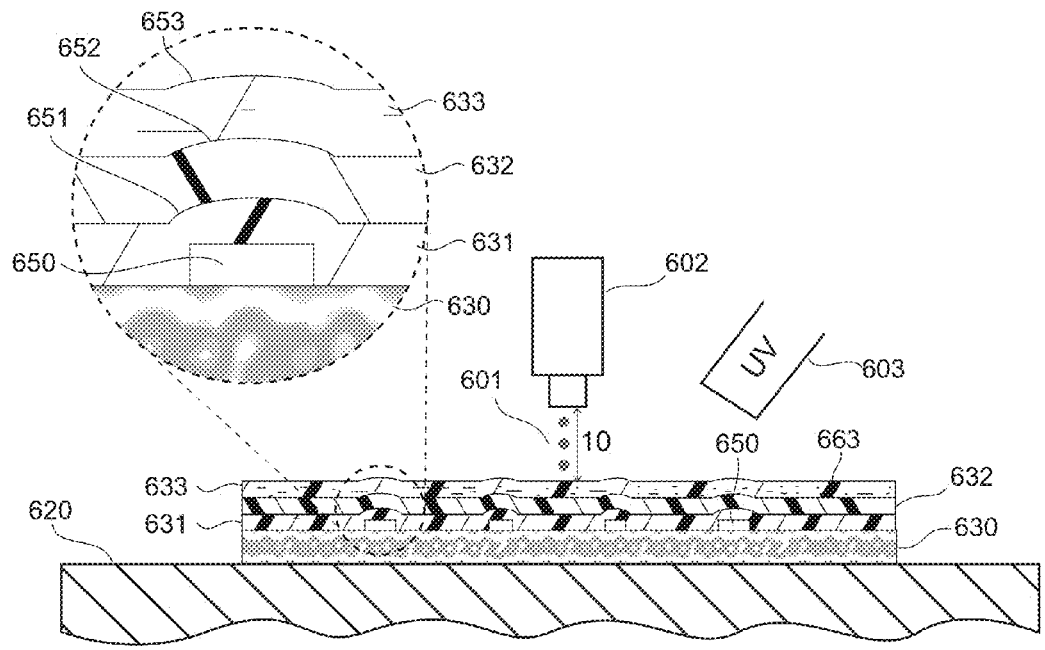
FIG. 25 is a schematic diagram illustrating the operation of another one of the steps set forth in the flowcharts of FIGS. 14-16.
Figure 26:
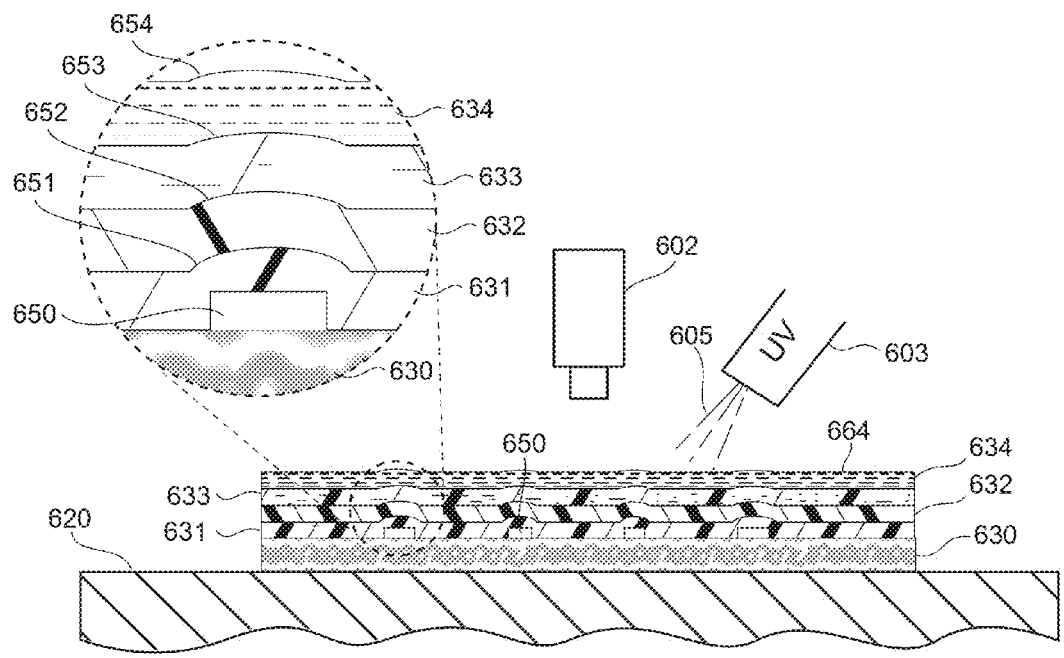
FIG. 26 is a schematic diagram illustrating the operation of another one of the steps set forth in the flowcharts of FIGS. 14-16.

The process shown in exemplary flowchart 500 of FIG. 14, flowchart 540 of FIG. 15, and flowchart 550 of FIG. 16 will be described with reference to FIGS. 19-31. In the embodiment shown in flowchart 500 in FIG. 14, in step 510, a sequence of layers to be printed on a fabric with an uneven top surface is designed and transmitted to a printer such as printer 200 illustrated in FIG. 2. Substrate 630 on which the layers are to be printed is positioned on the printer's platform 620 in step 520 (see FIG. 19). Step 510 and step 520 can be performed in any order, or can be performed simultaneously. In step 530, the printer is instructed to print the sequence of layers that was received in step 510. In step 540, the printer prints a first set of layers, in which the layers are initially only partially cured immediately after they have been printed, as explained below with reference to FIG. 15. An exemplary flowchart illustrating the steps used to print this first set of layers is shown in FIG. 15. In step 550, the printer prints a second set of layers, in which the layers are fully cured in the next step after they have been printed, as explained below with reference to FIG. 16.

FIG. 15 is an exemplary flowchart illustrating the steps that could be used to implement step 540 shown in FIG. 14. These steps may be used to print layers that are only partially cured in the first curing step that is applied after printing. This allows the layers to remain in a viscous state such that they can flow over the uneven surface of the substrate and possibly penetrate into the substrate, for example, when the substrate is a fabric. Because the layers can flow after they have been partially cured, the top surface of each successive layer is less uneven and flatter than the top surface of the previous layer. The layers are eventually fully cured because the radiation used to cure subsequent layers, such as UV radiation, is partially transmitted through one or more layers to complete the cure of underlying layers.

In step 541, which is optional, the height of the platform relative to the print head is adjusted so that height 10 (see FIG. 19) of printer head 602 above the substrate is set to a predetermined height. In the first execution of step 542, first layer 631 is printed on the substrate, by depositing drops 601 of material ejected from printer head 602 onto substrate 630, as shown schematically in FIG. 19 and FIG. 20. During the printing and immediately after this first layer has been printed, the ink or other printable material flows down from any high points in the underlying surface to pool down at the low points. In step 543, layer 631 is partially cured. In the embodiment shown schematically in FIG. 20, first layer 631 is partially cured by exposing first layer 631 to UV rays 605 for a first predetermined radiation event, such as exposure to UV rays 605 from UV radiation source 603, as shown schematically in FIG. 20. For example, first layer 631 may be exposed to UV radiation at 1,000 lumens for 0.05 seconds.

In step 544, the printer determines that it has been instructed to print additional layers that will initially be partially cured. The process then returns to step 541 (which may be optional), and the height of the platform is adjusted such that the height of the printer head above the top surface of first layer 631 is at the predetermined height 10. In step 542, second layer 632 is printed over first layer 631, as shown schematically in FIG. 21 and FIG. 22. In this second execution of step 542, drops 601 of material are ejected from printer head 602 and deposited over first layer 631, as shown schematically in FIG. 21. During the printing and immediately after this layer has been printed, the ink or other printable material flows down from any high points in the underlying surface to pool down at the low points.

Second layer 632 is partially transparent to UV, such that some of UV rays 605 are transmitted through second layer 632 to fully cure first layer 631. In some embodiments, the second predetermined exposure is selected so as to fully cure both first layer 631 and second layer 632. In those embodiments, although top surface 661 of first layer 631 may not be completely flat—it may have some bumps, such as bumps 651 in top surface 661 shown schematically in FIG. 20 over components 650—that surface is sufficiently smooth such that the ink or other printable material used to print second layer 632 may flow down into the slight depressions in first layer 631 to produce a layer that may have a flat top surface. In those embodiments, the top surface can serve as a reference plane for subsequent processing steps.

In other embodiments, additional layers that are initially only partially cured may need to be printed before a flat top surface is achieved. At each printing step, the ink or other material has sufficient fluidity such that it may flow down and pool in lower points in the underlying surface. Thus, as shown schematically in FIG. 22 and FIG. 23, top surface 662 (identified in the main drawing) of second layer 632 has bumps 652 (identified in the blowup) over components 650. The additional layers in those embodiments are performed by executing steps 541 through 544 in flowchart 540, and are illustrated in FIGS. 23-26. Thus, in the third execution of step 541 (which is optional), the platform height is adjusted to maintain height 10 of the printer head above the top surface of second layer 632 to its predetermined height. Third layer 633 of material may then be printed over second layer 632, as shown schematically in FIG. 23 and FIG. 24. In the third execution of step 543, third layer 633 is then partially cured by exposing third layer 633 to UV rays 605 from UV radiation source 603 for a third predetermined radiation event, which may only be sufficient to partially cure third layer 633. The third predetermined radiation event may be the same as or may be different from the first predetermined radiation event or the second predetermined radiation event.

In the fourth execution of step 541 (which is optional), the platform height is adjusted to maintain height 10 of the printer head above the top surface of third layer 633. Fourth layer 634 of material may then be printed over third layer 633, as shown schematically in FIG. 25 and FIG. 26. As shown schematically in FIG. 24 and FIG. 25, top surface 663 of third layer 633 has bumps 653 over components 650. In the fourth execution of step 543, fourth layer 634 is then partially cured by exposing fourth layer 634 to UV rays 605 from UV radiation source 603 for a fourth predetermined radiation event, which may only be sufficient to partially cure fourth layer 634. The fourth predetermined radiation event may be the same as or may be different from the first predetermined radiation event, the second predetermined radiation event, or third predetermined radiation event.

In this example, after fourth layer 634 has been partially cured, the printer determined in step 544 that it has not been instructed to print any additional partially cured layers. As shown schematically in FIG. 26 and FIG. 27, top surface 664 of fourth layer 634 in its viscous state has barely perceptible bumps 654. The printer then proceeds to perform the steps shown schematically in flowchart 550, which is shown schematically in FIG. 16, in which each layer is fully cured in the next step after it has been deposited on the previous layer. The steps of flowchart 550 are illustrated in FIGS. 27-30.

Figure 27:
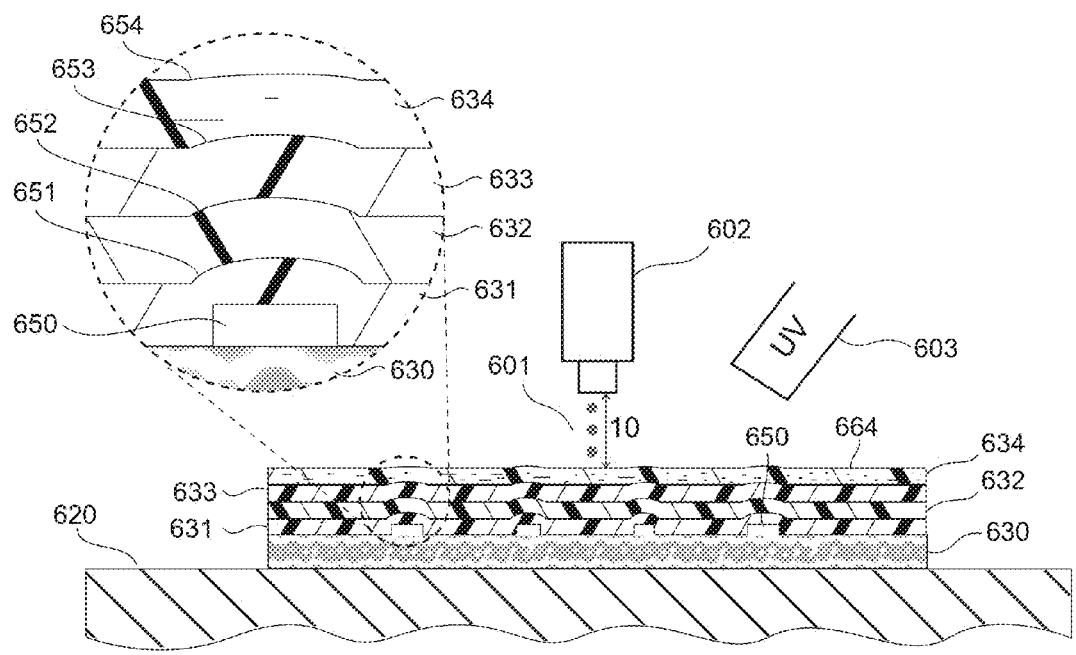
FIG. 27 is a schematic diagram illustrating the operation of another one of the steps set forth in the flowcharts of FIGS. 14-16.
Figure 28:
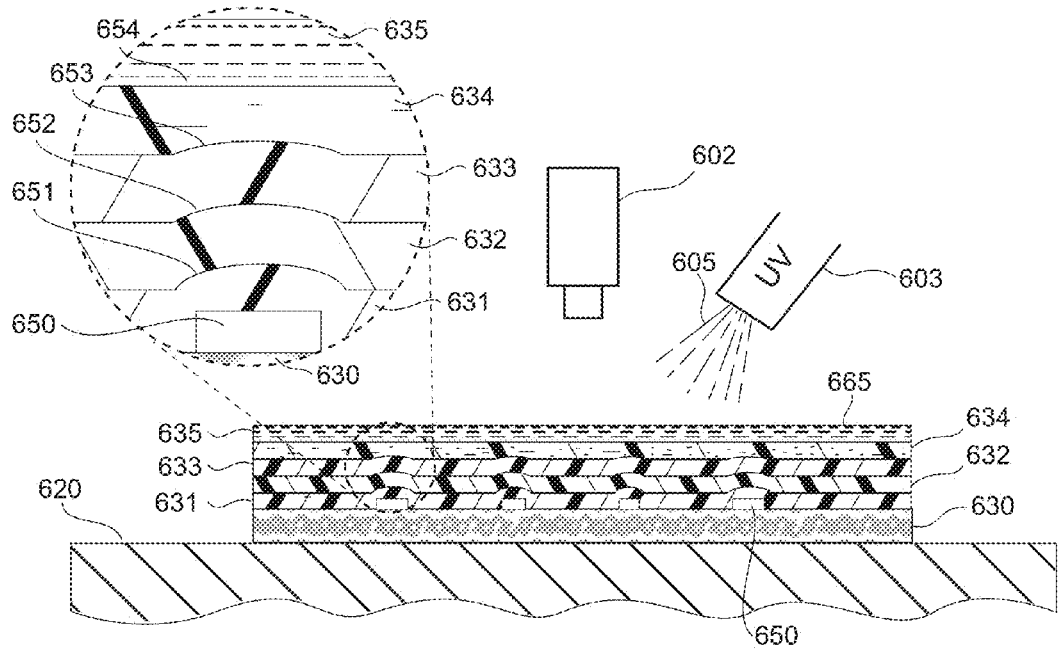
FIG. 28 is a schematic diagram illustrating the operation of another one of the steps set forth in the flowcharts of FIGS. 14-16.
Figure 31:
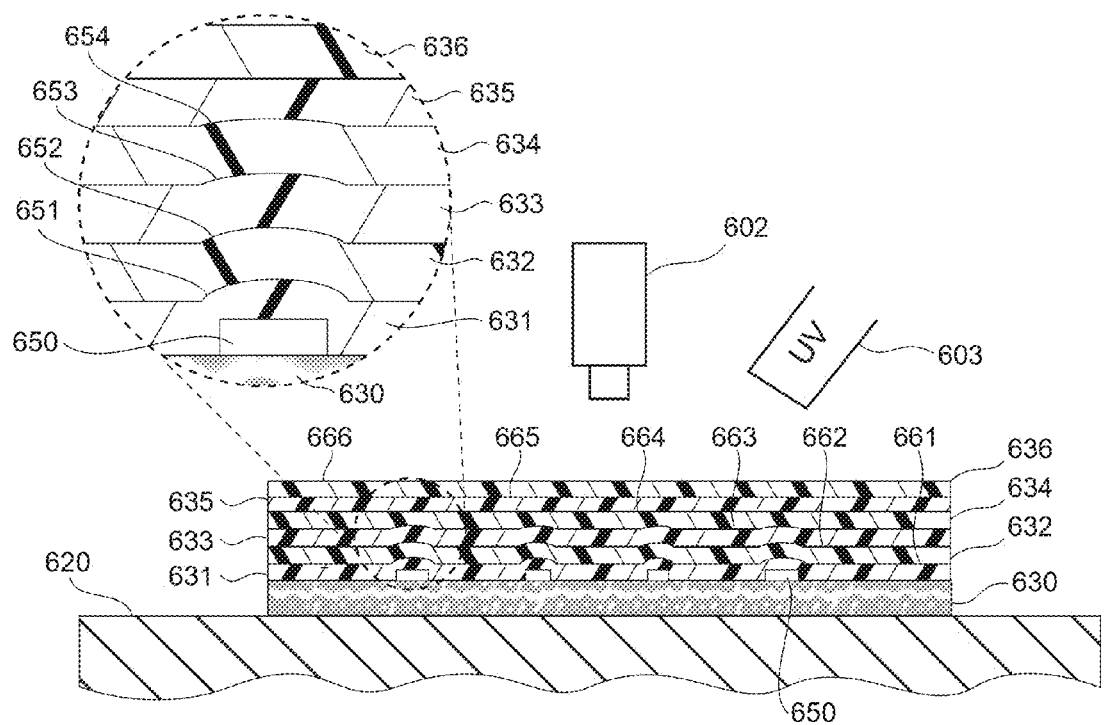
FIG. 31 is a schematic diagram of a cross section of a substrate bearing multiple fully cured printed-on layers of material produced according to the process outlined in the flowcharts of FIGS. 14-16.

Thus, FIG. 27 and FIG. 28 show fifth layer 635 being deposited over fourth layer 634. In FIG. 27, fourth layer 634 is in a viscous state, and its top surface 664 still has almost imperceptible bumps 654. In FIG. 28, fifth layer 635 is subjected to a fifth predetermined radiation event. In this embodiment, the fifth radiation event is exposure to UV rays 605 from UV radiation source 603 for a predetermined duration at a predetermined intensity that is sufficient to fully cure fifth layer 635 (which has a flat top surface 665, as shown in FIG. 28 and FIG. 31) and complete the cure of fourth layer 634. Because in this step the UV rays are sufficiently intense and/or are emitted for a sufficiently long time to fully cure fifth layer 635, FIG. 28 shows six rays emanating from UV radiation source 603, instead of the three rays shown schematically in FIG. 26, for example. By the time the step of printing fifth layer 635 is completed, the almost imperceptible bumps shown schematically in FIG. 27 have disappeared, such that the top surface of fourth layer 634 is flat, such that it could serve as a reference layer for subsequent processes. Thus, as it is deposited, fifth layer 635 also has a flat top surface, as shown schematically in FIG. 28.

Figure 29:
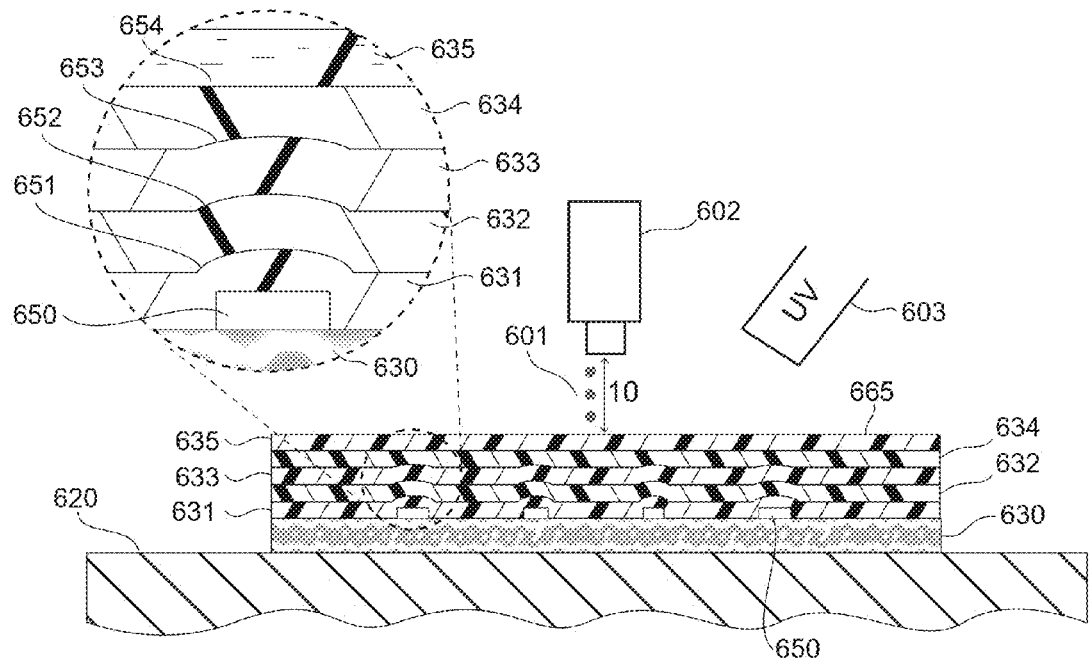
FIG. 29 is a schematic diagram illustrating the operation of another one of the steps set forth in the flowcharts of FIGS. 14-16.
Figure 30:
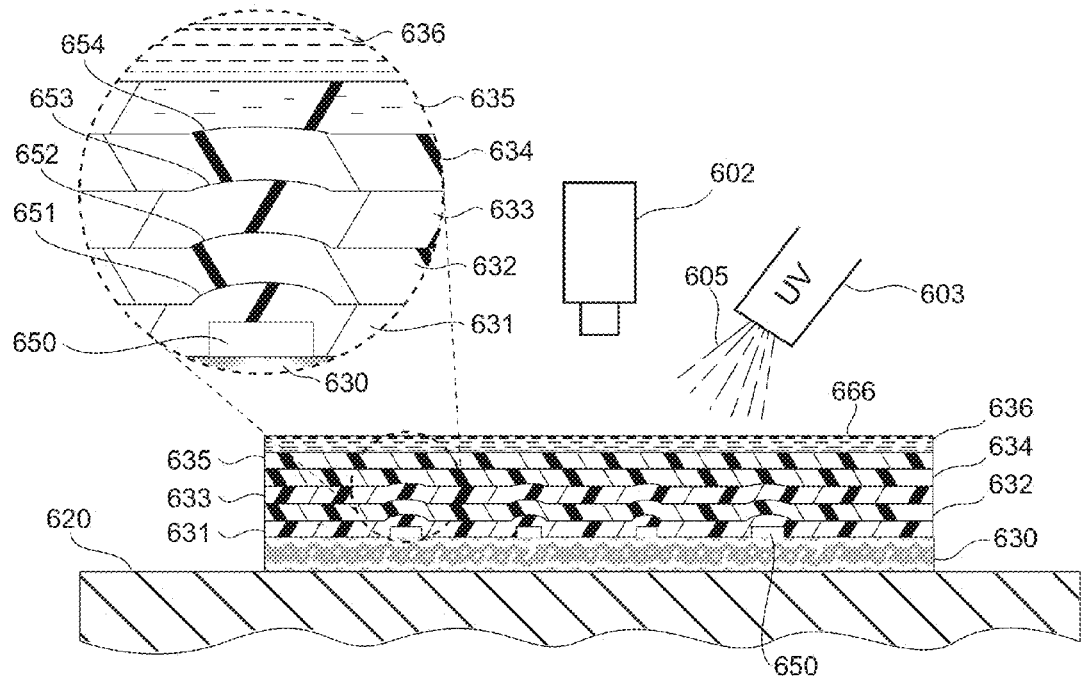
FIG. 30 is a schematic diagram illustrating the operation of another one of the steps set forth in the flowcharts of FIGS. 14-16.

FIGS. 29 and 30 illustrate the deposition and curing of sixth layer 636 in step 552 of flowchart 500 that is fully cured in step 553 of flowchart 500.

Figure 16:
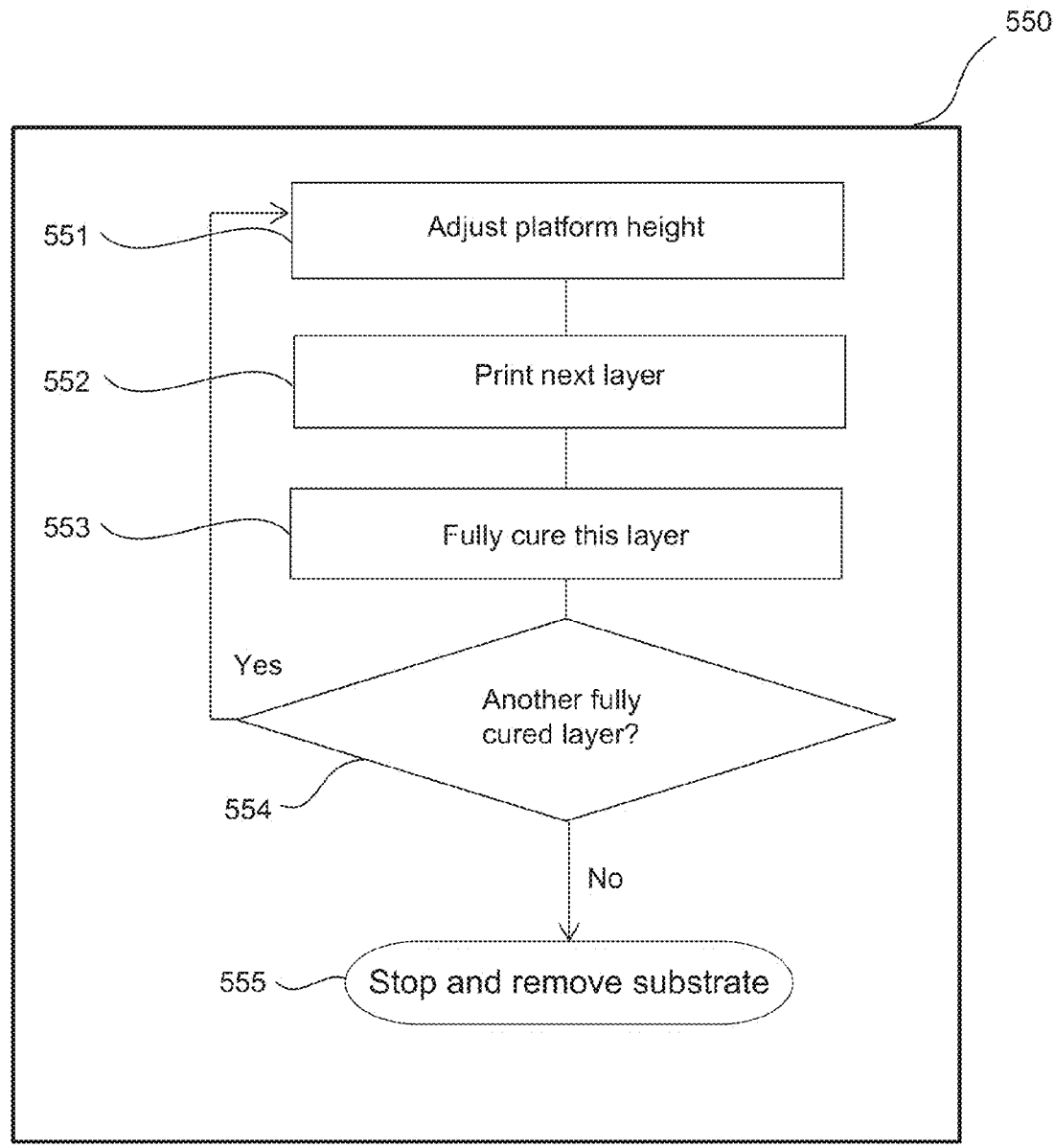
FIG. 16 is an exemplary flowchart illustrating an embodiment of another one of the steps shown in the flowchart of FIG. 14.

FIG. 31 shows the final structure produced by an embodiment of the process described in the flowcharts of FIGS. 14-16. As best shown in the blowup in FIG. 31, bumps 653 at top surface 663 of third layer 633 are smaller than bumps 652 in top surface 662 of second layer 632, which in turn are smaller than bumps 651 in top surface 661 of first layer 631. Fourth layer 634, fifth layer 635, and sixth layer 636 have flat top surfaces.

The flatness of the top layer obtained by applying the process outlined in exemplary flowchart 500, flowchart 540, and flowchart 550 may be specified in several ways. For example, if the substrate prior to the application of structures such as components 650 shown schematically in FIG. 17 and FIG. 18 is initially flat, the top surface of the top layer, such as surface 666 of sixth layer 636 shown schematically in FIG. 31 after deposition of all the layers, may be specified to be at least as flat as the top surface of the substrate was before the application of any components. In other cases, one of the objects of applying layers to the substrate may be to improve the flatness or smoothness of the final product. In that case, the desired flatness may be specified as having a maximum deviation of, for example, less than 20 nm, or less than 10 nm. The desired flatness may also be specified in other ways, for example, by defining a "best fit" plane and requiring that all surface points must lie between two planes that are parallel to this plane, and are within 10 nm on either side of the best fit plane.

The flatness of the top surface may be measured by any one of several known methods, such as a dial micrometer, stylus profilometer, height gauge, or contact profilometer, which are appropriate to the dimensions and surface characteristics of the layer. Optical techniques may also be used with top layers that have the appropriate optical characteristics. For example, techniques that may be used include using a coordinate measuring machine (CMM), using an optical profilometer, using an optical flat with a monochromatic light source, and measuring interference patterns. Other techniques may also be used.

Figure 32:
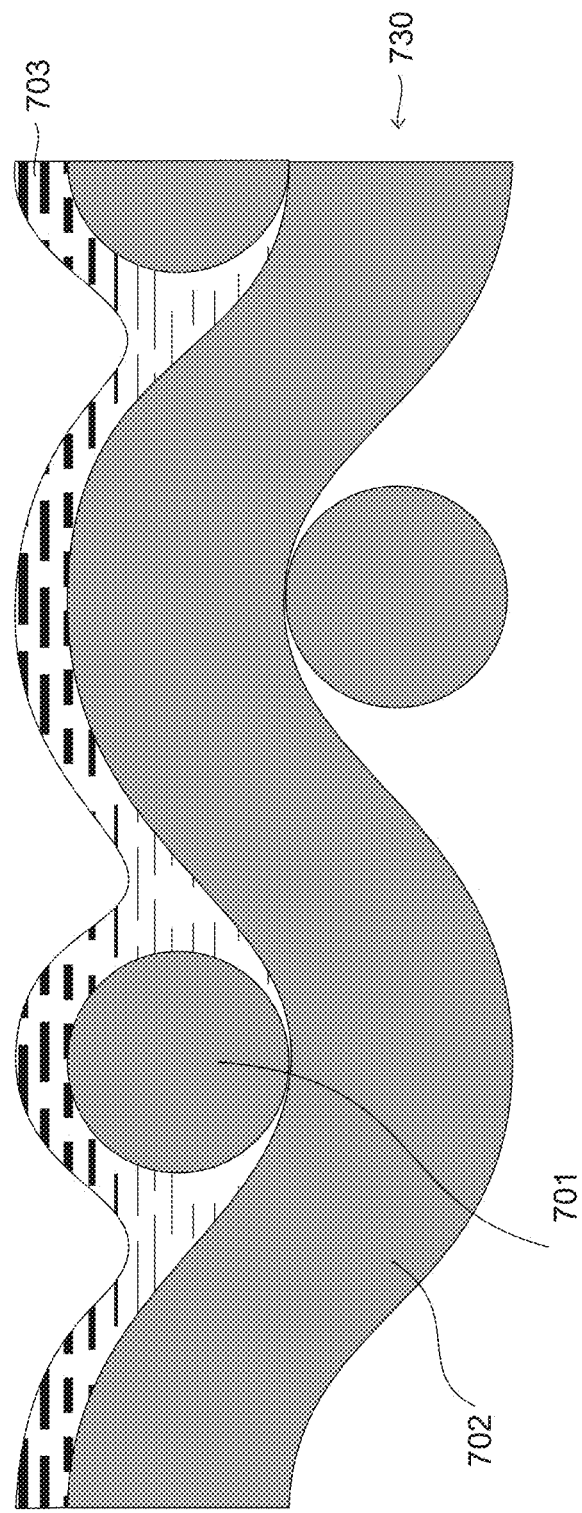
FIG. 32 is a schematic diagram of a cross-sectional view of a fabric on which a first layer of material has been printed.
Figure 33:
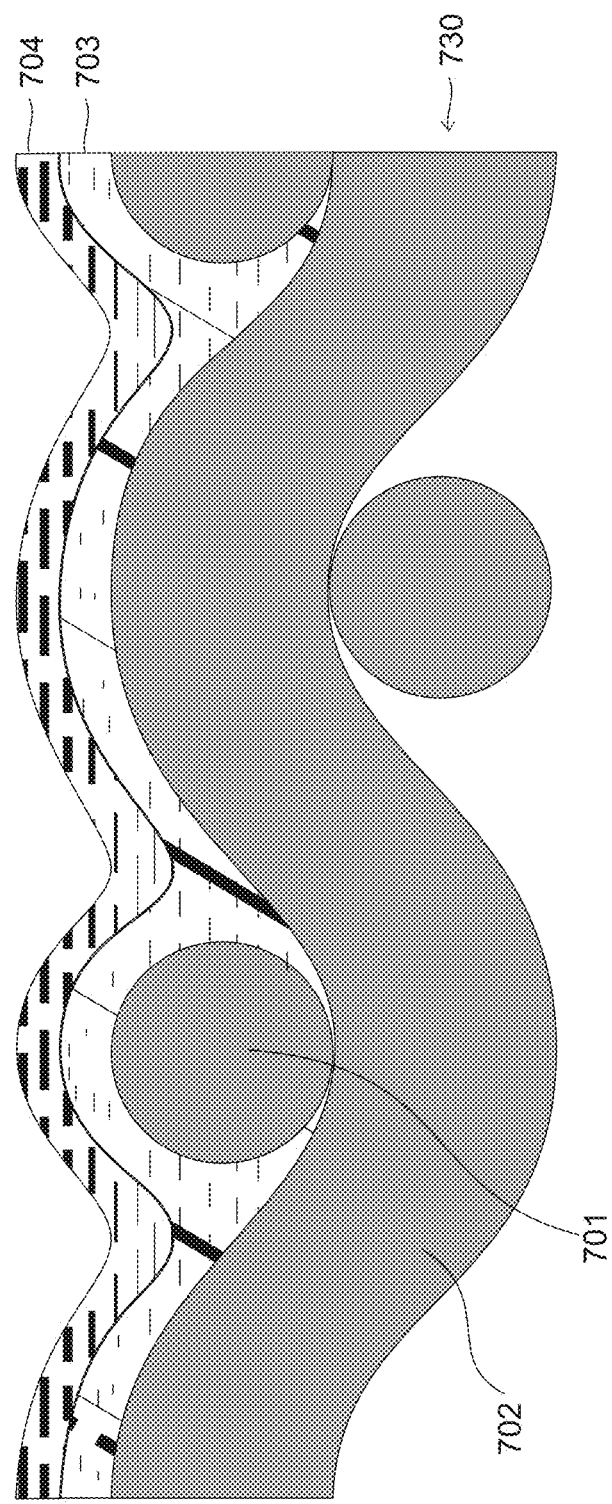
FIG. 33 is a schematic diagram of a cross-sectional view of a fabric on which two layers of material have been printed.

FIGS. 32-43 illustrate the application of a process generally similar to the process shown in the flowcharts of FIGS. 14-16 to woven fabric 730. In the embodiments used to fabricate the structures shown schematically in FIGS. 32-43, the layers may be cured using a UV radiation source and exposing the layers to the UV radiation for predetermined durations at a predetermined intensity. Fabric 730 has strands 701 oriented in a first direction and strands 702 oriented in a second direction that is perpendicular to the first direction, such that the strands interlace with each other to form the woven fabric. FIG. 32 shows a cross section of the fabric and first layer 703 after step 542 of FIG. 15 has been executed for the first time to print first layer 703 on fabric 730. At this point, first layer 703 is liquid, as shown by the dashed shading in FIG. 32. Because first layer 703 is liquid, it may flow down from any high points in the underlying fabric to low points in that fabric, resulting in a top surface for first layer 703 that is flatter than the surface of the underlying fabric. In some cases, the ink or other printable material used to form first layer 703 may be absorbed to some extent in strands 703 and strand 704. FIG. 33 shows a cross section of the fabric and the first two layers after first layer 703 has been partially cured and second layer 704 has just been printed on first layer 703. Because first layer 703 has been partially cured, it is shown with both diagonal stripes and dashed lines, indicating that it is at an intermediate stage between being liquid (only dashed lines) and solid (only diagonal stripes). Because first layer 703 has only been subjected to UV radiation one time such that it was only lightly cured, the cross-hatching in FIG. 33 has a predominance of horizontal dashed lines compared to the number of diagonal stripes, indicating that it has only been lightly cured.

Figure 35:
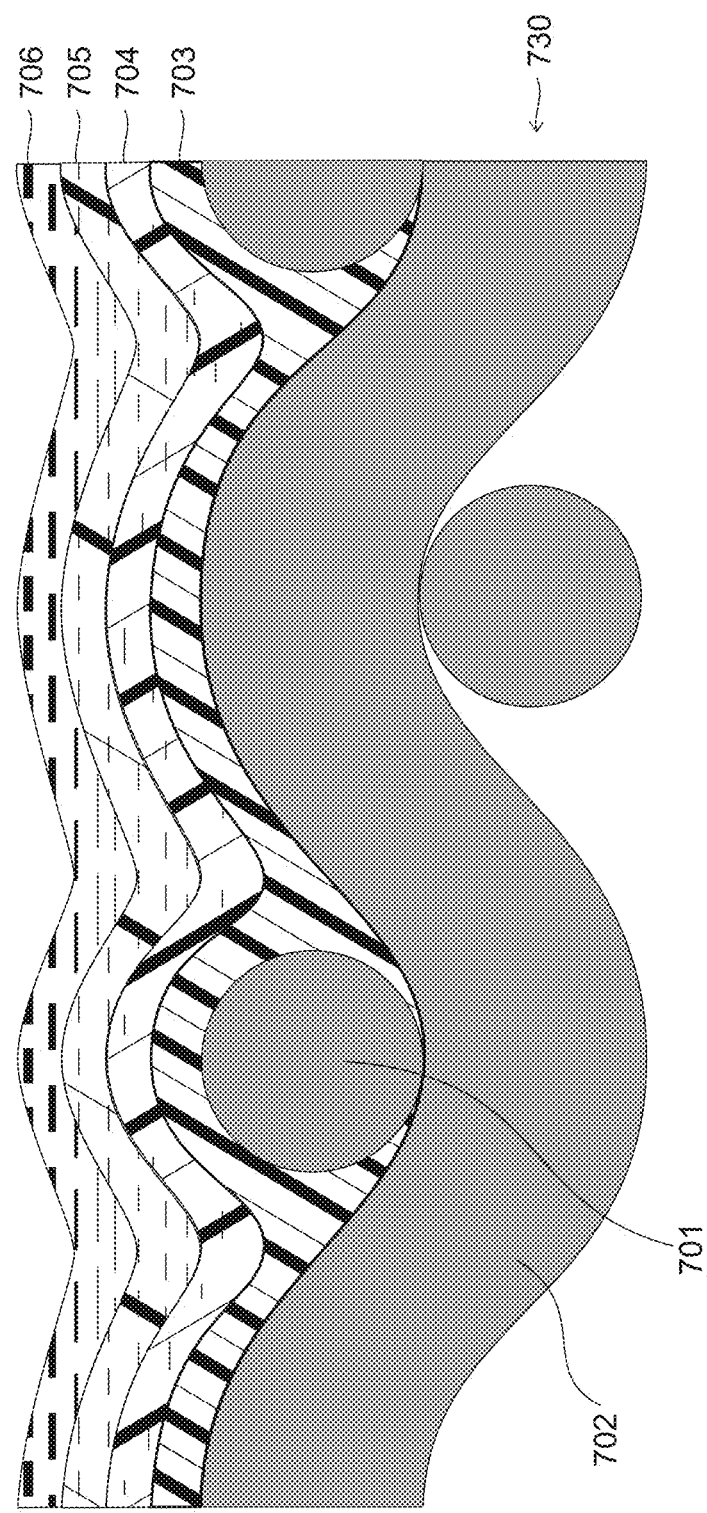
FIG. 35 is a schematic diagram of a cross-sectional view of a fabric on which four layers of material have been printed.

FIG. 35, for example, may be used to establish the shading conventions used in these figures. Thus, fourth layer 706, which was just printed and is still liquid, has dashed horizontal lines to illustrate its liquid state. Third layer 705, which was only lightly cured, has a combination of dashed lines and diagonal stripes, with the dashed lines being predominant. Second layer 704, which was more heavily cured, has a combination of dashed lines and diagonal stripes, with the diagonal stripes being predominant. First layer 703, is fully cured, as shown by the exclusive use of diagonal stripes in first layer 703.

Figure 34:
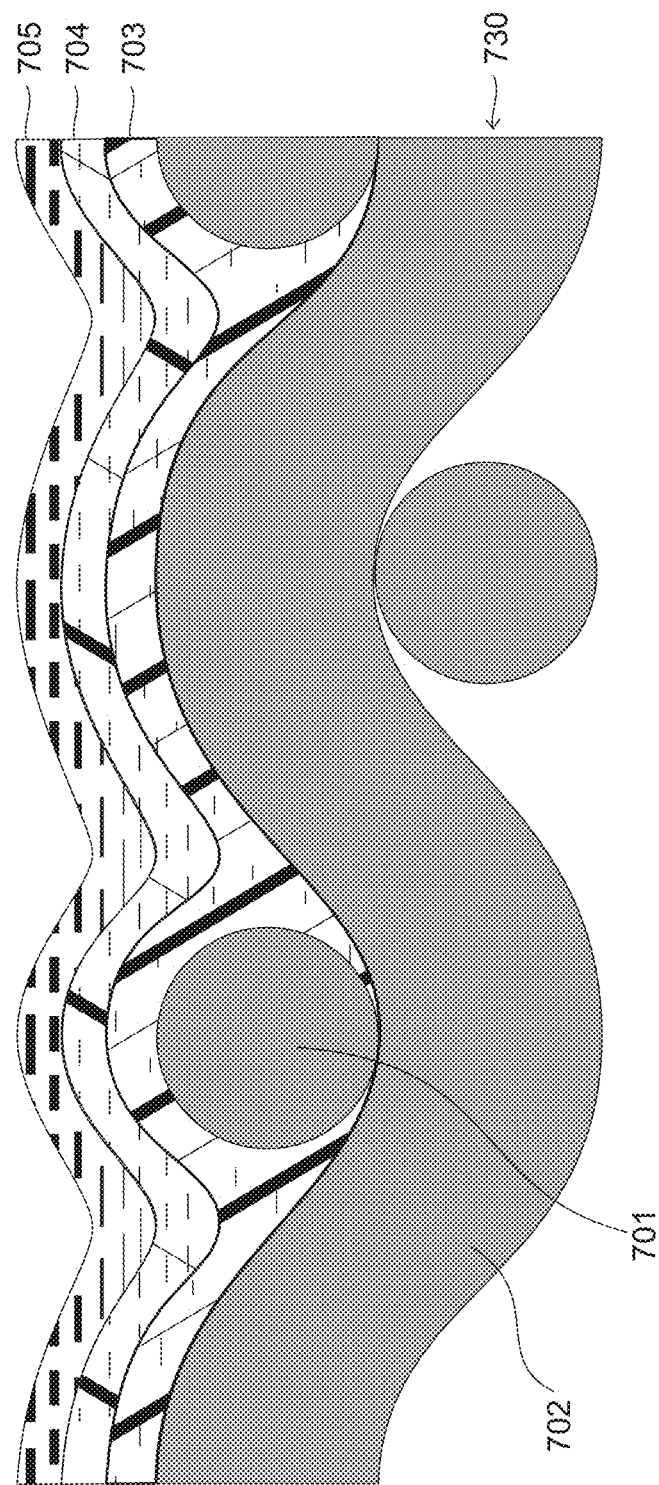
FIG. 34 is a schematic diagram of a cross-sectional view of a fabric on which three layers of material have been printed.

FIG. 34 shows a cross section of fabric 730, first layer 703, second layer 704, and third layer 705 after step 542 of FIG. 15 has been executed for the third time to print third layer 705 on second layer 704. Because third layer 705 has not yet been cured, it is shown as a liquid layer in FIG. 34. Second layer 704 is shown with as having only been lightly cured, because it has only been partially cured once. Because first layer 703 has been exposed to UV radiation twice, it is more heavily cured than second layer 704. This is shown by the greater density of diagonal stripes in first layer 703 compared to second layer 704.

FIG. 35 shows a cross section of fabric 730, first layer 703, second layer 704, third layer 705, and fourth layer 706 after step 542 of FIG. 15 has been executed for the fourth time to print fourth layer 706 on third layer 705. In FIG. 35, fourth layer 706 is liquid, as shown by the dashed lines, because it has not yet been exposed to UV radiation. Third layer 705 is lightly cured because it has been exposed to UV radiation only once. Second layer 704 is more heavily cured, because it has been exposed to UV radiation twice, once directly after it was initially printed, and then a second time by exposure to UV radiation transmitted through third layer 705 while third layer 705 was being cured. First layer 703 is now fully cured, as indicated by the greater density of diagonal stripes in first layer 703 and by the absence of any horizontal dashed lines in first layer 703 in FIG. 35.

Figure 36:
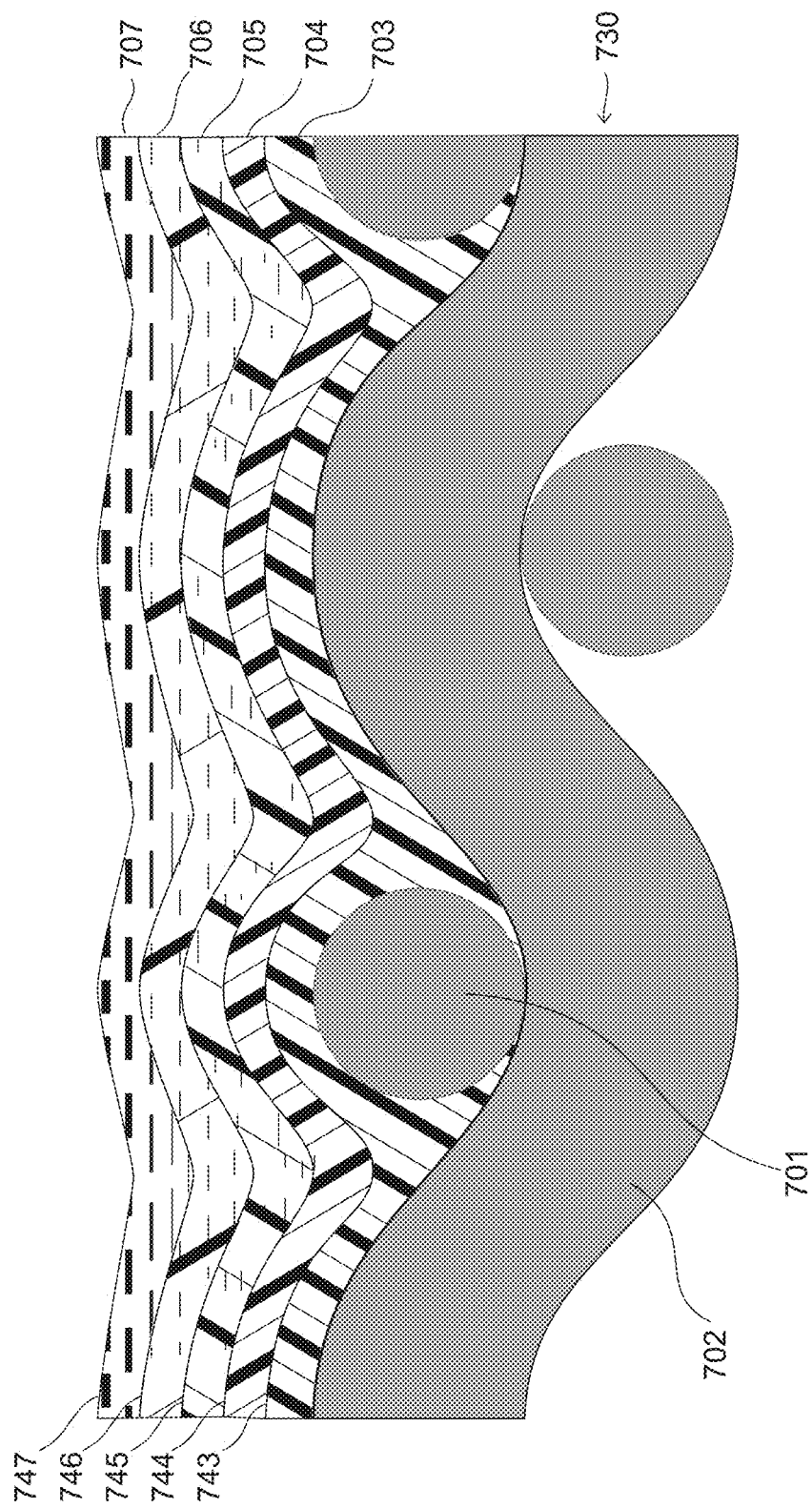
FIG. 36 is a schematic diagram of a cross-sectional view of a fabric on which five layers of material have been printed.

FIG. 36 shows a cross section of fabric 730, first layer 703, second layer 704, third layer 705, fourth layer 706, and fifth layer 707 after step 542 of FIG. 15 has been executed for the fifth time to print fifth layer 707 on fourth layer 706. In this cross section, first layer 703 and second layer 704 have been exposed to UV radiation three or more times, and are fully cured, as indicated by the exclusive use of striped diagonal lines in first layer 703 and second layer 704. Third layer 705 has been heavily cured by two exposures to UV radiation, and fourth layer 706 has been lightly cured by a single exposure to UV radiation. Fifth layer 707 is liquid, because it has not yet been cured.

Figure 37:
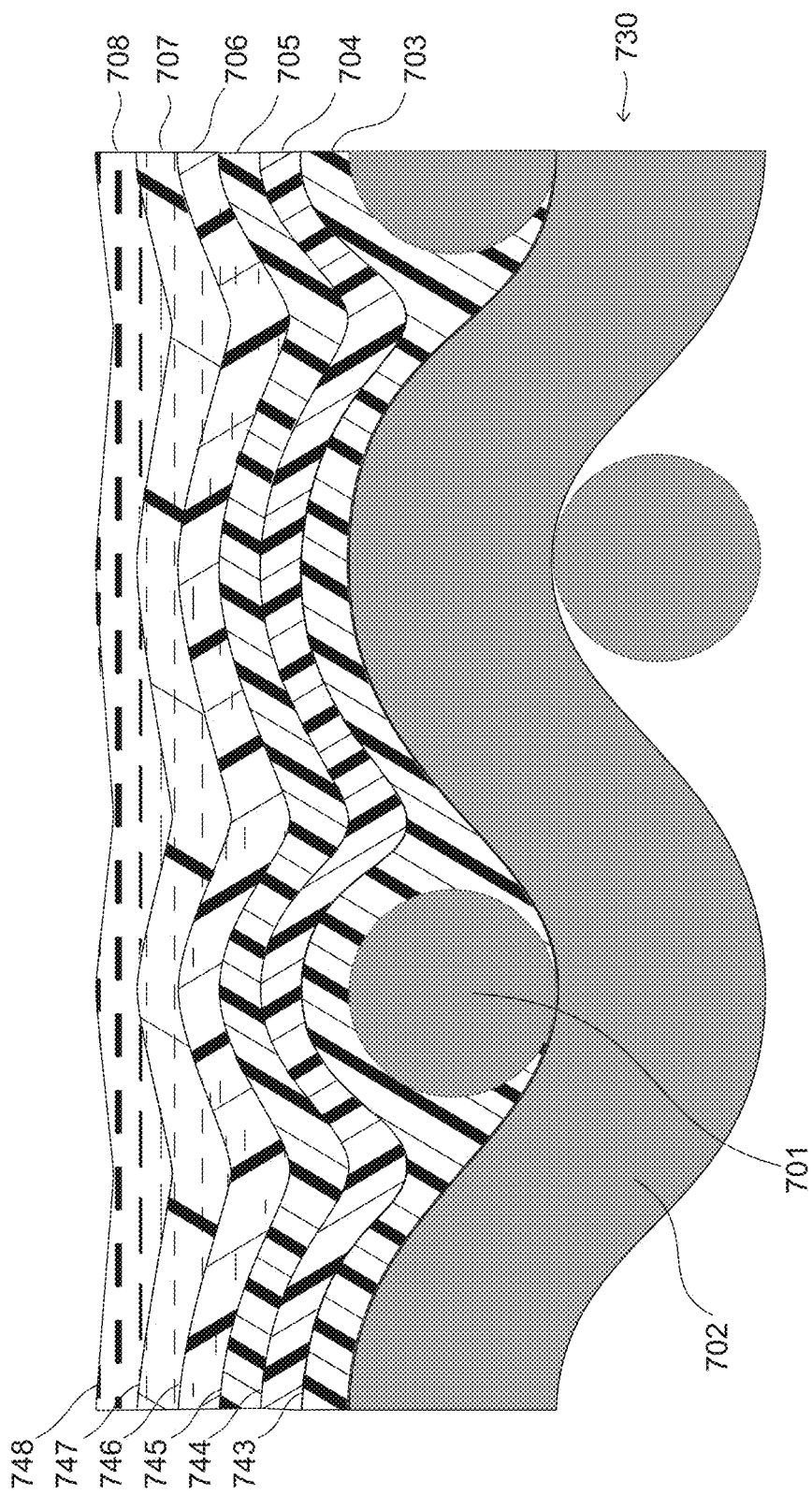
FIG. 37 is a schematic diagram of a cross-sectional view of a fabric on which six layers of material have been printed.

FIG. 37 shows a cross section of fabric 730, first layer 703, second layer 704, third layer 705, fourth layer 706, fifth layer 707, and sixth layer 708 after step 542 of FIG. 15 has been executed for the sixth time to print sixth layer 708 on fifth layer 707. In this cross section, first layer 703, second layer 704, and third layer 705 have been exposed to UV radiation three or more times, and are fully cured, as indicated by the exclusive use of striped diagonal lines in first layer 703, second layer 704, and third layer 705. Fourth layer 706 has been heavily cured by two exposures to UV radiation, and fifth layer 707 has been lightly cured by a single exposure to UV radiation. Sixth layer 708 is liquid, because it has not yet been cured.

Figure 38:
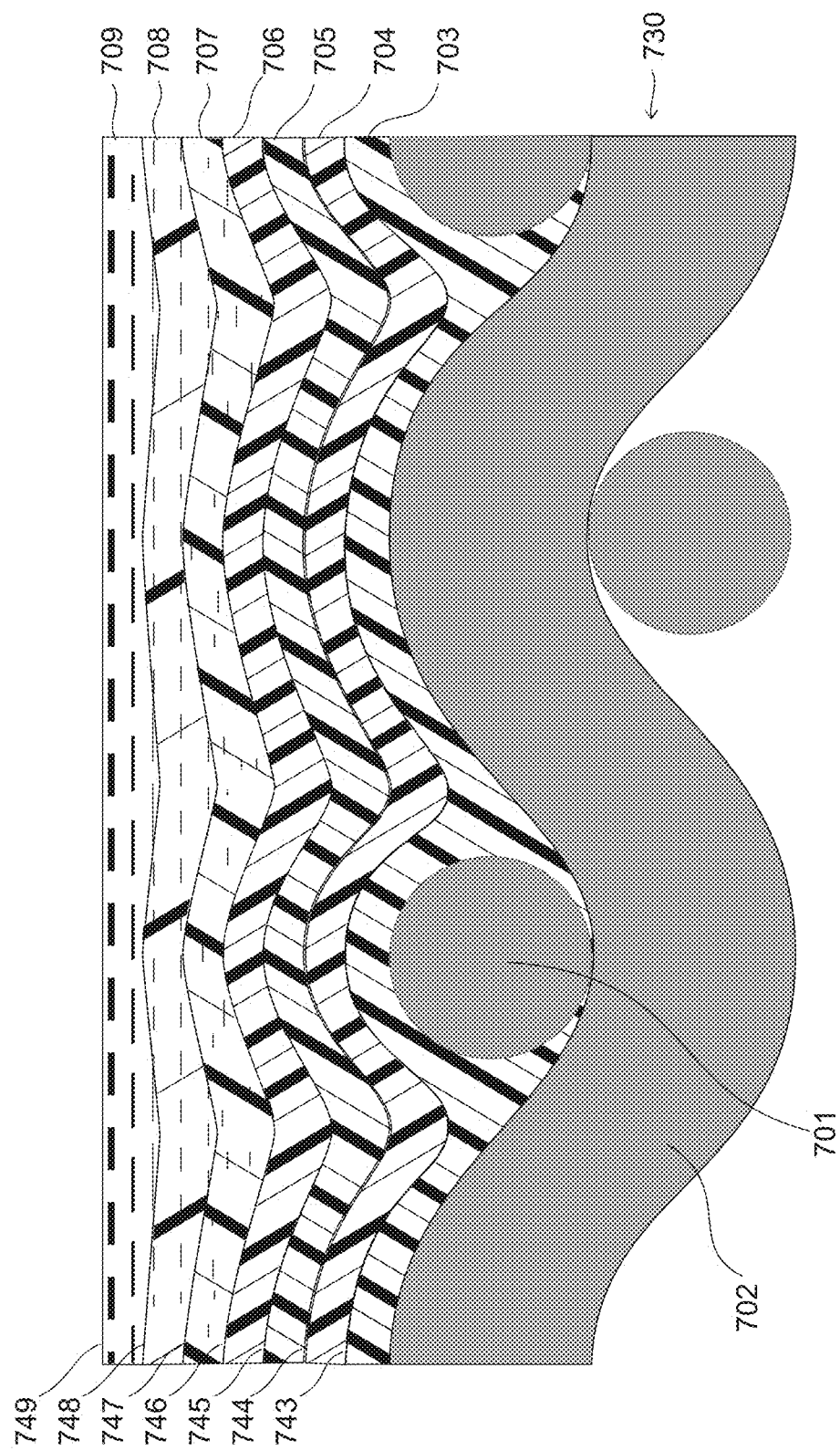
FIG. 38 is a schematic diagram of a cross-sectional view of a fabric on which seven layers of material have been printed.

FIG. 38 shows a cross section of fabric 730, first layer 703, second layer 704, third layer 705, fourth layer 706, fifth layer 707, sixth layer 708, and seventh layer 709 after step 542 of FIG. 15 has been executed for the seventh time to print seventh layer 709 on sixth layer 708 In this cross section, first layer 703, second layer 704, third layer 705, and fourth layer 706 have been exposed to UV radiation three or more times, and are fully cured, as indicated by the exclusive use of striped diagonal lines in first layer 703, second layer 704, third layer 705, and fourth layer 706. Fifth layer 707 has been heavily cured by two exposures to UV radiation, and sixth layer 708 has been lightly cured by a single exposure to UV radiation. Seventh layer 709 is liquid, because it has not yet been cured.

Top surface 749 of seventh layer 709 is flat, unlike the undulating top surface 743 of first layer 703, the undulating top surface 744 of second layer 704, the undulating top surface 745 of third layer 705, the undulating top surface 746 of fourth layer 706, the undulating top surface 747 of fifth layer 707, or the undulating top surface 748 of sixth layer 708 (as shown in FIGS. 36-43). The amplitude of the undulations is greatest in the first layer: first layer 703. The amplitudes become successively smaller as additional layers are printed and as each layer settles down during its liquid and partial curing states. Thus, each layer smoothes out the undulations of the layer it was printed on to some extent, until the top surface of seventh layer 709 is flat and has no undulations, as shown schematically in FIGS. 38-43. Thus, top surface 749 of seventh layer 709 can serve as a reference plane for the printing of subsequent layers.

The smoothness or roughness of a surface can be measured using instruments such as a stylus profilometer or optical surface profilometer. Roughness is essentially the opposite of smoothness, such that when the roughness of a surface is minimized, the smoothness of the surface improves. The roughness average $R_a$ is defined as the arithmetic average of the absolute values of the vertical distances of each point measured by the profilometer from the mean line. Thus, if the profilometer measures n data points, $R_a$ may be calculated as follows:

$$R_a = \left(\frac{1}{n}\right)\sum_{i=1}^{n}|y_i|$$

where $y_i$ is the vertical distance from the $i^{th}$ point to the mean line of the surface.

In these embodiments, the smoothness of a surface may be evaluated as the inverse of the roughness of the surface. For example, the roughness of a surface $R_a$ may be measured using a commercially available stylus profilometer, and, for the purposes of evaluating the smoothness of the surfaces described herein, the smoothness $S_a$ of a surface may be calculated as the inverse of the roughness of the surface:

$$S_a = \left(\frac{1}{R_a}\right)$$

Figure 39:
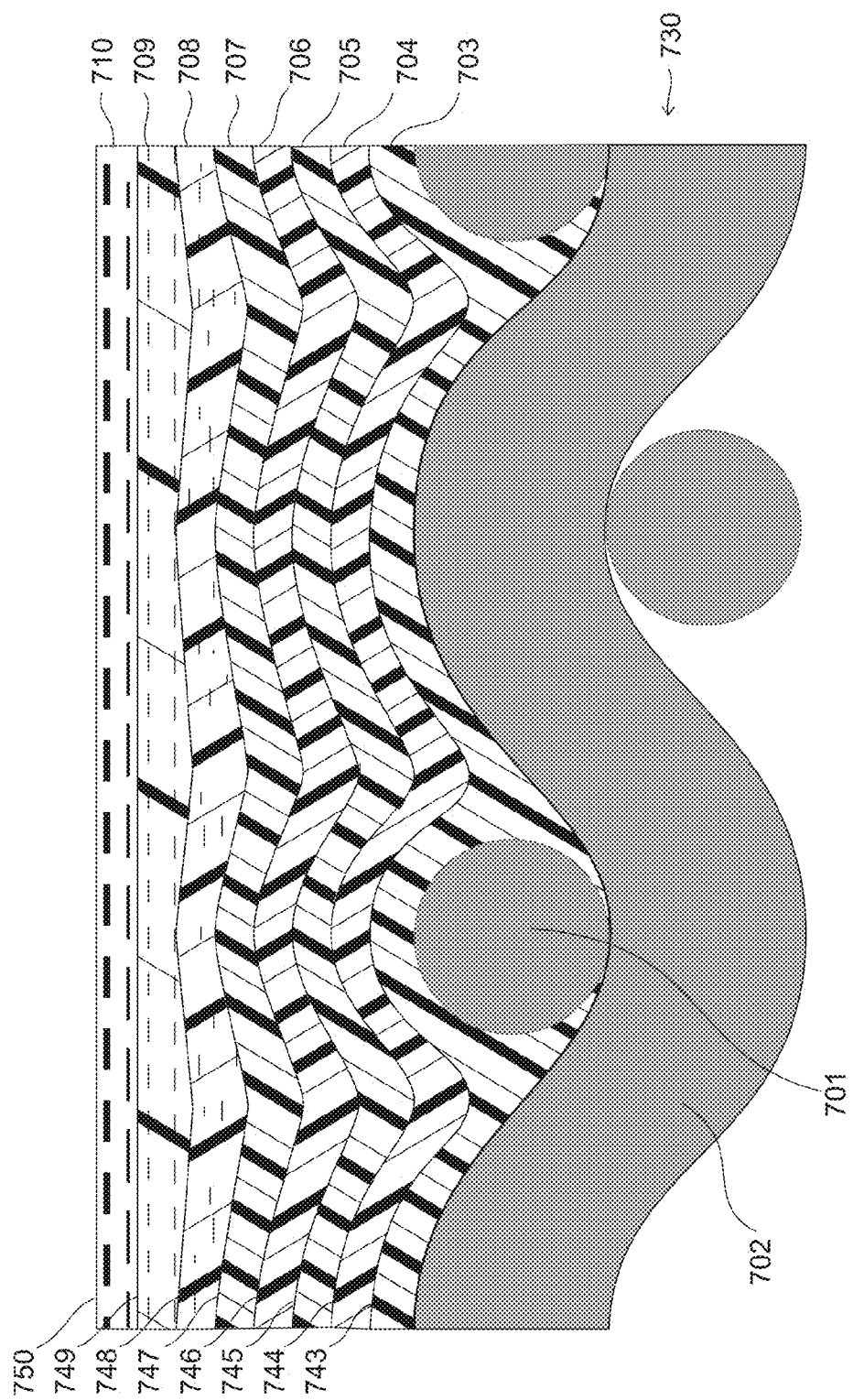
FIG. 39 is a schematic diagram of a cross-sectional view of a fabric on which eight layers of material have been printed.

FIG. 39 shows a cross section of fabric 730, first layer 703, second layer 704, third layer 705, fourth layer 706, fifth layer 707, sixth layer 708, and seventh layer 709 after step 552 of FIG. 16 has been executed for the first time to print eighth layer 710 on seventh layer 709. Because seventh layer 709 is flat, there is no longer any need to only partially cure additional layers—these layers can now be fully cured. For that reason, top surface 750 of eighth layer 710 is flat and is fully cured after it has been printed. This step also completes the cure of seventh layer 709 and sixth layer 708, as shown schematically in FIG. 40 (described below).

Figure 40:
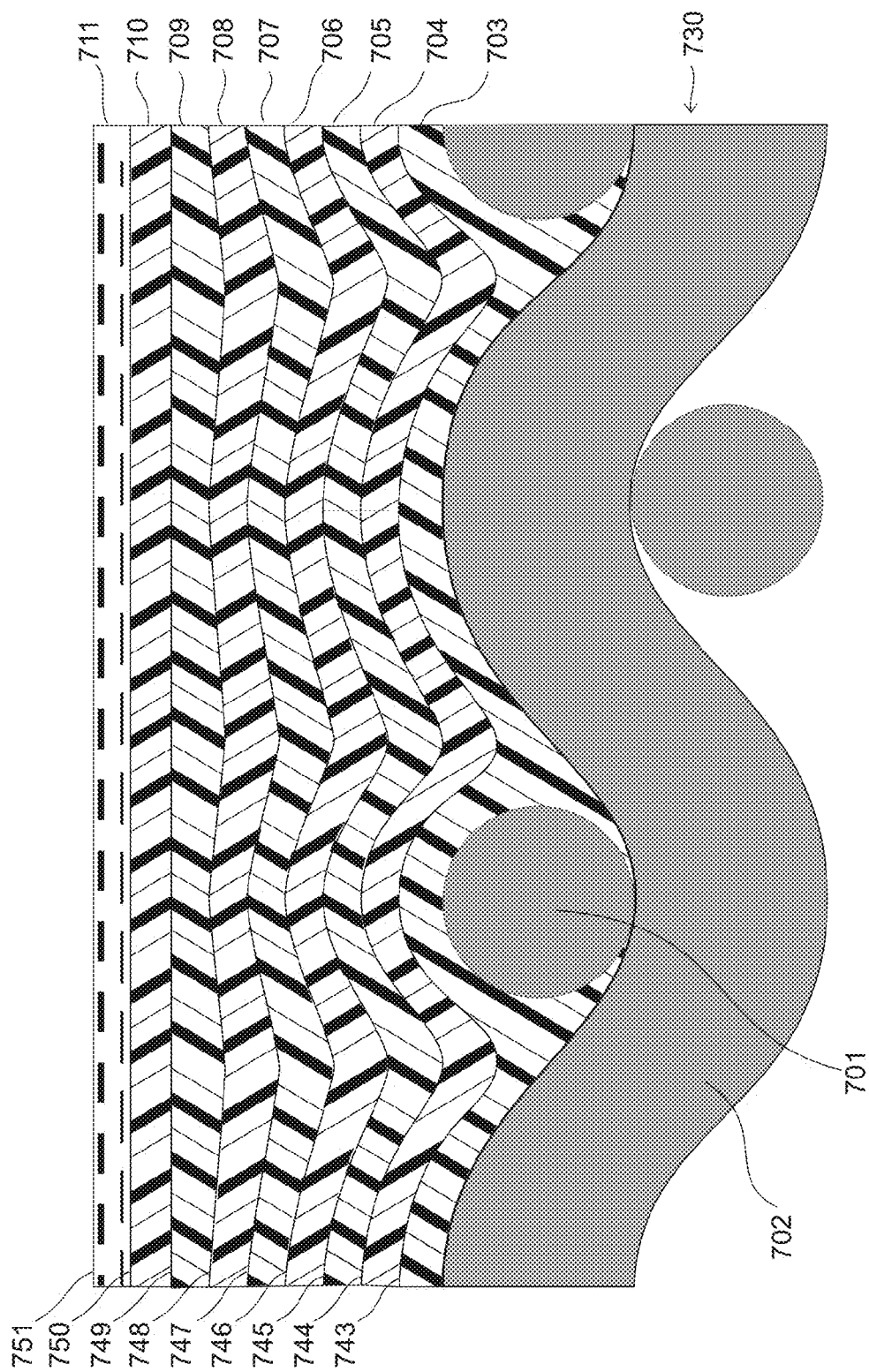
FIG. 40 is a schematic diagram of a cross-sectional view of a fabric on which nine layers of material have been printed.

FIG. 40 shows a cross section of fabric 730, first layer 703, second layer 704, third layer 705, fourth layer 706, fifth layer 707, sixth layer 708, seventh layer 709, eighth layer 710, and ninth layer 711 after step 553 of FIG. 16 has been executed to fully cure eighth layer 710, seventh layer 709, and sixth layer 708, and after step 552 of FIG. 16 has been executed for the second time to print ninth layer 711 on eighth layer 710. As shown schematically in FIG. 40, at this stage, first layer 703, second layer 704, third layer 705, fourth layer 706, fifth layer 707, sixth layer 708, seventh layer 709, and eighth layer 710 are all fully cured, and ninth layer 711 is liquid. Top surface 749 of seventh layer 709, top surface 750 of eighth layer 710, and top surface 751 of ninth layer 711 are all flat, as shown schematically in FIG. 40.

Figure 41:
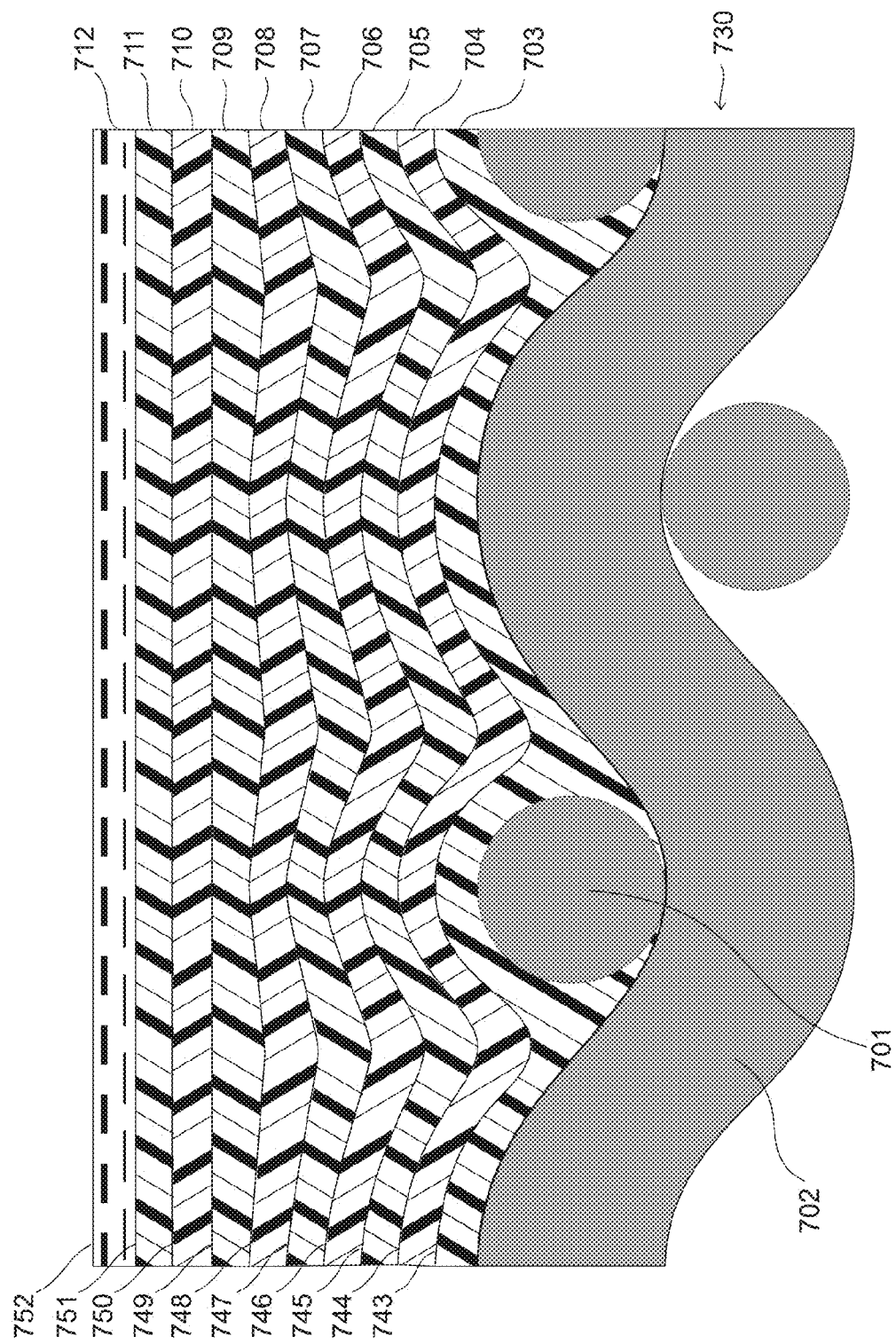
FIG. 41 is a schematic diagram of a cross-sectional view of a fabric on which 10 layers of material have been printed.

FIG. 41 shows a cross section of fabric 730, first layer 703, second layer 704, third layer 705, fourth layer 706, fifth layer 707, sixth layer 708, seventh layer 709, eight layer 710, ninth layer 711, and tenth layer 712 after step 553 of FIG. 16 has been executed for a second time to fully cure ninth layer 711 and step 552 of FIG. 16 has been executed for the third time to print tenth layer 712 on ninth layer 711. As shown schematically in FIG. 41, at this stage, first layer 703, second layer 704, third layer 705, fourth layer 706, fifth layer 707, sixth layer 708, seventh layer 709, eighth layer 710, and ninth layer 711 are all fully cured, and tenth layer 712 is liquid and has a flat top surface 752.

Figure 42:
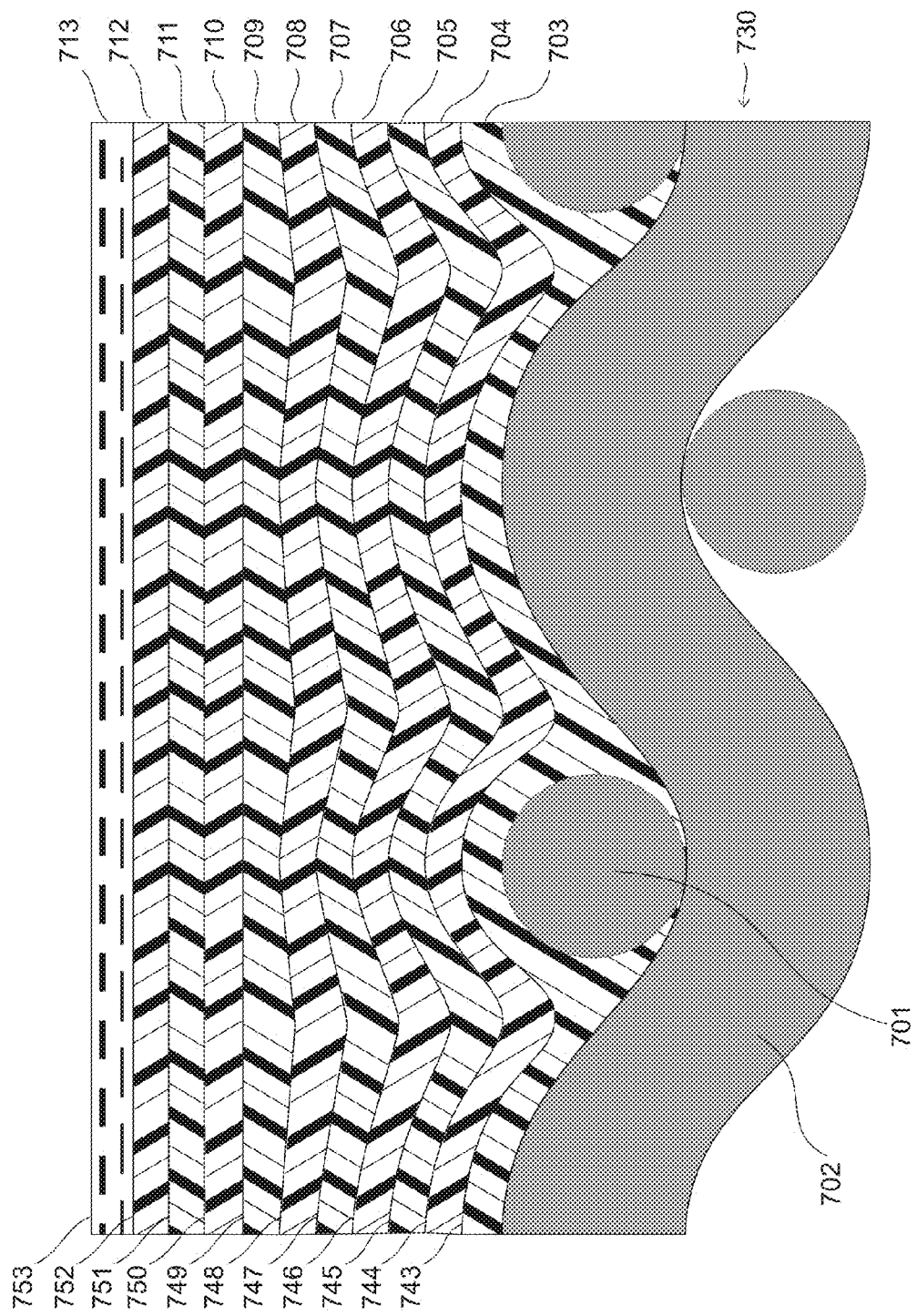
FIG. 42 is a schematic diagram of a cross-sectional view of a fabric on which 11 layers of material have been printed.

FIG. 42 shows a cross section of fabric, first layer 703, second layer 704, third layer 705, fourth layer 706, fifth layer 707, sixth layer 708, seventh layer 709, eight layer 710, ninth layer 711, tenth layer 712, and eleventh layer 713 after step 552 of FIG. 16 has been executed for the fourth time to print eleventh layer 713 on tenth layer 712. As shown schematically in FIG. 42, at this stage, first layer 703, second layer 704, third layer 705, fourth layer 706, fifth layer 707, sixth layer 708, seventh layer 709, eighth layer 710, ninth layer 711, and tenth layer 712 are all fully cured, and eleventh layer 713 is liquid and has a flat top surface 753.

Figure 43:
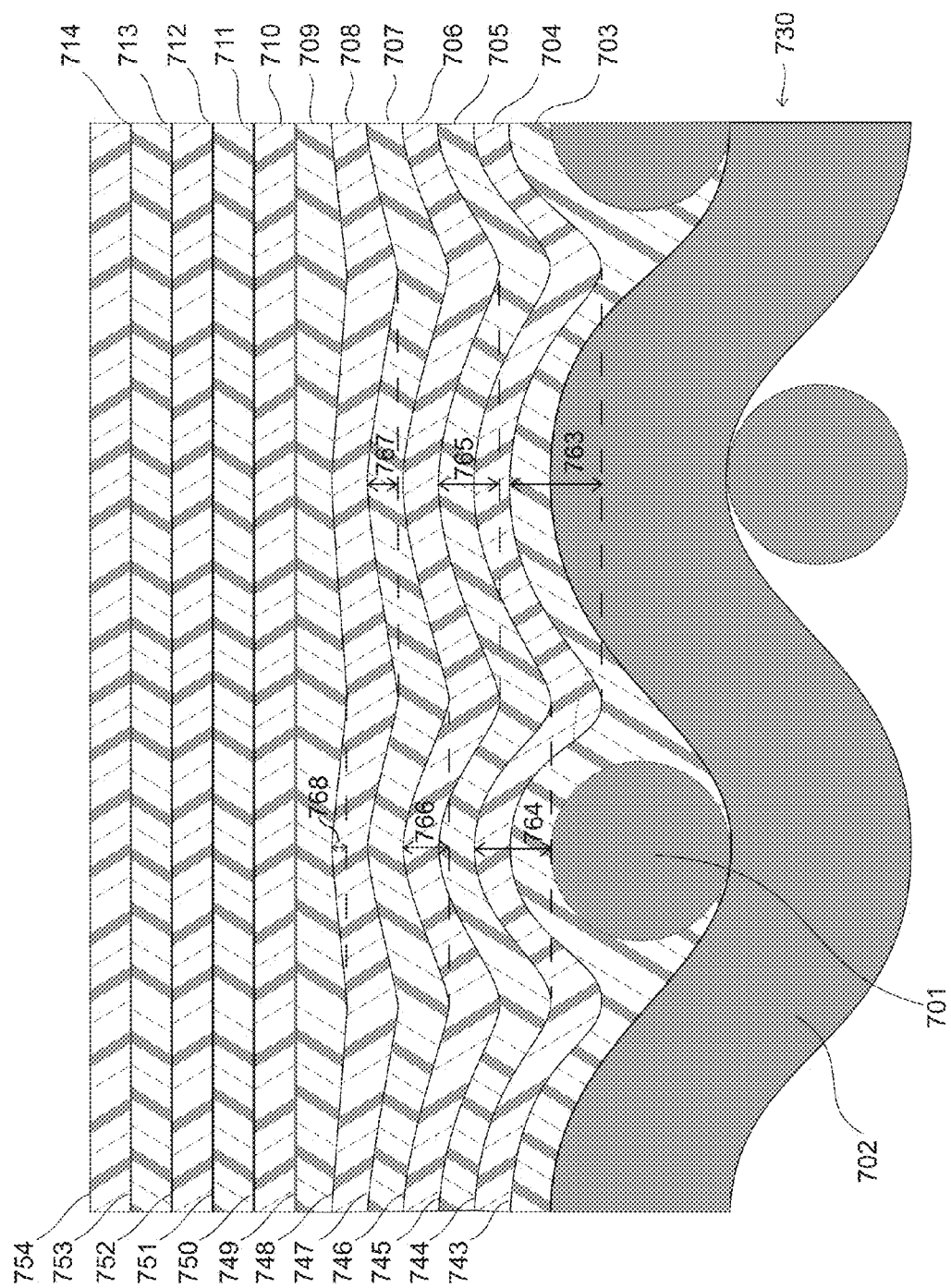
FIG. 43 is a schematic diagram of a cross-sectional view of a fabric on which 12 layers of material have been printed and fully cured.

FIG. 43 shows a cross section of the final product, showing fabric 730 and all of its layers, first layer 703, second layer 704, third layer 705, fourth layer 706, fifth layer 707, sixth layer 708, seventh layer 709, eighth layer 710, ninth layer 711, tenth layer 712, eleventh layer 713 and twelfth layer 714 after all layers have been fully cured by subjecting the layers to radiation events such as exposure to UV radiation. FIG. 43 has been annotated with dimensional notations, showing the maximum deviation from flatness of each layer. Thus, double arrow 763 denotes the maximum deviation of the top surface of first layer 703 from flatness; double arrow 764 denotes the maximum deviation of the top surface of second layer 704 from flatness; double arrow 765 denotes the maximum deviation of the top surface of third layer 705 from flatness; double arrow 766 denotes the maximum deviation of the top surface of fourth layer 706 from flatness; double arrow 767 denotes the maximum deviation of the top surface of fifth layer 707 from flatness; and double arrow 768 denotes the maximum deviation of the top surface of sixth layer 708 from flatness.

As shown schematically in FIG. 43, the maximum deviation from flatness shown by double arrow 763 of first layer 703 is greater than them maximum deviation from flatness shown by double arrow 764 of second layer 704, which is greater than the maximum deviation from flatness shown by double arrow 765 of third layer 705, which is greater than the maximum deviation from flatness shown by double arrow 766 of fourth layer 706, which is greater than the maximum deviation from flatness shown by double arrow 767 of fifth layer 707, which is greater than the maximum deviation from flatness of sixth layer shown by double arrow 768 of sixth layer 708.

In summary, as each of first layer 703, second layer 704, third layer 705, fourth layer 706, fifth layer 707, sixth layer 708, and seventh layer 709 is printed and then partially cured, the duration of the printing and partial curing steps has allowed the printed material to flow down from high points to low points, to pool and to coalesce. This has reduced the amplitude of the undulations in each successive layer, as illustrated schematically in FIG. 43. For example, as shown in FIG. 43, first layer 703 does not have a uniform thickness, because the printed material from first layer 703 has flowed down into the depressions where strand 702 curves down and over strand 701. Subsequent layers may also have non-uniform thicknesses, but the degree of non-uniformity decreases with each subsequent layer.

In some cases, differential lateral thermal expansion between the first layer and the substrate upon which it is printed may cause separation or delamination of the printed-on overlay from its underlying substrate. In some embodiments, this delamination may be prevented by printing the layers with openings that allow for the lateral expansion of the first layer and subsequent layers after they have been printed and cured. In one embodiment, described below with reference to FIGS. 44-57, the openings are grooves that extend in one or more directions along or across the layers. Other patterns for the layout of openings in the layers may be used. For example, the openings may be one of or a combination of some of the following: circular openings, oval openings, serpentine openings, diamond openings, square openings, rectangular openings, or the openings may have other shapes.

Figure 44:
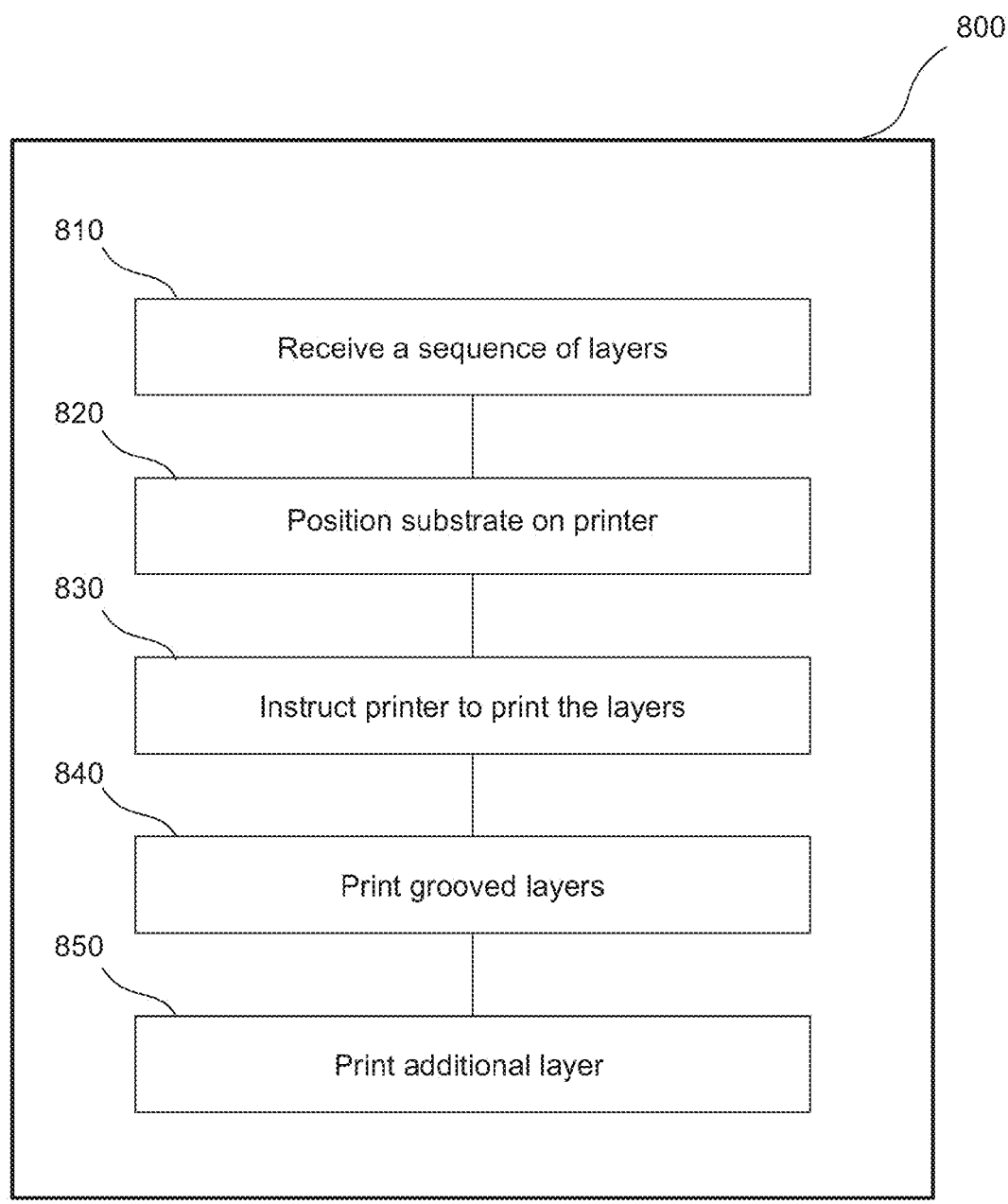
FIG. 44 is an exemplary flowchart illustrating an embodiment of a process for depositing multiple layers on a fabric.
Figure 45:
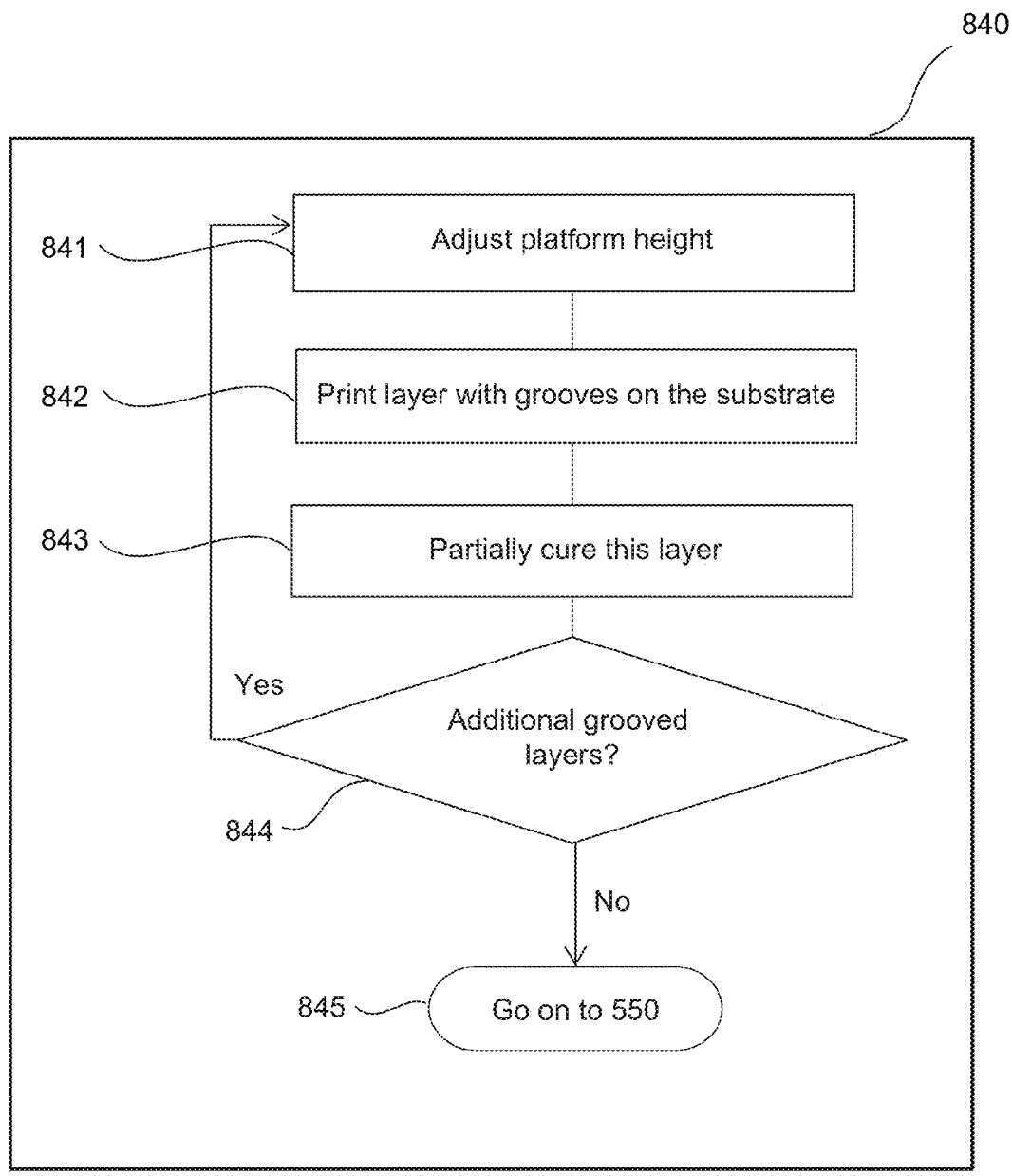
FIG. 45 is an exemplary flowchart illustrating an embodiment of one of the steps shown in the flowchart of FIG. 44.
Figure 46:
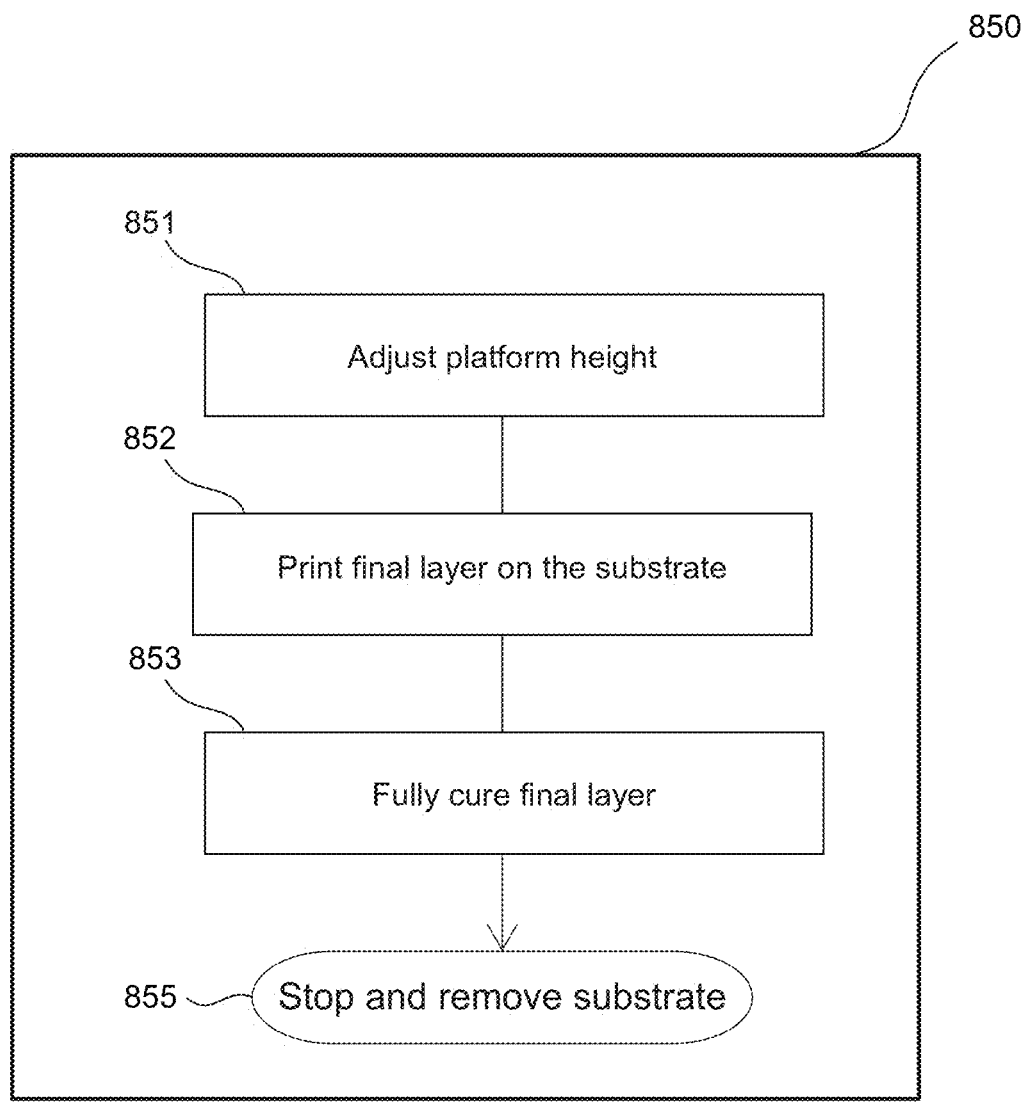
FIG. 46 is an exemplary flowchart illustrating an embodiment of another one of the steps shown in the flowchart of FIG. 44.

FIG. 44 is an illustration of a flowchart 800 that outlines an exemplary embodiment of a process for first printing a set of layers with grooves on a substrate, and then printing a final layer over the grooved layers. FIG. 45 is a flowchart that lists exemplary steps that may be used to implement step 840 of flowchart 800. FIG. 46 is a flowchart that lists exemplary steps that may be used to implement step 850 of flowchart 800. FIGS. 47-57 illustrate the printing and curing of successive layers onto a fabric. In FIGS. 47, 49, 51, 53, and 55, the height of print head 902 above the top surface of the top layer is indicated by the numeral "10".

In first step 810 of flowchart 800 in FIG. 44, a sequence of layers, in which the first set of layers are to be printed with grooves, is received by the printer system. In step 820, a substrate is positioned on the printer platform. In step 830, the printer is instructed to print the sequence of layers it received in step 810. In step 840, the printer prints the first set of grooved layers on the substrate. The steps used to implement step 840 are listed in the flowchart shown schematically in FIG. 45, which is described below. In step 850, the printer prints the final layer that does not have any grooves. The steps used to implement step 850 are listed in the flowchart shown schematically in FIG. 46, which is described below.

FIG. 45 lists the steps used to implement step 840 of FIG. 44, printing layers with grooves on the substrate. The step 841, step 842, step 843, and step 844 in flowchart 840 may be executed one time or may be executed many times. In the embodiment illustrated in FIGS. 47-57, step 840 of flowchart 800 is executed four times, as described below with reference to FIGS. 47-57.

Figure 47:
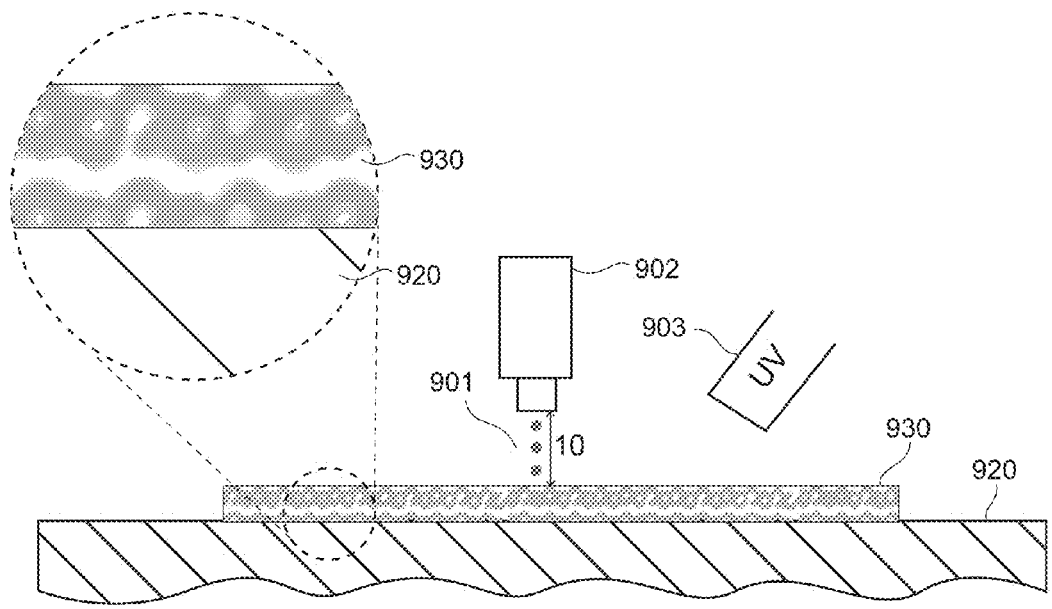
FIG. 47 is a schematic diagram illustrating the operation of one of the steps set forth in the flowcharts of FIGS. 44-46.
Figure 48:
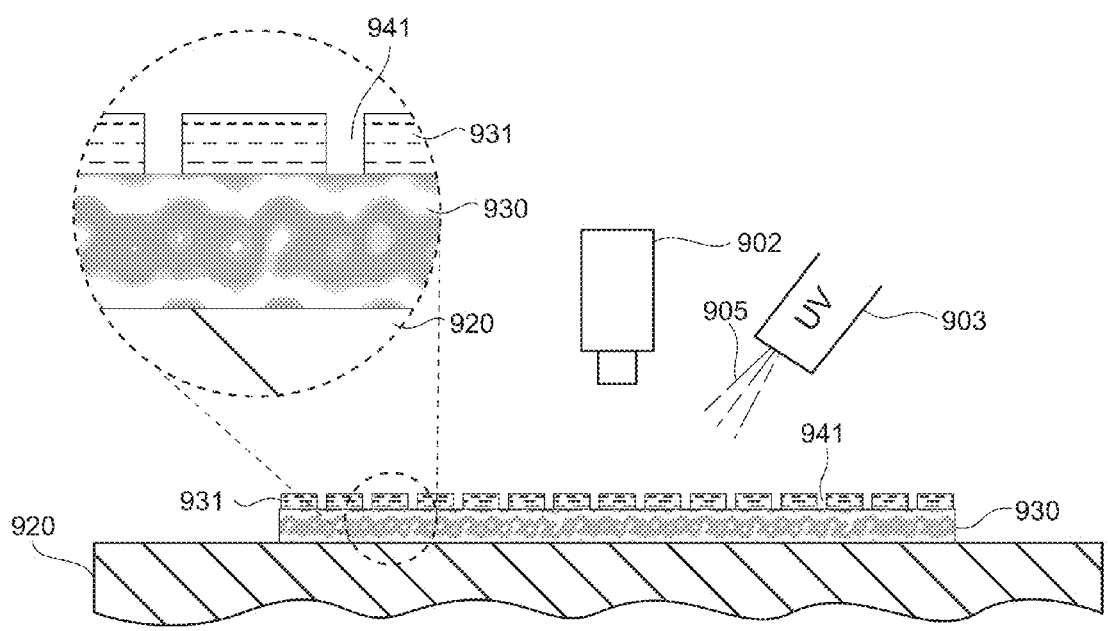
FIG. 48 is a schematic diagram illustrating the operation of another one of the steps set forth in the flowcharts of FIGS. 44-46.

In step 841, which is optional, the height of the printer head above the substrate is set to a predetermined height by adjusting the position of the printer platform. In the first execution of step 842, the printer prints a layer on the substrate. The first execution of this step is illustrated in FIG. 47, which shows drops 901 ejected from printer head 902 onto substrate 930 positioned on platform 920 (shown in FIGS. 47-57) to form layer 931 (shown schematically in FIG. 48). Layer 931 is partially cured in step 843. In this embodiment, as illustrated in FIG. 48, layer 931 is partially cured by UV radiation 905 from UV source 903. In other embodiments, layer 931 may be partially cured by another type of radiation event and/or by heat. As layer 931 is being cured, it expands into grooves 941, partially filling the grooves. In step 844, the printer determines if additional grooved layers must be printed. If the answer is yes, the process goes back to repeat step 841, step 842, and step 843.

Figure 49:
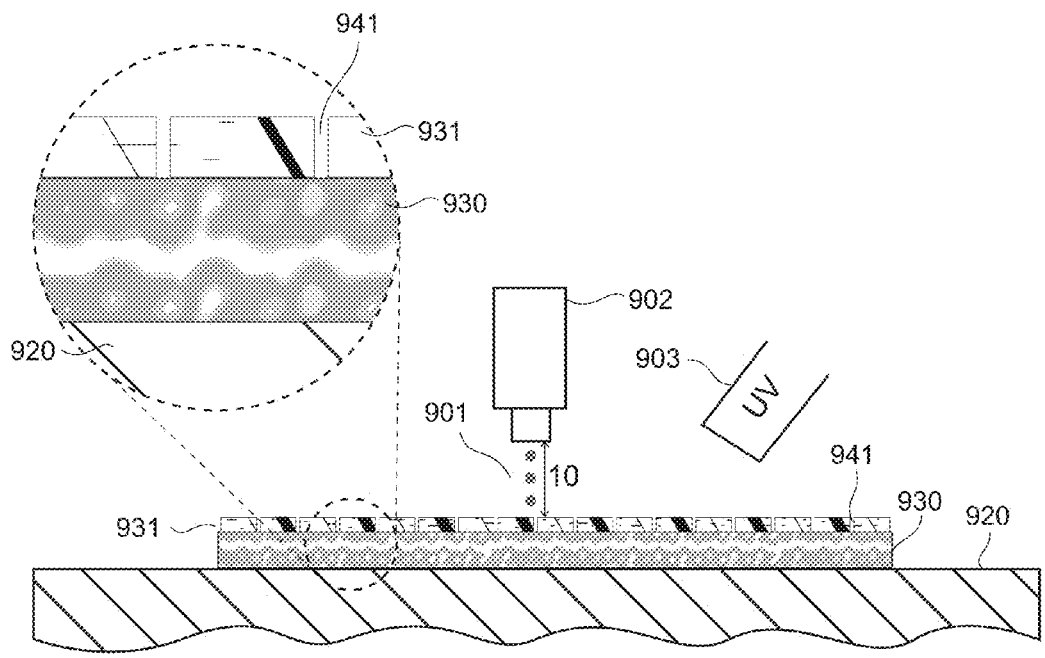
FIG. 49 is a schematic diagram illustrating the operation of another one of the steps set forth in the flowcharts of FIGS. 44-46.
Figure 50:
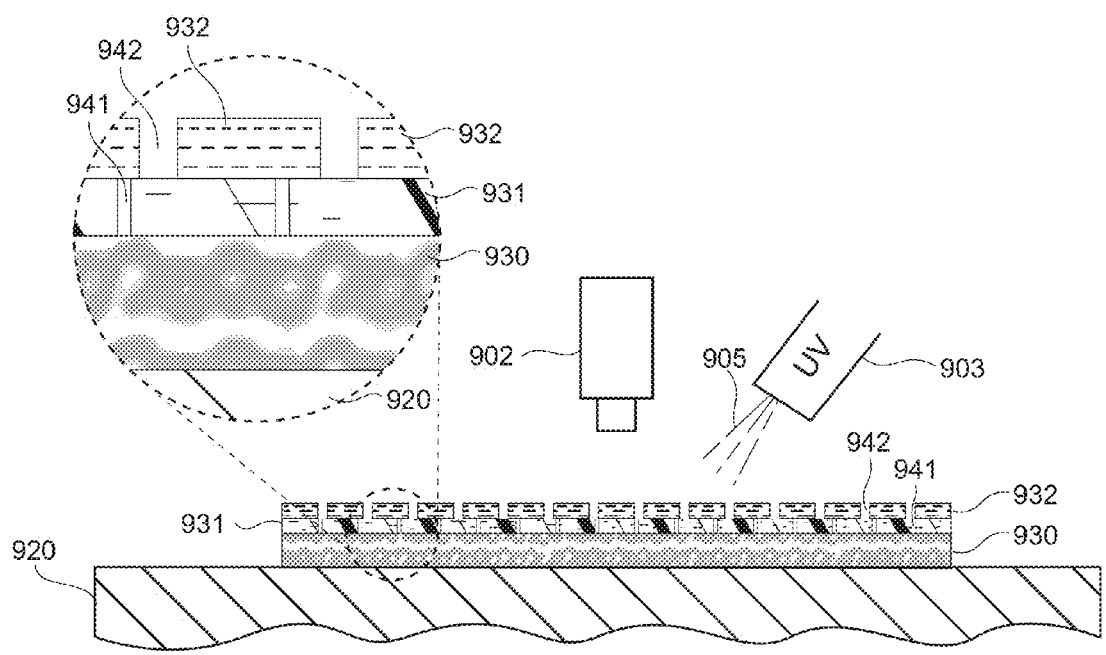
FIG. 50 is a schematic diagram illustrating the operation of another one of the steps set forth in the flowcharts of FIGS. 44-46.

A second execution of step 842 is illustrated in FIG. 49 and FIG. 50. FIG. 49 shows drops 901 ejected from printer head 902 onto the top surface of layer 931 to form layer 932 (shown schematically in FIG. 50). Layer 931 is partially cured at the beginning of this second execution of step 842, as shown schematically by the shading of layer 931 in FIG. 49 and FIG. 50. Grooves 941 in layer 931, as shown schematically in FIG. 49 and FIG. 50 are substantially narrower than they were in FIG. 48, because the material of layer 931 has expanded to reduce the width of grooves 941. Layer 932 contains grooves 942, which have a width in this illustration that is similar to the width of grooves 941 in FIG. 48. However, in other embodiments grooves 942 may have a different width. In the second execution of step 843, layer 932 is partially cured by UV rays from UV source 903, which also completes the cure of layer 931. As layer 931 is cured, it expands to fill groove 941, such that when layer 931 is completely cured, layer 931 no longer contains any grooves, as shown schematically in FIG. 51.

Figure 51:
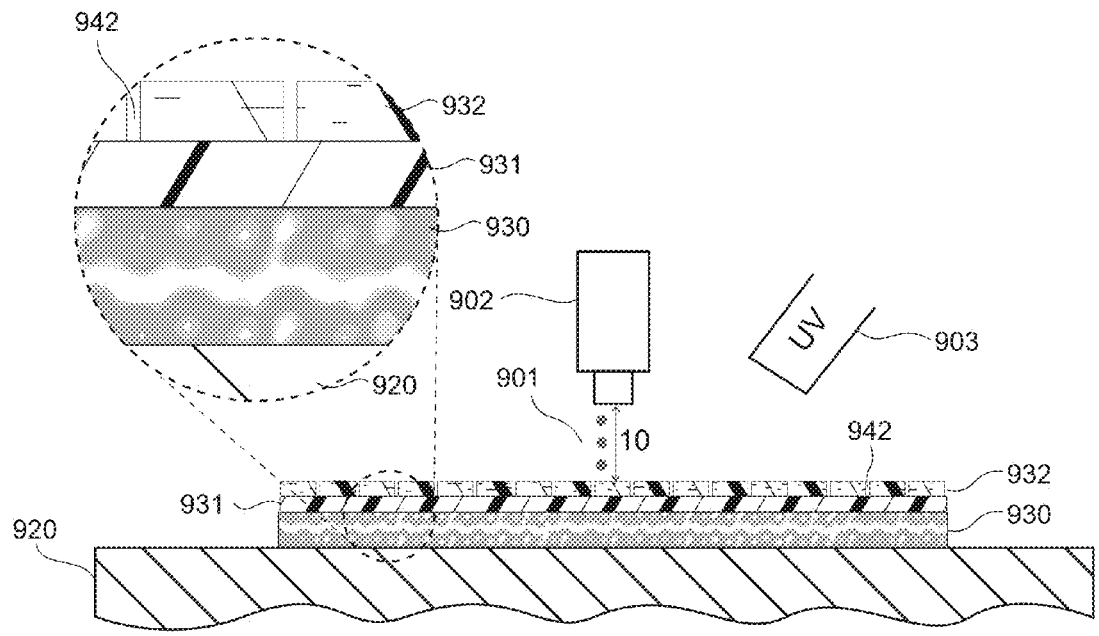
FIG. 51 is a schematic diagram illustrating the operation of another one of the steps set forth in the flowcharts of FIGS. 44-46.
Figure 52:
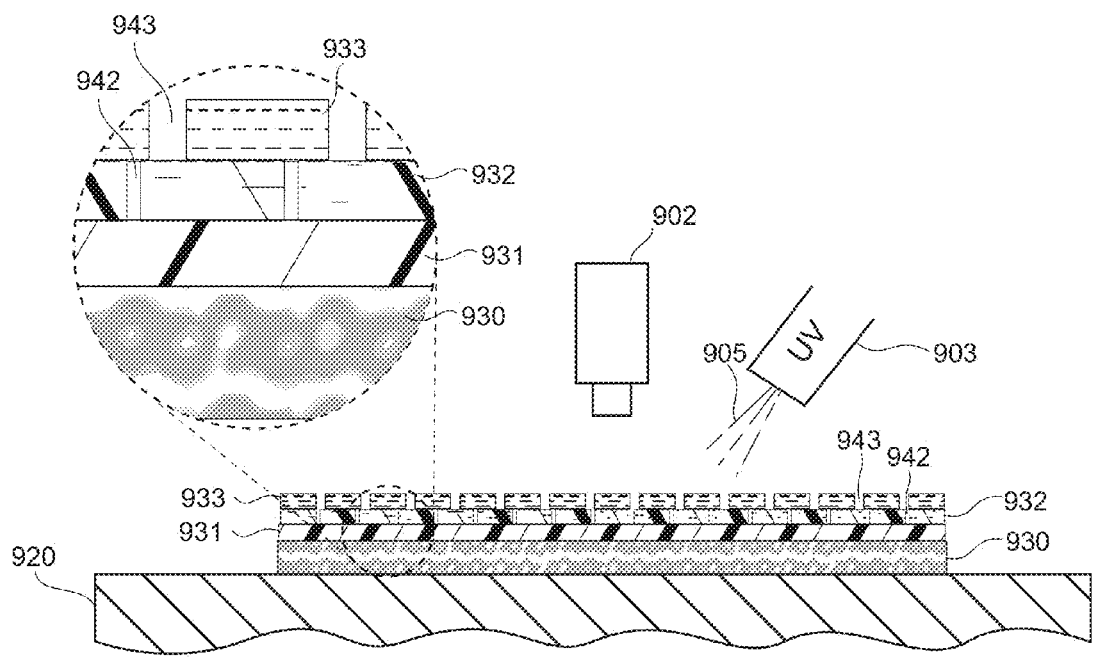
FIG. 52 is a schematic diagram illustrating the operation of another one of the steps set forth in the flowcharts of FIGS. 44-46.

FIG. 51 shows drops 901 ejected from printer head 902 onto the top surface of layer 932 to form layer 933 (shown schematically in FIG. 52). Layer 931 is fully cured at the beginning of this third execution of step 842, as shown by the shading of layer 931 in FIG. 51 and FIG. 52. Layer 931 no longer contains any grooves. Layer 932 contains grooves 942 that are narrower than the grooves were in FIG. 50, because the material of layer 932 has expanded to reduce the width of grooves 942. Layer 933 contains grooves 943, which have a width in this illustration that is similar to the width of grooves 941 in FIG. 48. However, in other embodiments, grooves 943 may have a different width. In the third execution of step 843, layer 933 is partially cured by UV rays from UV source 903, which also completes the cure of layer 932. As layer 932 is cured, it expands to fill grooves 942, such that when layer 932 is completely cured, layer 932 no longer contains any grooves, as shown in FIG. 53.

Figure 53:
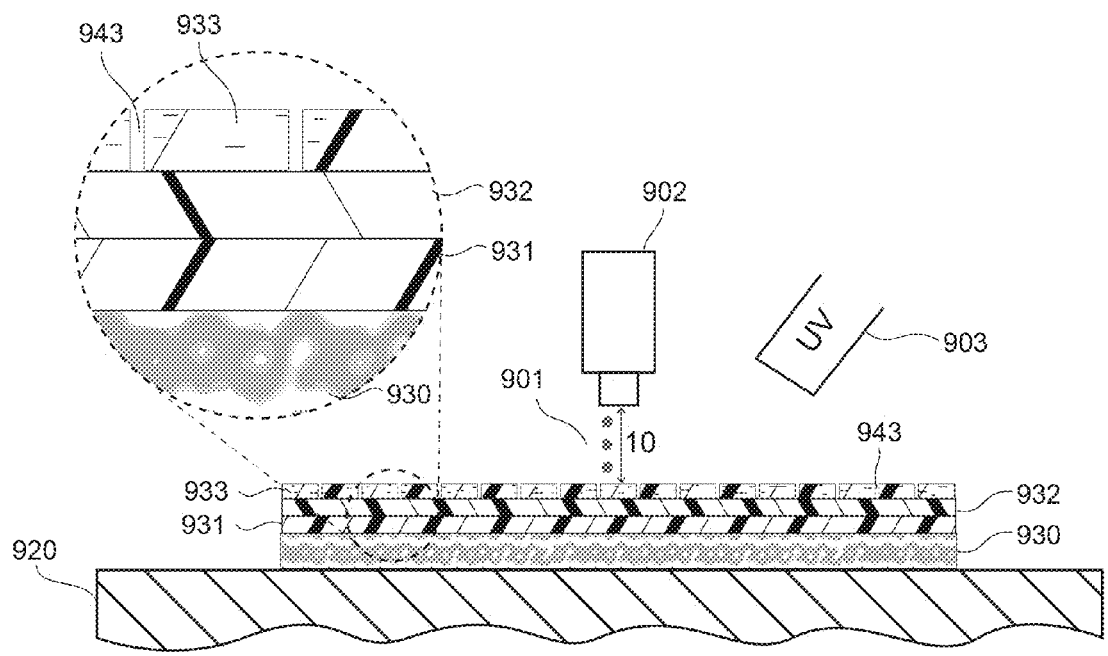
FIG. 53 is a schematic diagram illustrating the operation of another one of the steps set forth in the flowcharts of FIGS. 44-46.
Figure 54:
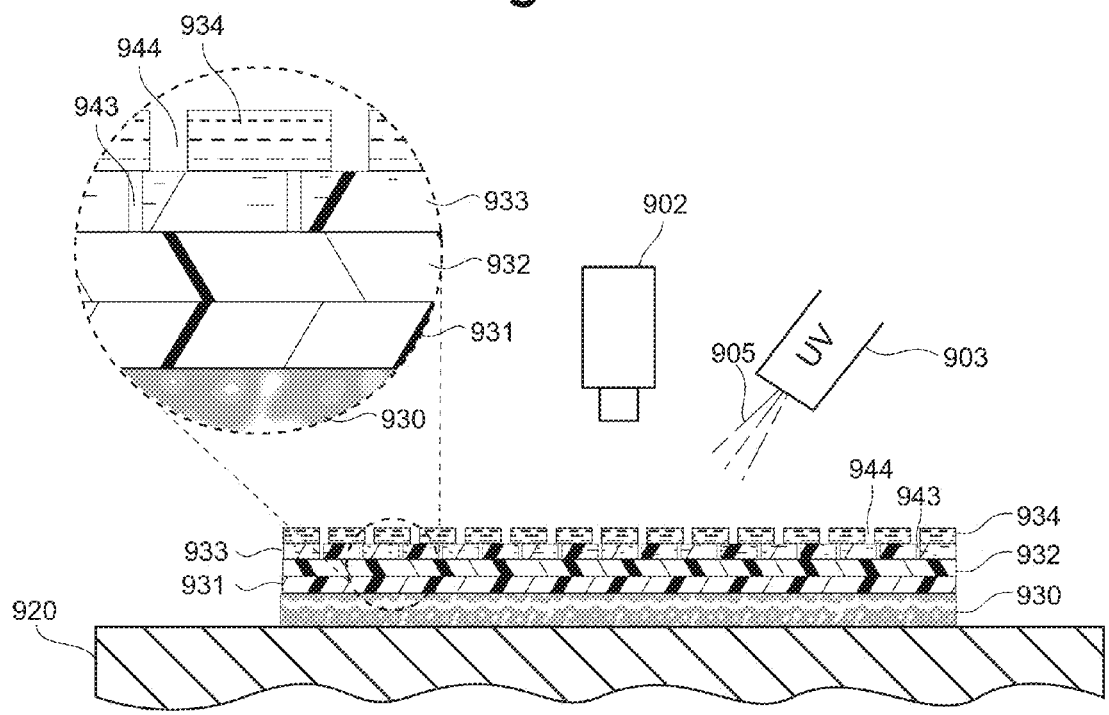
FIG. 54 is a schematic diagram illustrating the operation of another one of the steps set forth in the flowcharts of FIGS. 44-46.

FIG. 53 shows drops 901 ejected from printer head 902 onto the top surface of layer 933 to form layer 934 (shown in FIG. 54). Layer 931 and layer 932 are fully cured at the beginning of this fourth execution of step 842, as shown by the shading of layer 931 and layer 932 in FIG. 51 and FIG. 52. Layer 932 no longer contains any grooves. Layer 933 contains grooves 943 that are narrower than the grooves were in FIG. 52, because the material of layer 933 has expanded to reduce the width of grooves 943. Layer 934 contains grooves 944, which have a width in this illustration that is similar to the width of grooves 941 in FIG. 48. However, in other embodiments grooves 944 may have a different width. In the fourth execution of step 843, layer 934 is partially cured by UV rays from UV source 903, which also completes the cure of layer 933. As layer 933 is cured, it expands to fill grooves 943, such that when layer 933 is completely cured, layer 933 no longer contains any grooves, as shown in FIG. 53. At this point, the process illustrated in FIG. 45 has been almost completed, because the instructions to the printer required four layers of grooved material to be deposited on substrate 930. The process thus goes to step 845, which instructs the system to proceed with step 850 of flowchart 800.

Figure 55:
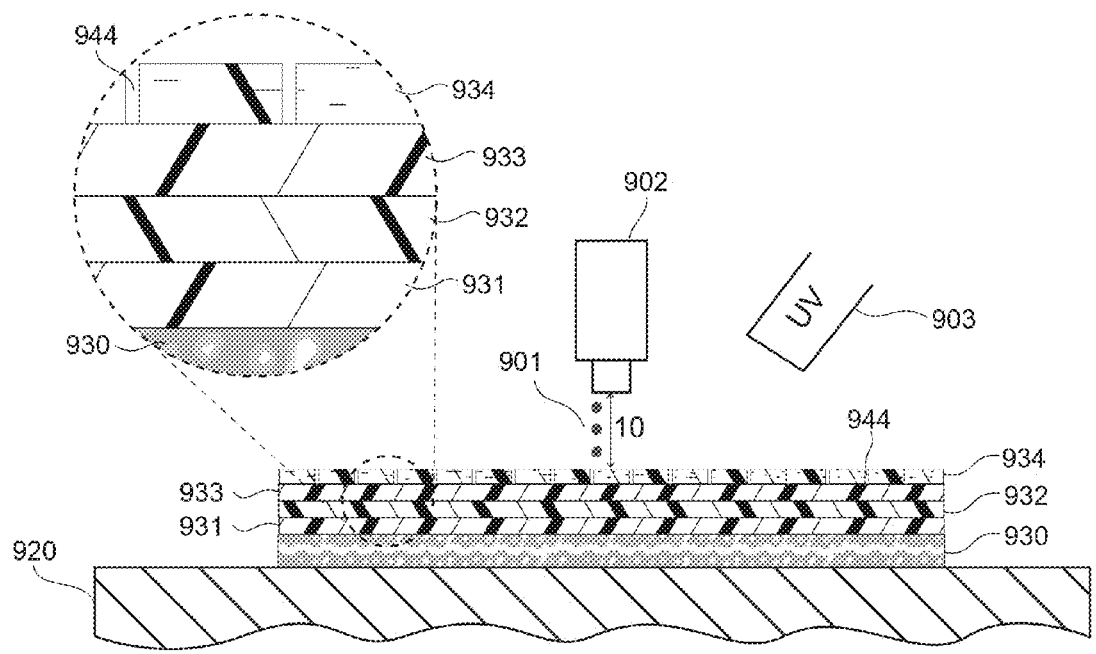
FIG. 55 is a schematic diagram illustrating the operation of another one of the steps set forth in the flowcharts of FIGS. 44-46.
Figure 56:
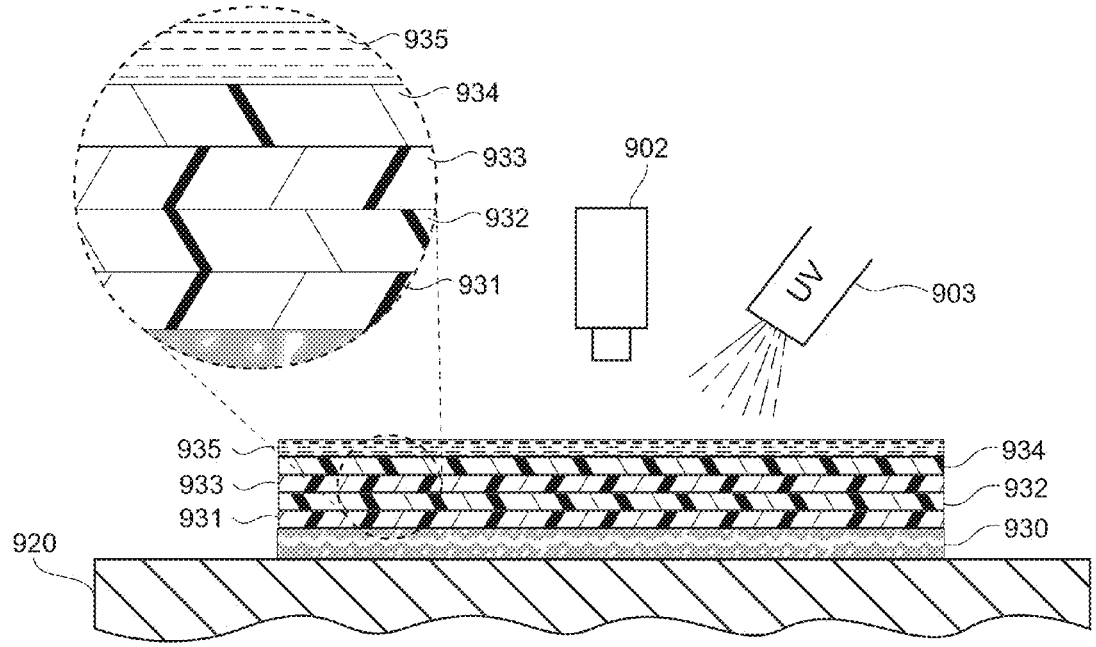
FIG. 56 is a schematic diagram illustrating the operation of another one of the steps set forth in the flowcharts of FIGS. 44-46.

FIG. 55 and FIG. 56 illustrate an embodiment of an implementation of steps 852 and 853 of flowchart 850. After optionally adjusting the platform height in step 851, the process proceeds to step 852. FIG. 55 shows step 852, as drops 901 are ejected from printer head 902 onto the top surface of layer 934 to print the final layer 935 on layer 934 (as shown schematically in FIG. 56). Layer 931, layer 932, and layer 933 are fully cured at the beginning of this execution of step 852, as shown by the shading of layer 931, layer 932, and layer 933 in FIG. 51 and FIG. 52. Layer 933 no longer contains any grooves. Layer 934 contains grooves 944 that are narrower than the grooves were in FIG. 54, because the material of layer 934 has expanded to reduce the width of grooves 944. Layer 935, which is the final layer, does not contain any grooves 944. However, in other embodiments, layer 935 may contain grooves that are similar in width to grooves 944 shown in FIG. 55. The material used to print layer 935 may be the same as or it may be different from the material used to print layer 931, layer 932, layer 933, or layer 934. For example, layer 935 may be a harder or more abrasion-resistant layer than the previous layers, or it may be more resilient. In step 853, layer 935 is fully cured by UV rays emanating from UV source 903. This step also fully cures layer 934. As layer 934 is cured, it expands to fill grooves 944, such that when layer 934 is completely cured, layer 934 no longer contains any grooves, as shown in FIG. 57.

Figure 57:
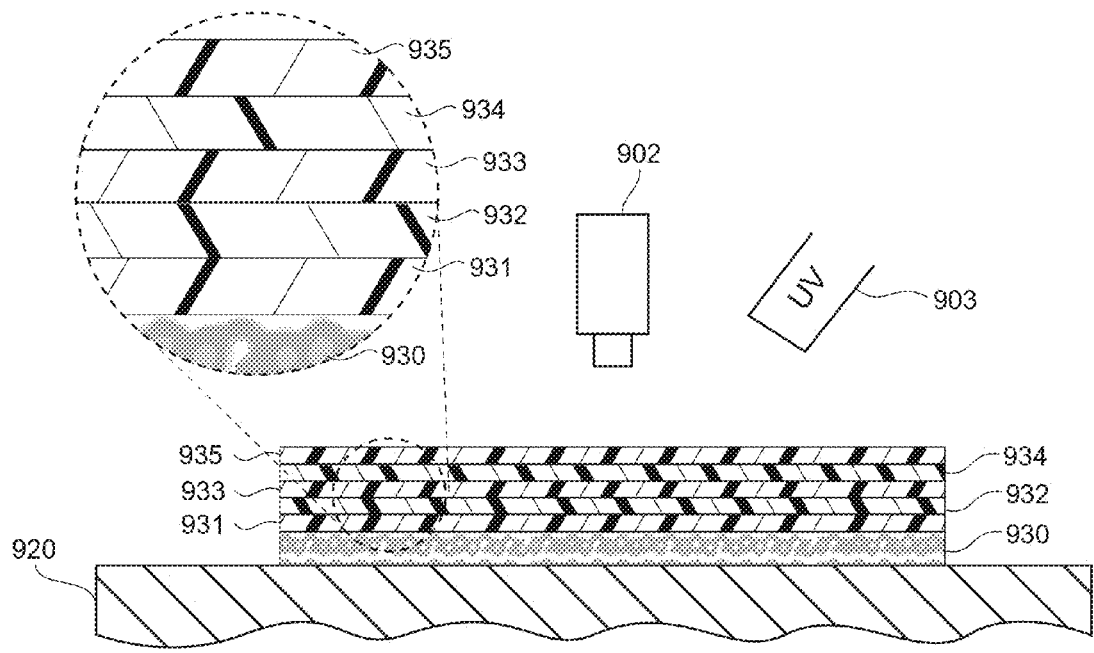
FIG. 57 is a schematic diagram of a cross section of a substrate bearing the five layers printed as shown in FIGS. 47-56 after all the layers have been fully cured.

FIG. 57 is a schematic diagram of a cross section illustrating the final structure of a substrate with five layers produced by the process outlined in the flowcharts of FIGS. 44-46. As shown schematically in FIG. 57, each one of layer 931, layer 932, layer 933, layer 934, and layer 935 is fully cured. Layer 931 may be chemically and/or mechanically bonded to substrate 930. Furthermore, layer 931, layer 932, layer 933, layer 934, and layer 935 may also be chemically and/or mechanically bonded to each other. When all the layers are cured, the substrate and its layers are removed in step 855.

These layers may be used as overlays on articles such as articles of footwear and articles of apparel, to provide protection against, for example, water, dust, sand, or abrasion. The overlays may have a decorative and/or optical function. For example, the overlays may bear colors or bear a logo. Alternatively, if the underlying substrate is a fabric bearing a colored or black-and-white pattern, the overlay may be a lenticular array.

The overlays produced by printing multiple layers, as described above with reference to various embodiments, may be applied to articles of apparel such as t-shirts, sweatshirts, shorts, or pants, as well as to uniforms such as football uniforms, basketball uniforms, soccer uniforms, hockey uniforms, and other sports or recreational apparel. The overlays may be applied to protective gears such as helmets, shoulder pads, elbow pads, or knee pads. The overlays may also be applied to articles of footwear, such as running shoes, training shoes, walking shoes, baseball shoes, basketball shoes, soccer shoes, football shoes, skates, work boots, hiking boots, or other sport or recreational articles of footwear.

Figure 58:
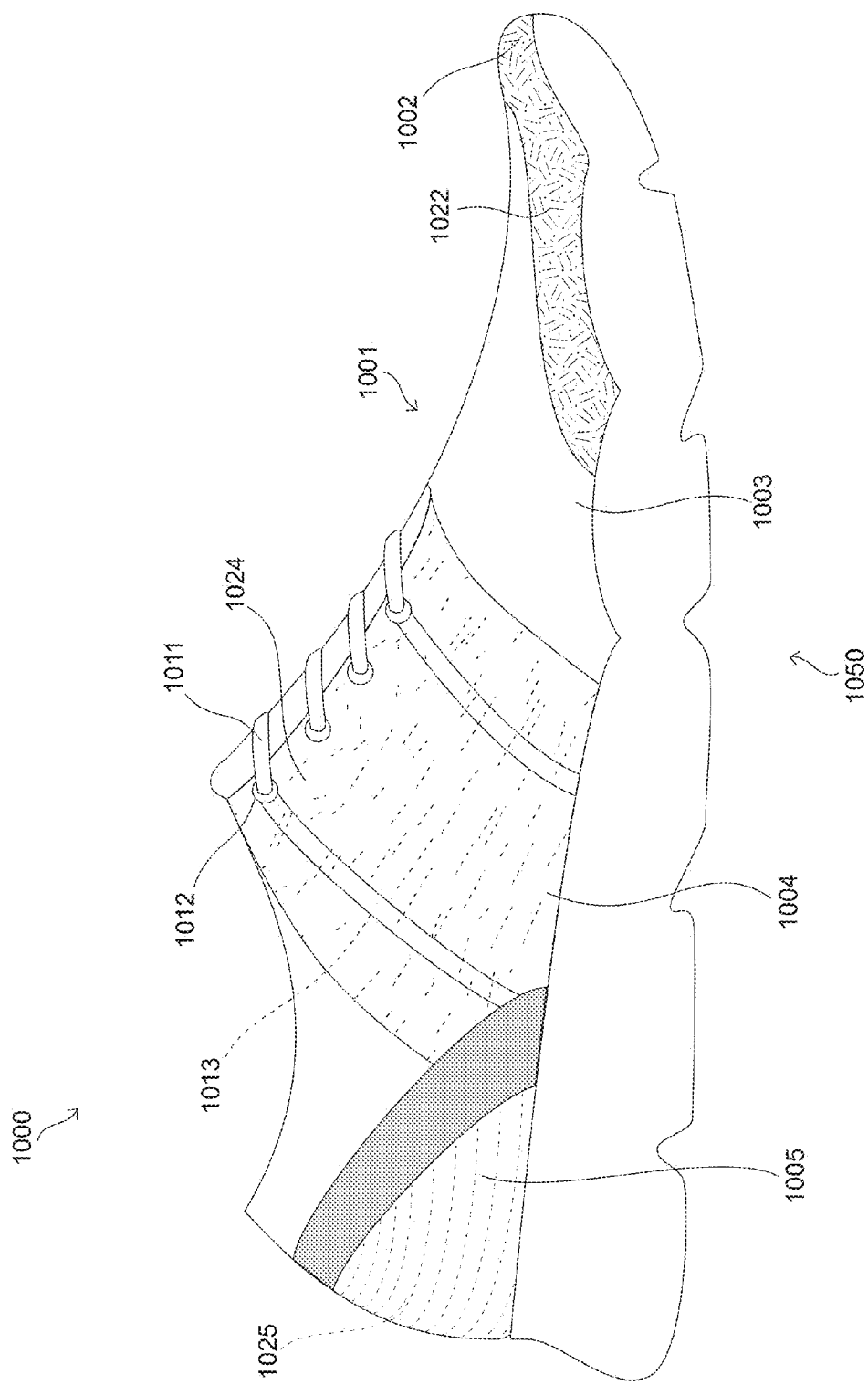
FIG. 58 is a schematic diagram of an article of footwear bearing exemplary applications of layers on its upper.

FIG. 58 is an example of the application of overlays produced by printing multiple layers on an upper of an article of footwear. Article of footwear 1000 has upper 1001 attached to sole 1050. Upper 1000 can be characterized as having toe region 1002, forefoot region 1003, midfoot region 1004, and heel region 1005. The upper has lace 1011 that may be laced through eyelets 1012. In this example, the upper has strands 1013 that extend from eyelets 1012 down to the bite line of the article of footwear, i.e., down to the lower perimeter of upper 1001 where upper 1001 is joined to sole 1050. These strands may provide structural support for the sides of the upper against the wearer's foot when lace 1011 is pulled tight and fastened.

In this example, article of footwear 1000 has three overlays on its upper 1001. It has overlay 1022 in toe region 1002 and forefoot region 1003. Overlay 1022 may be, for example, an abrasion-resistant overlay printed using acrylic resin ink, polyurethane ink, TPU ink, or silicone ink. Overlay 1022 may have been printed on the upper according to the process outlined in flowchart 300, which is described above with reference to FIGS. 3-10.

Upper 1001 also has an overlay 1024 at midfoot region 1004, which protects strands 1013. Overlay 1024 may be printed using the process outlined in flowchart 500, described above with reference to FIGS. 11-19, which is a process designed for printing over fabrics with uneven top surfaces. Overlay 1024 may be, for example, a transparent overlay made of resilient and flexible protective materials. For example, overlay 1024 may have been produced by printing multiple layers of acrylic resin ink, polyurethane ink, TPU ink, or silicone ink according to the process outlined in flowchart 500.

Upper 1001 further has an overlay 1025 in the back of heel region 1005 of upper 1001. Overlay 1025 may have been printed on upper 1001 using the process outlined in flowchart 800, as described with reference to FIGS. 21-27, which is a process for printing multiple layers when a differential expansion of the layers with respect to the fabric may result in separation or delamination of the overlay from the fabric. Overlay 1025 may be, for example, a relatively rigid material that firmly positions the back of the wearer's heel in article of footwear 1001. Overlay 1025 may have been printed using, for example, acrylic resin ink, polyurethane ink, TPU ink, or silicone ink.

While various embodiments have been described, the description is intended to be exemplary rather than limiting, and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims. Accordingly, the invention is not to be restricted except in light of the attached claims and their equivalents.

The invention claimed is:

1. A process for printing on a substrate using a printer and a material dispensed from the printer, comprising:
   positioning the substrate on the printer;
   printing a first layer of the material onto the substrate, wherein the first layer is printed with a pattern of openings in the first layer;
   partially curing the first layer by subjecting the first layer to a first predetermined radiation event characterized by a first radiation;
   printing a second layer of material over the first layer; and
   fully curing the second layer and fully curing the first layer by subjecting the first layer and the second layer to a second predetermined radiation event characterized by a second radiation, wherein the second layer is partially transparent to the second radiation.

2. The process of claim 1, wherein the material dispensed from the printer flows down from high points in the first layer to low points in the first layer.

3. The process of claim 1, further comprising printing a third layer of material over the second layer and curing the third layer by subjecting the third layer to a third predetermined radiation event, wherein at least one of the first radiation and the second radiation is a UV radiation.

4. The process of claim 1, further comprising printing and curing at least an additional seven layers of material over the third layer.

5. The process of claim 1, wherein the printer has a print head, and wherein the process further comprises:
   determining a first distance from the print head to the substrate prior to printing the first layer of material; and
   adjusting a second distance from the print head to the first layer after the first layer has been printed and partially cured but prior to printing the second layer, such that the second distance from the print head to the first layer after the first layer is printed on the material is equal to the first distance.

6. The process of claim 1, wherein the second predetermined radiation event is characterized by a second radiation incident intensity and a second radiation duration, and wherein at least one of the second radiation incident intensity and the second radiation duration is adjusted based upon a magnitude of transmission of the second radiation through the second layer of material.

7. The process of claim 1, wherein the first predetermined radiation event comprises subjecting the first layer to UV radiation for a duration within the range of from 0.03 to 0.20 seconds.

8. The process of claim 1, wherein a thickness of the first layer is in a range of from 0.05 to 0.2 mm.

9. The process of claim 1, wherein the second layer has a flat top surface, and wherein the flat top surface of the second layer serves as a flat reference layer for printing subsequent layers.

10. A process for printing on a substrate that has an uneven top surface, comprising:
    positioning the substrate on a printer;
    printing a first layer of a material onto the uneven top surface of the substrate;
    partially curing the first layer by exposing the first layer to a first predetermined radiation event;
    allowing the first layer to coalesce such that a top surface of the first layer is smoother than the uneven top surface of the substrate;
    printing a second layer of material over the first layer; and
    curing the second layer and fully curing the first layer by subjecting the second layer to a second predetermined radiation event;
    wherein the second layer coalesces during curing, such that a top surface of the second layer is smoother than the top surface of the first layer.

11. The process of claim 10, wherein the material dispensed from the printer flows down from high points in the first layer to low points in the first layer.

12. The process of claim 10, wherein at least one of the first predetermined radiation event and the second predetermined radiation event is a UV radiation event, and wherein the second layer is fully cured.

13. The process of claim 10, wherein the second layer is partially cured.

14. The process of claim 10, further comprising printing and curing additional layers, wherein at least one additional layer has a flat top surface that serves as a reference layer for subsequent processes.

15. The process of claim 10, wherein each layer has a thickness in range from 0.05 mm to 0.2 mm.

16. The process of claim 10, wherein the printer has a print head, further comprising adjusting a distance from the print head to the top surface of the first layer prior to printing the second layer.

17. The process of claim 10, further comprising printing a topmost layer of material, wherein a sufficient number of additional layers are printed to ensure that a top surface of the topmost layer of material meets a predetermined target level of smoothness.

18. The process of claim 10, further comprising printing a topmost layer of material, wherein the sufficient number of additional layers are printed to ensure that a top surface of the topmost layer of material meets a predetermined target level of flatness.

19. A process for printing onto a substrate using a printer comprising:
    positioning the substrate on the printer;
    printing a first layer of material on the substrate, the first layer having a pattern of openings;
    partially curing the first layer by subjecting the first layer to a first radiation event;
    printing a second layer of material over the first layer; and
    partially curing the second layer and further curing the first layer by subjecting the second layer to a second radiation event;
    wherein the first layer of material expands into the pattern of openings as it is cured to at least partially fill in the pattern of openings.

20. The process of claim 19, wherein the pattern of openings is a pattern of grooves.

21. The process of claim 19, wherein at least one of the first radiation event and the second radiation event is a UV radiation event.

22. The process of claim 19, wherein the printer has a print head, further comprising adjusting a distance from the print head to the first layer prior to printing the second layer.

23. The process of claim 19, wherein a thickness of the first layer is in a range of from 0.05 to 0.2 mm.

24. The process of claim 19, wherein the first radiation event comprises subjecting the first layer to UV light for a duration within the range of from 0.03 to 0.20 seconds.

* * * * *